United States Patent
Mok et al.

(10) Patent No.: US 9,019,997 B1
(45) Date of Patent: Apr. 28, 2015

(54) METHOD AND SYSTEM FOR TRANSPORTING CONSTANT BIT RATE CLIENTS ACROSS A PACKET INTERFACE

(71) Applicant: PMC-Sierra US, Inc., Sunnyvale, CA (US)

(72) Inventors: Winston Ki-Cheong Mok, Vancouver (CA); Karl Scheffer, North Vancouver (CA); Michael Smith, Port Moody (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 175 days.

(21) Appl. No.: 13/843,459

(22) Filed: Mar. 15, 2013

Related U.S. Application Data

(63) Continuation-in-part of application No. 12/795,363, filed on Jun. 7, 2010, now Pat. No. 8,542,708.

(60) Provisional application No. 61/704,382, filed on Sep. 21, 2012, provisional application No. 61/265,241, filed on Nov. 30, 2009.

(51) Int. Cl.
 *H04J 3/06* (2006.01)
 *H04B 10/07* (2013.01)

(52) U.S. Cl.
 CPC ..................................... *H04B 10/07* (2013.01)

(58) Field of Classification Search
 CPC ..... H04J 3/0632; H04J 3/0658; H04J 3/0685; H04J 3/0697; H04J 3/1617
 See application file for complete search history.

(56) References Cited

U.S. PATENT DOCUMENTS

| | | | |
|---|---|---|---|
| 5,260,978 A | 11/1993 | Fleischer et al. | |
| 6,829,717 B1 | 12/2004 | Roust | |
| 8,514,881 B2 * | 8/2013 | Kisaka et al. | 370/465 |
| 2003/0152076 A1 | 8/2003 | Lee et al. | |
| 2006/0159130 A1 | 7/2006 | Hollander et al. | |
| 2006/0159169 A1 | 7/2006 | Hui et al. | |
| 2007/0126612 A1 | 6/2007 | Miller | |
| 2007/0162780 A1 | 7/2007 | Wang et al. | |
| 2008/0212619 A1 | 9/2008 | Scott et al. | |
| 2009/0041028 A1 | 2/2009 | Kramer | |
| 2010/0209107 A1 | 8/2010 | Yin | |
| 2010/0226652 A1 | 9/2010 | Vissers et al. | |

OTHER PUBLICATIONS

International Telecommunication Union, "Interfaces for the Optical Transport Network (OTN)", ITU-T G.709/Y.1331, 232 pages, Feb. 2012.

(Continued)

*Primary Examiner* — David Oveissi
(74) *Attorney, Agent, or Firm* — Dennis R. Haszko

(57) ABSTRACT

This disclosure describes a method and apparatus for signaling the phase and frequency of OTN and Constant Bit Rate (CBR) clients in an OTN network. The principles discussed are applicable when multiple stages of OTN multiplexing and demultiplexing are utilized. They are also applicable for use with the Generic Mapping Procedure (GMP) and Asynchronous Mapping Procedure (AMP). A method to use the phase and frequency of an ODUk/ODUflex to adjust a local reference clock to enable the recovery of the phase and frequency of a CBR client demapped from the ODUk/ODUflex is described.

34 Claims, 30 Drawing Sheets

(56) References Cited

OTHER PUBLICATIONS

International Telecommunication Union, "The Control of Jitter and Wander within the Optical Transport Network (OTN)", ITU-T G.8251, 115 pages, Sep. 2010.

Telecommunication Standardization Sector of ITU, "ITU-T G.709, Interfaces for the Optical Transport Network (OTN)", International Telecommunication Union, Mar. 2003, 118 pages.

Telecommunication Standardization Sector of ITU, "ITU-T G.8251, Control of Jitter and Wander within the Optical Transport Network (OTN)", International Telecommunication Union, Sep. 2010, 124 pages.

Telecommunication Standardization Sector of ITU, "ITU-T G.7041/ Y.1303, Generic Framing Procedure (GFP)", International Telecommunication Union, Oct. 2008, 79 pages.

* cited by examiner

METHOD AND SYSTEM FOR TRANSPORTING CONSTANT BIT RATE CLIENTS ACROSS A PACKET INTERFACE

CROSS REFERENCE TO RELATED APPLICATIONS

This application claims the benefit of U.S. Provisional Patent Application No. 61/704,382 filed Sep. 21, 2012, which is incorporated herein by reference in its entirety.

This application is a continuation-in-part of U.S. patent application Ser. No. 12/795,363, which claims the benefit of U.S. Provisional Patent Application No. 61/265,241 filed Nov. 30, 2009, each of which is incorporated herein by reference in its entirety.

FIELD

The present disclosure relates generally to Constant Bit Rate (CBR) client signals. More particularly, the present disclosure relates to the transmission of a constant bit rate client signal across a packet interface, in which the process of converting the constant bit rate client signal into packets loses the phase information of the constant bit rate client signal.

BACKGROUND

The International Telecommunication Union Telecommunication Standardization Sector (ITU-T) has developed a set of new standards covering wavelengths and signal formats in order to better support the multiplexing of a substantial number of signals onto a single fiber. These signal format and hierarchy standards cover digital signals and include the Operations, Administration, Maintenance, and Provisioning (OAM&P) overhead as part of the signal format. In the context of this disclosure, Optical Transport Network (OTN) refers to networks using the ITU-T Recommendation G. 709/Y1331, Interfaces for the Optical Transport Network (03/2003) Recommendation G. 709 standard for Wavelength Division Multiplexed (WDM) signals.

WDM transport networks based on the ITU-T OTN standards are becoming increasingly important. The reasons carriers are moving toward OTN include: OTN is a much less complex technology for transport applications than synchronous optical networking and synchronous digital hierarchy (SONET/SDH). The OTN signal incorporates overhead optimized for transporting signals over carrier WDM networks. The combination of the reduced technology complexity and optimized overhead allows substantial reductions in carrier transport network operations expenses. The OTN multiplexing bandwidth granularity is one or two orders of magnitude higher than for SONET/SDH, thus making it more scalable to higher rates. OTN now provides a cost effective method for carrying high-speed wide area network (WAN) data clients including Ethernet and storage area network (SAN) protocols. OTN provides an integrated mechanism for forward error correction (FEC) that allows greater reach between optical nodes and/or higher bit rates on the same fiber. Client signals can be carried over OTN in a transparent manner. This transparency includes native SONET/SDH signals for the "carrier's carrier" application where the entire client SONET/SDH signal's overhead is preserved through the OTN.

In other words, as illustrated in FIG. 1, OTN provides an optimum converged transport technology for transparently carrying important legacy and emerging client signals.

Network elements (NE) within a telecommunications network will need to switch and aggregate Constant Bit Rate (CBR) clients such as SONET/SDH, STS-N/STM-M, OTN optical channel transport unit (OTUk), and video streams and data clients such as Ethernet and Fibre channel. Historically, CBR clients are switched using an asynchronous crossbar, while Data clients are switched by a packet switch. Over the lifetime of a network element (NE, also called a network node), the relative mix of CBR and Data traffic will change. The NE may start out as serving mostly CBR clients and evolve to serving mostly data clients, or vice versa. In order to seamlessly support the above evolutions, a NE with separate CBR and Packet fabrics would have to install 100% bandwidth in both fabrics. It is more cost effective to use a single combined switch fabric that can handle both CBR and Data traffic. Due to the higher growth rate of Data traffic, the current fabric of choice in an NE is a packet fabric.

A packet fabric network element can switch a CBR client by receiving a CBR client at an Ingress card, which converts the CBR client data stream into packets, which are routed to an egress card via the packet fabric. The egress card then reassembles the CBR client from the packets and transmits the CBR client to a downstream NE. However, the process of converting the CBR client data stream into packets loses the phase and frequency information of the CBR client, which is a problem as the outgoing CBR client must match the phase and frequency of the incoming CBR client.

In the application of switching a CBR client through a network element (see FIG. 2, to be described later in further detail), there are a number of known ways to control the transmit clock to be phase-locked to the CBR client.

However, there are problems or disadvantages associated with prior art techniques that have been developed for signaling this phase and frequency information from the Ingress card to the Egress card, so that the Egress card can correctly recreate the CBR from the packets.

One of these prior art methods is to construct packets with fixed amount of CBR client data, transfer the packet through the fabric, and write the CBR client data into a first in first out block (FIFO) and read from the FIFO at the transmit clock rate. The transmit clock is sped up or slowed down depending on whether the FIFO depth is above or below an equilibrium threshold. A highly related scheme is to use a phase discriminator to monitor packet arrivals and compare it against the transmit clock. The phase discriminator will get a phase dump equal to the amount of data in each packet as packets arrive. Both of the above schemes are subject to the effects of packet delay variation (PDV). In particular, if the delay through the fabric changes, the transmit clock will experience a phase hit which is seen by the CBR client as wander. These methods are commonly known as Adaptive Timing.

Another known method of signaling phase over a packet fabric is to timestamp each packet. For example, the creation time of each packet can be logged and inserted into overhead bytes of the packet. This scheme has the benefit of being insensitive to PDV. However, because each packet carries data and control information (the timestamp), the egress port must segregate the two components when it re-generates the CBR client stream. In addition, the potential throughput of the fabric is reduced by the amount of bandwidth consumed by the timestamp. Another key requirement for this methodology is that the source and destination of the data must have access to the same reference clock. This common clock controls the rate at which the timestamp counter increments. This method is commonly known as Differential Timing.

In the application of transporting a CBR client through a SONET/SDH or OTN network, there are a number of known ways to control the transmit clock at the egress NE to be phase-locked to the CBR client received by the ingress NE.

One method is to construct General Framing Protocol (GFP) frames with fixed amount of CBR client data, transport the GFP frames through the network, and write the CBR client data into a FIFO and read from the FIFO at the transmit clock rate. The transmit clock is sped up or slowed down depending on whether the FIFO depth is above or below an equilibrium threshold. A highly related scheme is to use a phase discriminator to monitor packet arrivals and compare it against the transmit clock. The phase discriminator will get a phase dump equal to the amount of data in each packet as packets arrive. Both of the above schemes are subject to the effects of how GFP frames of multiple CBR clients are multiplexed onto a single SONET or OTN path. Consider the case where three CBR clients (Clients A, B and C) are multiplexed using the GFP Extension Header facility defined in ITU G.7041. If the multiplexing order had been A, B, C over an extended period of time and then switches to C, B, A the arrival times of GFP frames of Client C would suddenly be earlier than expected and arrival times of Client A would be later. The transmit clock of Clients A and C will experience a phase hit which is seen by the CBR client as wander.

Another known method of signaling phase over a telecommunications network is to timestamp each GFP frame in a manner analogous to SRTS in asynchronous transfer mode (ATM) networks (U.S. Pat. No. 5,260,978, which is incorporated by reference in its entirety). For example, the creation time of each GFP frame can be logged and inserted into overhead bytes of the frame. This scheme has the benefit of being insensitive to PDV. However, because each packet carries data and control information (the timestamp) the egress port must segregate the two components and process them separately. It would not be possible for an NE using timestamps to inter-operate with one that does not.

It is, therefore, desirable to provide methods and apparatus which allow for the better transmission of phase information relating to packetized CBR data streams.

BRIEF DESCRIPTION OF THE DRAWINGS

Embodiments of the present disclosure will now be described, by way of example only, with reference to the attached Figures.

DETAILED DESCRIPTION

Figure 1:
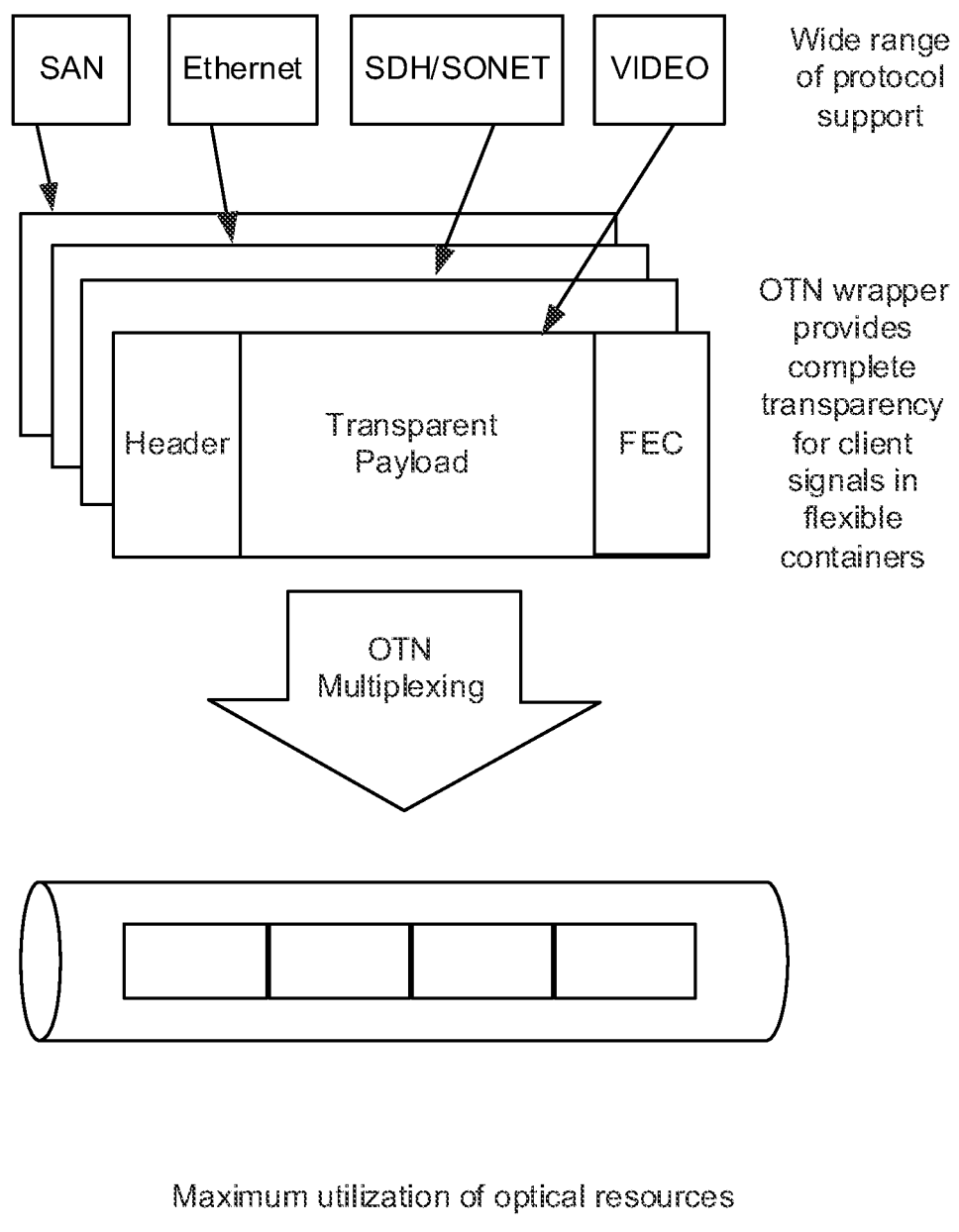
FIG. 1 illustrates an OTN mapping.

It is an object of the present disclosure to obviate or mitigate at least one disadvantage of previous constant bit rate (CBR) switches and networks.

The present disclosure provides a method and apparatus for transporting a CBR client signal across a packet interface, in which the process of converting the CBR client signal into packets loses the phase information of the CBR client signal, such that an egress element (that is to say an egress card, node etc., located downstream from said packet interface) can regenerate said CBR client signal without requiring phase and frequency information be inserted into said packets.

Aspects of the disclosure are applicable within a network node or across a network. For example, within a network node, an Ingress card receives a CBR client and converts said CBR client signal into packets, which are routed across a packet interface (in this example, typically a packet fabric) to an Egress card, which reconstructs the CBR client signal. In another example, the CBR client is sent across a packet fabric is then mapped into an CBR carrier signal. An example of a CBR client is a SONET/SDH stream and an example of a CBR carrier is an OTN ODUk signal. The frequency and phase of the CBR client is recovered and encoded, for example, using Bit-synchronous Mapping Procedure (BMP), Generic Mapping Procedure (GMP) or Asynchronous Mapping Procedure (AMP) into the CBR carrier. BMP, GMP and AMP are encoding schemes defied in ITU-T G.709. In a third example, the CBR client is itself a Low Order (LO) ODU stream. It is multiplexed along with other LO ODU clients into a High Order (HO) ODUk carrier stream. The frequency and phase of the LO ODU client is recovered and encoded using GMP or AMP into the HO ODUk carrier. It is also possible for an application to be a combination of some or all of the above. For example, an Ingress card receives a CBR client and maps it into an ODUk carrier using BMP, AMP or GMP. The resulting ODUk carrier stream is converted into packets and sent across a packet fabric to an egress line card. The phase and frequency of the ODUk stream is recovered at the Egress linecard, where it can be transmitted as a serial stream across the network. Alternatively, the ODUk carrier stream (with the CBR client inside) may be treated as a CBR client stream (Low Order ODUj) and multiplexed into a HO ODUk carrier stream, which is transmitted across the network. As another example of across a network, an Ingress Node receives a CBR client and converts said CBR client signal into packets, which are routed across a packet interface (in this case a packet network, or possibly via a synchronous optical networking (SONET) or optical transport network (OTN) network via some intermediate block, for example a generic framing procedure (GFP) framer) to an egress node, which reconstructs the CBR client signal.

In this disclosure, the term CBR stream is used to represent both the CBR client stream and the CBR carrier stream when the description is applicable to both.

Aspects of the disclosure are directed at regenerating the phase and frequency of a CBR client which has been packetized and transmitted over a packet switching network or fabric solely via variations in the size of variable sized packets, without requiring phase and frequency information be inserted into the header of said packets. Because the current disclosure does not employ timestamps, it inter-operates with all existing egress network elements (NEs). In order to correctly interpret timestamps, the ingress and egress NEs must have access to a common clock that increments their timestamp counters. This clock can be provided from a stratum traceable reference clock. Alternatively, the OTN line clock can be used as the common clock, with such a method being limited to OTN networks.

According to one aspect of the disclosure an incoming CBR client stream received on one side of the packet switch fabric is packetized into variable sized packets and is regenerated on the other side of the fabric phase-locked to the incoming stream. Regeneration of the CBR client clock is based solely on packet sizes. No overhead bytes are inserted into the packets to convey phase and frequency information. This has the advantage of reducing the cost and complexity of network elements by allowing CBR clients and packet clients to be switched by a common packet fabric.

Another aspect of the disclosure is directed at regenerating the phase and frequency of a CBR client that have been demapped from a CBR carrier stream. An example of a CBR client is a SONET/SDH stream and an example of a CBR carrier is an OTN ODUk signal. For example, within a network node, an Ingress card receives a CBR carrier and converts said CBR carrier signal into packets, which are routed across a packet fabric to an Egress card. At the Egress card, the CBR client is extracted from the CBR carrier and is converted into variable sized packets whose sizes are under the direction of the BMP, AMP or GMP Justification Control signals encoded within the CBR carrier. Using solely variations in the size of variable sized CBR carrier packets and CBR client packets, the phase and frequency of the CBR client is re-constructed. Such a method and apparatus has the advantage of reducing the cost and complexity of communications networks by allowing CBR clients to be transported with low jitter and wander without requiring the source and sink network elements to be phase-locked to a common stratum reference.

In further aspect, the present disclosure provides a method and apparatus for packetizing CBR client streams into variable sized GFP frames, sending those frames over a CBR carrier network and regenerating the CBR client, phase-locked to the incoming stream. Regeneration of the CBR client clock is based solely on the GFP frame sizes and the rate of the CBR carrier, e.g., SONET Path or OTN ODUk stream carrying the GFP frames. No overhead bytes are inserted into the GFP frames to convey phase and frequency information. Such a method and apparatus has the advantage of reducing the cost and complexity of communications networks by allowing CBR clients to be transported with low jitter and wander without requiring the source and sink network elements to be phase-locked to a common stratum reference.

Accordingly, embodiments of the disclosure relate to the transport of CBR streams across a packet fabric within a network node. Other Embodiments relate to the transmission and reconstruction of a CBR client stream which has been packetized and mapped into a CBR carrier stream at a first node and transmitted across a network to a far end node. Embodiments of the disclosure can be implemented within the cards of such a node.

It should be appreciated that there is a common element to both embodiments within a NE or Node, and to embodiments that operate across nodes. In some cases, the embodiments relating to the cards which transmit a CBR stream across a fabric within a switch can be thought of as a simplification of the cards within nodes of a network, because within a switch, both the ingress port card and the egress port card have access to the same local reference clock.

In an embodiment, the present disclosure provides a method for transporting a CBR data stream comprising the following steps at an ingress element: measuring a CBR clock rate for an input CBR stream and generating segment size decisions such that said segment size decisions vary dependent on said CBR clock rate; dividing said CBR stream into variable size segments using said segment size decisions; transmitting said variable size segments to an egress element. The method also includes the following steps at said egress element: receiving said variable size segments; determining size indications dependent on the size of each variable size segment, relative to a base segment size value; and reconstructing said CBR stream from said size indications at a rate adjusted to match said CBR clock rate based on the variation in sizes of said size indications, said segment size, and the base segment size value.

In a further embodiment, the present disclosure provides a method for transporting a CBR client comprising the following steps at an ingress linecard of an ingress element: measuring the CBR clock rate of an input CBR client and generating segment size decisions such that said segment size decisions vary dependent on said CBR clock rate; converting said segment size decisions into AMP and GMP Justification Control values; mapping said CBR client into a CBR carrier, for example, in accordance to AMP or GMP encoding as defined in ITU-T G.709; dividing said CBR carrier into variable size segments; transmitting said variable size CBR carrier segments to an egress linecard. The method also includes the following steps at said egress linecard of an ingress element: receiving said variable size CBR carrier segments; determining size indications dependent on the size of each variable size segment relative to a base segment size value; and reconstructing said CBR carrier stream from said variable size segments at a rate adjusted to match said CBR carrier clock rate based on said size indications; transmitting said CBR carrier stream serially over the CBR carrier network or multiplexing said CBR carrier into a second High Order CBR carrier and transmitting said second CBR carrier over the network.

In a further embodiment, the present disclosure provides a method for recovering a CBR data stream comprising the following steps at an ingress linecard of an egress element: measuring the clock rate for the CBR carrier stream and generating segment size decisions such that said segment size decisions vary dependent on said CBR carrier clock rate; dividing said CBR carrier into variable size segments from said segment size decisions; transmitting said variable size CBR segments to an egress linecard. The method also includes the following steps at said egress linecard of an egress element: receiving said variable size CBR carrier segments; determining size indications relative to a base CBR carrier segment size value; extracting the CBR client from the CBR carrier in accordance to, for example, AMP or GMP mapping as defined in ITU-T G.709; using the AMP or GMP Justification Control signals from the CBR carrier stream to generate a sequence of CBR client segment size decisions, determining size indications of said decisions relative to a base CBR client segment size value; dividing the CBR client stream into variable sized segments using said segment size decisions, and reconstructing said CBR client stream from said variable CBR client size indications in combination with size indications of said CBR carrier.

The base CBR client segment size value and segment period describes a base or reference rate of the CBR client, which is typically different from the nominal rate of the CBR client. Similarly, the base CBR carrier segment size value and segment period describes a base or reference rate of the CBR carrier, which is typically different from the nominal rate of the CBR carrier. CBR client and carrier base segment size values are chosen to best match the parameters of the packet fabric.

The method may further include calculating a CBR carrier rate and controlling a CBR client phase locked loop (PLL), at an egress node, based on the size indications of the CBR client and the CBR carrier.

The method may further include pacing the CBR client data value for the PLL of the CBR client.

The method may further include smoothing the CBR carrier stream using a multi-channel jitter attenuator (JAT).

The measuring step can include determining that said CBR stream clock rate is greater than, less than or equal to a base CBR stream clock rate derived from a local reference clock and wherein said dividing step includes sizing any given segment to be larger than, less than or equal to a base size indicative of said base CBR stream clock rate.

Over time, the variation in segment size decisions can indicate variances between said CBR stream clock rate and said base CBR stream clock rate. The base CBR stream clock rate can be defined using integers C and Tref, where C is a base segment size in bytes and Tref is a number of local reference clock cycles such that said base CBR stream clock rate in bits per second is given by C*8/Tref. Note that said base clock rate is typically different from the nominal clock rate of the CBR stream.

The measuring step can utilize a control loop configured to correctly compensate said segment size decisions for the difference between said base CBR rate and said CBR clock rate, wherein said segment size decisions are determined every decision period of Tref clock cycles of said local reference clock. For the specific application in respect to a CBR client, the decision period is called Tcl. Similarly, in respect to a CBR carrier, the decision period is called Tcr. Tref (and the specific instances Tcl and Tcr) are typically rational numbers.

The reconstructing step can include outputting bits from said received segments at said CBR stream clock rate by outputting bits at a local egress clock rate adjusted based on said sizes of segments. The local clock rate can be adjusted by fractional-N clock synthesis configured such that said output CBR stream from said egress element matches the frequency and phase of the original CBR data stream at said ingress element. The fractional-N clock synthesis can use a phase locked loop to adjust the rate of said local egress clock rate to match said CBR stream clock rate based on said size sizes of segments.

The measuring step can assign the length of any given segment to be C+N bytes, C−N bytes or C bytes respectively, wherein N is an integer, such as 1. Over time, the number of occurrences of C byte, C+N byte and C−N byte segments can depend on said CBR stream clock rate, such that Average {segment sizes*Tref*8}=bit clock rate of the CBR stream.

A packet fabric can be provided between said ingress and egress elements, said packet fabric being within a network element, and said ingress and egress elements can be ingress and egress cards respectively, with said ingress and egress cards sharing a common local reference clock.

The size of received segments can be determined and written into a segment size first in first out block (FIFO), and read from said segment size FIFO every Tcl cycles of said common local reference clock and enter a control loop which adjusts said fractional-N clock synthesizer to generate an egress CBR client clock rate matching said CBR client clock rate.

The ingress element can be an ingress node. The egress element can be an egress node and a CBR carrier network can be provided between said ingress and egress nodes, said variable size segments being transported as client segments across said CBR carrier network via a CBR carrier signal. The transmitting step can include mapping said client segments into said CBR carrier signal, and at said egress node, said determining step can include measuring client size indications indicating a rate of said CBR client signal. The method can further include receiving said CBR carrier signal, and measuring carrier size indications indicating a rate of said CBR carrier signal, wherein said reconstructing step includes outputting bits from said received client segments at said CBR clock rate by outputting bits at an egress node local reference clock rate adjusted based both on said client size indications and on said carrier size indications.

The method can further include determining a relationship between an ingress node local reference clock and said egress node local reference clock using said CBR carrier size indications. The transmitting step can include mapping or muxing said client segments into said CBR carrier signal, and said step of receiving said CBR carrier signal includes demapping or demuxing said CBR carrier signal to output said client segments and placing said client segment size indications into a client size FIFO buffer. The reconstructing step can include: deriving an egress CBR rate using said CBR carrier size indications and said CBR client segment size indications; reading said client segment size indications once every Tcl cycles of said egress node local reference clock.

The derivation step can include: reading said carrier size indication FIFO every Tcr cycles of said egress node local reference clock, comparing the size indications against the base carrier size indications, and using the results of said comparison to generate a series of Tcl values such that, on average, (Egress Tcl*egress reference clock period)=(Ingress Tcl*ingress reference clock period).

In said reading step, the reading of said client segment size indication FIFO can be performed every Tcl cycles of said egress local reference clock or at a sequence of integer Tcl1, Tcl2, . . . Tclx cycles that averages to Tcl, and further comprising providing said client segment size indications as reference phase to a phase locked loop.

In another embodiment, the present disclosure provides an apparatus for transmitting a CBR client stream over an CBR carrier, comprising an ingress element and an egress element. The ingress element includes: a rate measurement block configured to measure a CBR clock rate of an input CBR client and generate segment size decisions such that said segment size decisions vary dependent on said CBR clock rate; and a segment maker configured to divide said CBR client into variable size segments using said segment size decisions and to transmit said variable size segments. The egress element includes: a segment monitor configured to receive said variable size segments from said segment maker and to determine size indications dependent on the size of each variable size segment; and an adaptive clock block configured to decode said packet size indications into the original data rate and to control transmitter frequency relative to said local egress element reference clock such that the transmitter frequency matches the frequency and phase of the original CBR data stream at said ingress element.

In an aspect, the Cn generator block includes a Cn base generator delta sigma modulator (DSM) configured to generate a Cn, base value; a packet size decision accumulator configured to receive the packet size indications to produce a Cn delta; and a summer for adding the Cn base to the Cn delta to produce a time average value of Cn.

In as aspect, the Cn generator further comprises a low pass filter to reduce the noise on the time average value of Cn.

In an aspect, the CBR data stream is an ODU stream and the system further includes a multi-channel jitter attenuator (JAT) for smoothing an ODU stream. In as aspect, the multi-channel jitter attenuator includes a multi-channel first in first out block (FIFO) used as a phase detector for filtering a specific channel of the ODU stream; a time-sliced low-passed filter for filtering the ODU stream; a time-sliced conversion gain stage for converting a generated fill level to generate a voltage controlled oscillator (VCO) frequency; and a time-sliced delta sigma modulator (DSM) for receiving the VCO frequency and generating a dequeue signaling.

The rate measurement block can include: a free running CBR byte counter configured to measure the exact amount of phase coming in on an input CBR data path; a feedback byte counter configured to count and increment a segment size once every Tref reference clock cycles; a loop filter configured to receive a difference of outputs of said CBR byte counter and said feedback byte counter; and a quantizer configured to receive an output of said loop filter and generate a new output value as said segment size decisions to said segment maker, and as an output on a feedback path.

In an aspect, the rate measurement block further includes a Cn pacer configured to break the base segment size value into smaller pieces before input into the CBR byte counter.

The adaptive clock block (ACB) can include: a client segment size indication FIFO configured to receive client size indications indicative of variations in the size of said segments from said segment monitor; and an ACB control loop configured to produce a transmitter rate control signal to adjust a local reference clock which causes said transmitter to match said CBR client rate, such that said CBR client stream is output at said CBR client clock rate.

The ingress element can be an ingress node, the egress element can be an egress node and a CBR carrier network can be provided between said ingress and egress nodes. The variable size segments can be transported as client segments across said CBR carrier network via a CBR carrier signal, wherein said rate measurement block includes a client rate measurement block configured to measure client size indications indicating a rate of said CBR client signal. The apparatus can further include: a mapper or muxes configured to map or mux said client segments into said CBR carrier signal; a carrier rate measurement block configured to measure carrier size indications indicating a rate of said CBR carrier signal; and a carrier segment size indication FIFO configured to receive carrier segment size indications from said carrier rate measurement block. The adaptive clock block can be configured to output bits from said received client segments at said CBR clock rate by outputting bits at an egress node local reference clock rate adjusted based both on said client size indications and on said carrier size indications.

The system can be further configured to map said client segments into said CBR carrier signal; and further include: a client size FIFO buffer; a demapper or demuxer configured to demap or demux said CBR carrier signal to output said client segments and place said client segment size indications into said client size FIFO buffer. The adaptive clock block can be configured to derive a relationship between an ingress node local reference clock and said egress node local reference clock using said CBR carrier size indications and said client segment size indications, to read said client segment size indications once every Tref cycles of said ingress node local reference clock, wherein Tref is a number of local reference clock cycles, and to adjust said egress node local reference clock rate based on said CBR carrier size indications and said client segment size indications.

In a further embodiment, the present disclosure provides a network element comprising: an ingress port arranged to measure a rate of an incoming CBR data stream relative to a local reference clock, and to convey phase information by segmenting said incoming CBR data stream into segments sized to reflect said measured rate of said incoming CBR data stream; and an egress port including a transmitter and arranged to receive said segments from said ingress port, to decode segment size indications into the original data rate, and to control said transmitter frequency relative to said local reference clock such that the transmitter frequency matches the frequency and phase of the original CBR data stream at said ingress port.

The phase information can be conveyed using relative size indications associated with the segments, said relative size indications indicating the relative phase of data in the segments. The phase information can be conveyed without inserting phase or frequency information bits into the segments.

The network element can further include two rate measurement blocks and wherein said egress port receives client and carrier segment size indications on the basis of which to control said transmitter frequency, said client segment size indication being a measurement of said CBR data stream relative to a reference clock at said ingress node, and said carrier segment size indication being a measurement of an incoming carrier relative to a reference clock at said egress node.

In another embodiment, the present disclosure provides a method of transporting a CBR stream, comprising, at an ingress port: measuring a rate of an incoming CBR data stream relative to a local reference clock; and conveying phase information by segmenting the incoming CBR data stream into segments sized to reflect the measured rate of the incoming CBR data stream. The method further includes, at an egress port: receiving the segments from the ingress port and decoding segment size indications into the original data rate; and controlling a transmitter frequency relative to the local reference clock such that the transmitter frequency matches the frequency and phase of the original CBR data stream at the ingress port.

The phase information can be conveyed using relative size indications associated with the segments, said relative size indications indicating the relative phase of data in the segments. The phase information can be conveyed without inserting phase or frequency information bits into the segments.

The step of receiving can include receiving client and carrier segment size indications, and wherein said step of controlling includes controlling the transmitter frequency on the basis of said client and carrier segment size indications, said client segment size indication being a measurement of the CBR data stream relative to a reference clock at the ingress node, and said carrier segment size indication being a measurement of an incoming carrier relative to a reference clock at the egress node.

The current disclosure does not burden the telecommunications network with the requirement of locking the ingress and egress NEs to the same stratum source nor is the OTN clock a requirement as the disclosure can be applied equally well to a SONET/SDH network.

In an aspect the present disclosure provides as system and method for using the phase and frequency of a client to generate generic mapping protocol (GMP) information required to multiplex or map a client into a high order (HO) ODUk. In a further aspect, the disclosure provides a system and method for recovering phase and frequency of GMP demultiplexed or demapped clients using GMP information carried by the ODUk overhead. In another aspect, the disclosure provides a system and method for efficiently using the phase and frequency of a OTUk/ODUk to adjust a local reference clock to enable the recovery of the phase and frequency of a CBR client demapped from the ODUk. In a further aspect, the disclosure provides a system and method for ensuring that during multiple levels of demultiplexing of OTN clients, the removal of overhead bytes from the higher order ODUk signals does not cause an accumulation of low frequency jitter on the lower order ODUj/ODUflex or demapped client signals.

In a further aspect, the disclosure provides a system and method where during multiplexing and demultiplexing between higher order ODUk and lower order ODUj/ODUflex or CBR clients, includes a segment or packet monitor (MP-MO_DSP) generating a Cn towards the GMP/AMP (asynchronous mapping procedure) multiplexor or mapper, a segment or packet maker (MPMA_DSP) consuming the Cn recovered by the demux or demapper, creating packet size decisions (PSDs) from the Cn values, and eventually driving an Adaptive Clocking Block (ACB) with the PSD stream, configuring the ACB using a packet decision period different from that programmed into the corresponding segment or packet maker, programming Tca instead of a Tc, and using an ODUk/ODUflex JAT to adjust the time position of words on a time-sliced databus in order to avoid frequency beating between the OTN parent overhead gaps at the demux stages.

In an example embodiment, the present disclosure provides a method and apparatus for signaling the phase and frequency of a CBR clock over a packet switching network or fabric. This includes mapping the client into an optical channel data unit ODUk carrier using GMP. In an embodiment, GMP justification control values are generated in order to describe the frequency and phase of the CBR client. In an embodiment, the rate of the ODU carrier is calculated, and then the phase locked loop (PLL) is controlled for the CBR client, at the egress, based on the justification control carried in the overhead and the ODU carrier rate. Additionally, in an example embodiment, a pacer (or doler) is used to break the justification control value into smaller pieces for the PLL (based on a design choice of the PLL) and a multi-channel JAT at the midlevel is used to smooth the ODUj stream.

A known approach is described in US 2010/0209107 to Yin. Embodiments of the present disclosure differ from Yin as follows: use of justification values; use of the average ODU carrier rate; controlling the PLL for the CBR client at the egress; use of a pacer or Doler-like method or apparatus; use of a JAT. Another known approach is described in US 2010/0226652 to Vissers et al. which, while providing a mapping apparatus in an OTN, does not discuss clock or phase issues, nor does it teach or suggest the features of embodiments described herein.

Consider the following analogy for explaining CBR over WAN. Problem: If 100 +/−1 widgets are delivered by trucks arriving at the factory every 60 +/−1 minutes, how fast should we operate the painting machine? If we noticed that trucks arrive every 61 minutes, we can't run at 100*60/61 per hour because trucks may not average to having 100 widgets. Since trucks appear to be dispatched less frequently than expected, perhaps it's because each truck is fuller. If we noticed that trucks carried on average 99 widgets, we can't run at 99 per hour because trucks may not average to arriving every 60 minutes. Since each truck appears to be emptier than expected, perhaps it's because trucks are sent more frequently.

According to an embodiment of the present disclosure, for CBR over wide area network (WAN), a mapper uses the same reference clock to measure the CBR client rate and to clock the ODUk stream. In an embodiment, the CBR client rate is encoded in the GMP/AMP Justification Control bytes.

A demapper according to an embodiment of the present disclosure can perform one or more of the following steps and/or have one or more of the following characteristics: segment the ODUk stream into variable sized packets; B−1, B, B+1; derive Bavg to determine the relative rate of the reference clock (REFCLK) at the mapper to the local REFCLK clock at the demapper; store the phase amount encoded in the justification control bytes in a FIFO; nominally read from the justification control phase FIFO every tributary multiframe (Tm), and feed the result to the PLLs phase detector; and modulate the period between reads based on ODUk packet sizes (B+/−1) every Tc cycles of the REFCLK at the mapper. Reading Tc cycles of the REFCLK at the demapper will lead to phase error buildup if there is a parts per million (PPM) offset between the 2 REFCLKs.

In some instances, the number of ODUk stream types that can carry CBR clients has increased, and it is advantageous to not need a predictor per ODUk type. We now have ODU0, ODU1, ODU2, ODU3, ODU3e2 and ODU4.

GMP mapping is a new mapping mode defined at ITU. The amount of phase and the variance reported by a GMP justification control value can be large. The frequency of justification control can be low (e.g. ODU0 frame periods=98 us). Breaking the justification control value up into smaller chuck using the pacer simplifies PLL design, according to an embodiment of the present disclosure.

An embodiment of the present disclosure provides an improved controller to transmitter PLL.

Embodiments describe two scenarios. (1) An ODUk signal is comes in on a linecard on one side of a packet fabric and recovers its frequency and phase on a linecard on the other side of the fabric and send it out on a fibre. This is described as an intra-box or optical to electrical to optical (O-E-O) application. (2) A CBR signal is comes in to an ingress box, carrying that signal as a client inside an ODUk carrier over the OTN network. On the far side of the network, the frequency and phase of the CBR signal is recovered. Using variable sized GFP frames to encapsulate the client is described as the network application.

For the intra-box application, when the ODUk signal reached the egress linecard, it is sent out on a fibre. It did not explicitly consider the possibility of it being multiplexed into a HO ODUk. In order to be multiplexed, we need to report the rate of the Low Order (LO) ODUk in GMP justification control overhead bytes and to spread out the LO ODUk data bytes among the bytes within the HO that are reserved/dedicated to carry the LO ODUk.

For the network application, the client rate is encoded in variable sized GFP frames. Here, in the second set of embodiments, mapping is added to the client into an ODUk carrier using GMP. An example embodiment in the second set of embodiments, at the egress card where mapping takes place, GMP justification control values are generated to describe the frequency and phase of the CBR client.

A predictor has to do with the network application (scenario 2). Recall the discussion about needing to know how fast to run the painting machine when trucks delivers N+/−1 widgets to the factory. At the widget factory, trucks can only leave at the top to each hour, using the clock on the wall. This clock may be running a tiny bit fast or slow. We also know that the factory is supposed to send a truck every 23.2 hours. It would send 4 trucks that are 23 hours apart and then a 5th one that is 24 hours apart, to get us the average of 23.2 hours. In the first set of embodiments, we had a Predictor that blows a whistle 23 hours apart 4 times and a whistle 24 hours apart the fifth time. We look at the arrival times of trucks (23 or 24 hours apart), compare with whistle times to detect if the widget factory has a fast or slow clock.

In a further set of embodiments, the predictor is omitted. To further the analogy, we assume trucks arrive every 23 hours apart and do a correction when we get the 24 hour apart truck. With the predictor, the 24 hour truck is predicted and is not a surprise. We don't have to take action as it is already accounted for. Here, we are a little surprised each time we get a 24 hour truck. An embodiment of the present disclosure includes controlling the egress PLL for the CBR client such that it is sensitive to the GMP justification control carried in overhead bytes as well as the rate of the ODU carrier itself (i.e., rate of truck arrival (carrier rate) and overhead encoding (widget in each truck)).

Other aspects and features of the present disclosure will become apparent to those ordinarily skilled in the art upon review of the following description of specific embodiments of the disclosure in conjunction with the accompanying figures.

Figure 2:
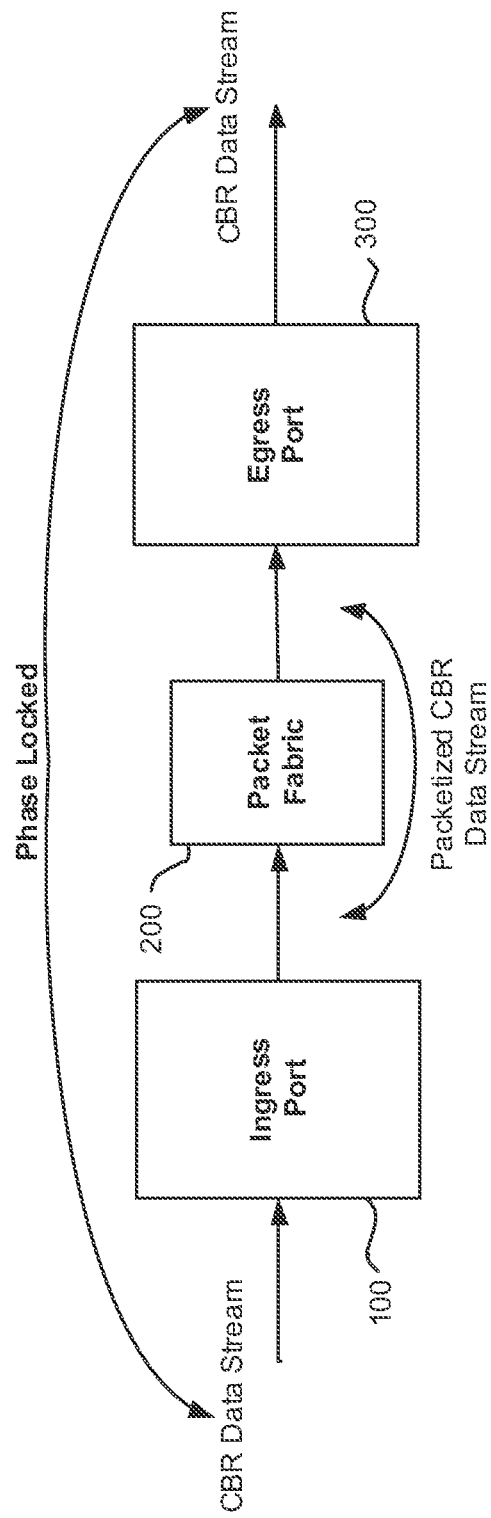
FIG. 2 illustrates a Network Element with CBR Client ports.

Turning to FIG. 2, a network element switching CBR and packet clients is shown. When an NE switches a CBR client data stream from an ingress port 100 to an egress port 300, it controls the transmit clock of the egress port 300 to be phase-locked to the recovered clock of the incoming client. To traverse a packet fabric 200, the CBR client stream is segmented into a series of packets. At the egress port 300, the packets are re-assembled into a continuous CBR client stream. Generally, the process of packetizing the CBR stream removes the phase information from the signal. Therefore, a method to recover the phase of the original CBR signal is required at the egress port 300.

The CBR data streams shown in FIG. 2 may be an OTN OTUk signal. In the simplest case, the node is performing a simple regeneration for signals that must traverse long distances in the network. The ODUk may also be switched or routed between the input and the output ports.

Figure 3:
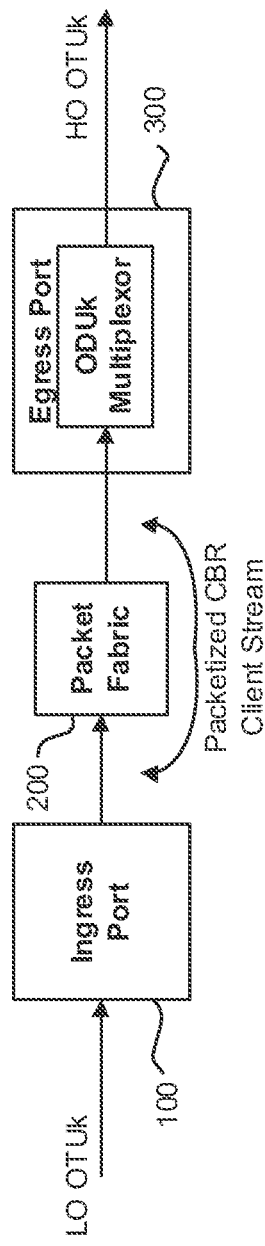
FIG. 3 illustrates a network element with an optical channel data unit (ODUk) multiplexor at an egress port.

In another embodiment, the incoming OTUk will have its OTU overhead removed and the resulting ODUk will be multiplexed into a higher order ODUk and then mapped into an OTUk at the egress port as shown in FIG. 3.

In FIG. 3, the ingress CBR client stream 100 is a LO OTUk and the egress CBR stream 300 is a HO OTUk. To transmit the CBR client across the packet fabric 200, it is segmented into packets. At the egress port 300, multiplexing the LO ODUk into the HO ODUk uses GMP, or AMP as defined in G.709. These mapping protocols require knowledge of the LO ODUk rate. Therefore, in the egress port 300, there is a method for detecting the rate of the LO ODUk and translating this rate information to the format required for GMP or AMP.

Figure 4:
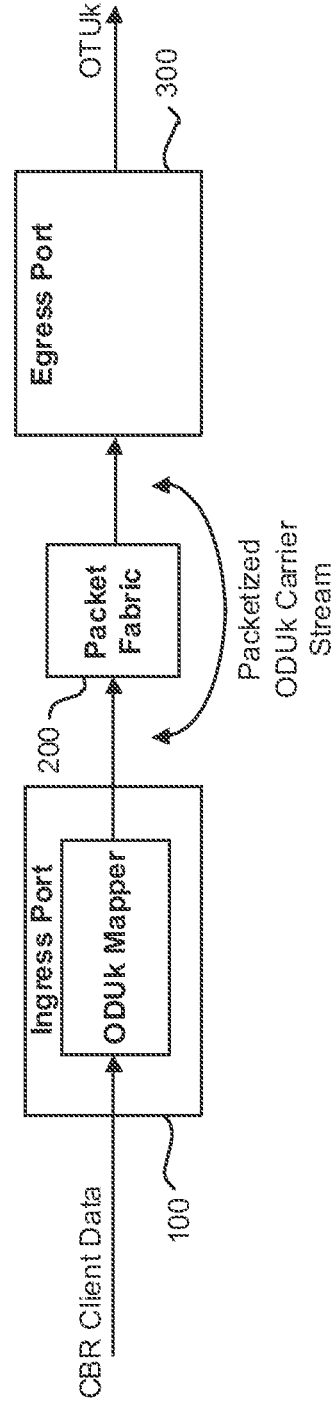
FIG. 4 illustrates a network element with an ODUk mapper at an egress port.

Note that FIG. 3 illustrates an OTN multiplexing application. However, OTN also specifies using GMP or AMP to map CBR clients into a generated ODUk in an analogous procedure. As is shown in FIG. 4, the multiplexing block is replaced with a mapping block. For simplicity, the mapper is usually located at the ingress port.

Figure 5:
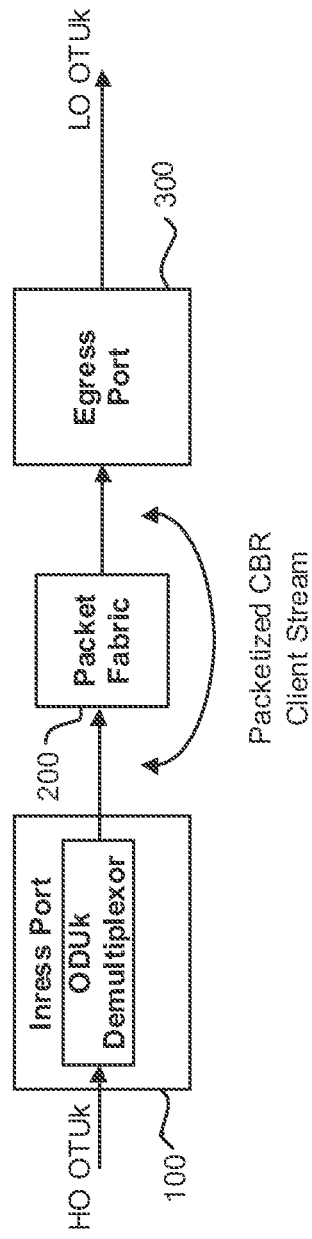
FIG. 5 illustrates a network element with an ODUk demultiplexer at an ingress port.

The opposite functionality is also required where a node demultiplexes a set of LO ODUk's from a HO ODUk as is shown in FIG. 5. The HO OTUk is input on the ingress port 100. The LO ODUk's which were previously multiplexed into the HO ODUk via GMP or AMP is extracted. The rate of the demultiplexed LO ODUk, relative to the HO ODUk carrier, is encoded in the GMP or AMP justification control bytes. A method is provided for interpreting the GMP/AMP overhead and in combination with the rate of the HO ODUk carrier to deduce the rate of the LO ODUk. The resulting LO ODUk's are then segmented and sent across the packet fabric 200 for switching or routing. Finally, the LO OTUk's are transmitted out one or more egress ports 300.

Figure 6:
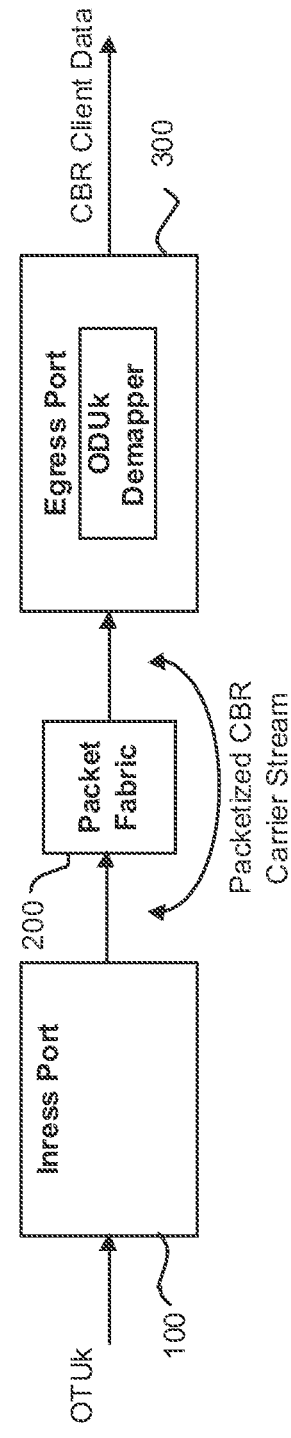
FIG. 6 illustrates a network element with an ODUk demapper at an ingress port.

Demapping a client from an ODUk is similar to the demultiplexing function with the demultiplexer replaced by a demapper 100 as is shown in FIG. 6. For simplicity, the demapper is usually located at the ingress port.

In the previous paragraphs making reference to FIGS. 2-6, OTN mapping/demapping and multiplexing/demultiplexing are described. In an alternative embodiment, the location of mapper can be located at the egress port and the demapper can be located at the ingress port.

Figure 7:
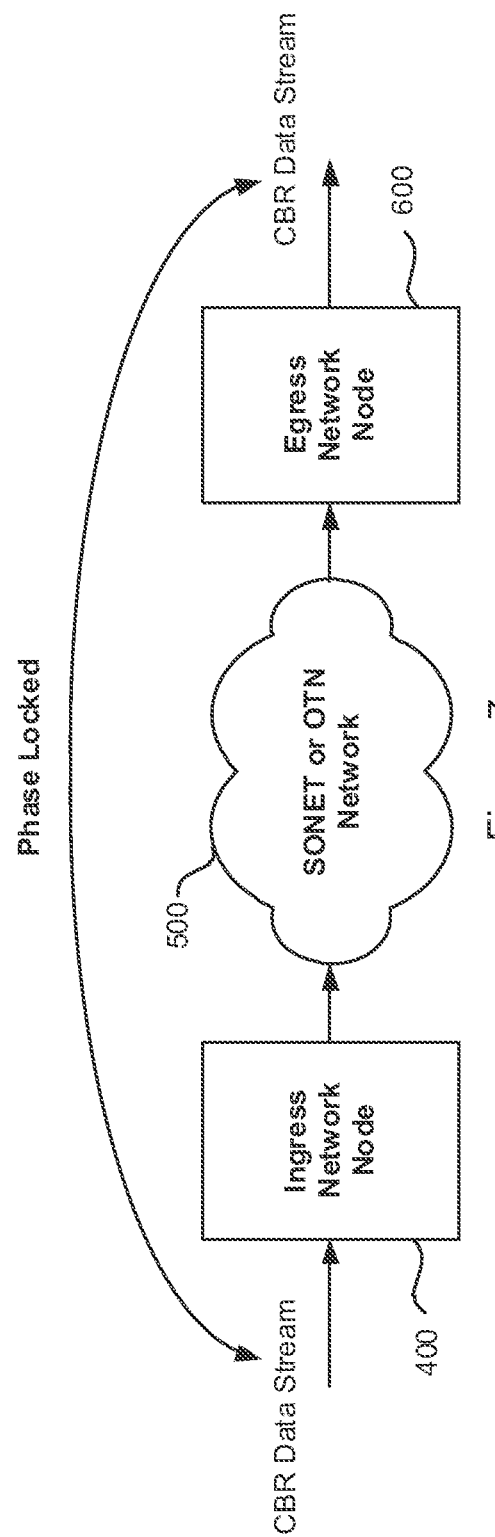
FIG. 7 illustrates a CBR client transported over a SONET/SDH or OTN network.

FIG. 7 shows a CBR client being transported over a telecommunications network. The ingress 400 and egress 600 NEs are inter-connected by a CBR carrier such as SONET/SDH or OTN links 500. The number of potential CBR client protocols is virtually limitless. A flexible means of accommodating a wide range of CBR client rates is to map the CBR clients into GFP frames. Arbitrary CBR clients can be mapped into GFP-F frames (for example, 8b10b clients can be mapped into GFP-T frames). At the egress network node 600, the payload of the GFP frames is re-assembled into a continuous CBR client stream.

The OTN specification also provides the AMP and GMP procedures for mapping CBR clients into OTN frames. Using AMP or GMP, the intermediate step of mapping the CBR signal into GFP frames is skipped and the CBR client is mapped directly into the OTN frames at the ingress node 400. At the egress node 600, the GMP mapped payload is extracted and reassembled into a continuous CBR client stream.

From a phase/frequency signaling point of view, the AMP method can be thought of as a degenerate form of GMP, where the variance in amount of data signaled is limited to −2, −1, 0, and +1 byte from a nominal value. GMP oriented processing block can work in AMP setting by converting the AMP justification controls to an equivalent GMP byte count.

Figure 8:
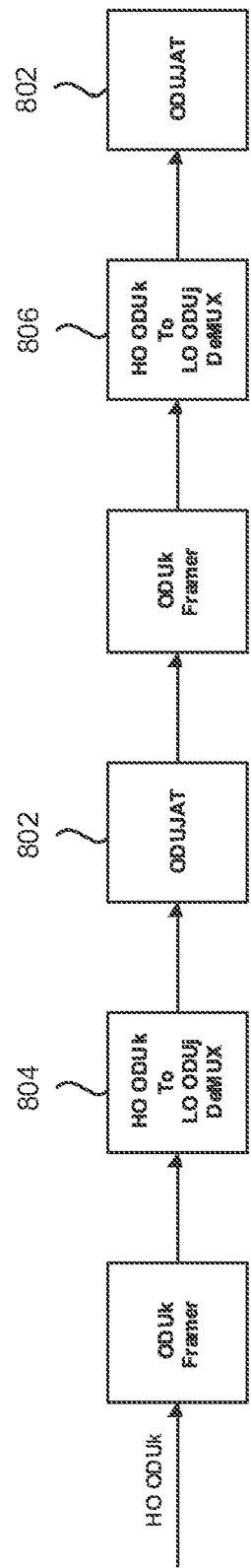
FIGS. 8 and 9 illustrate multiple levels of multiplexing, in accordance with an embodiment.
Figure 9:
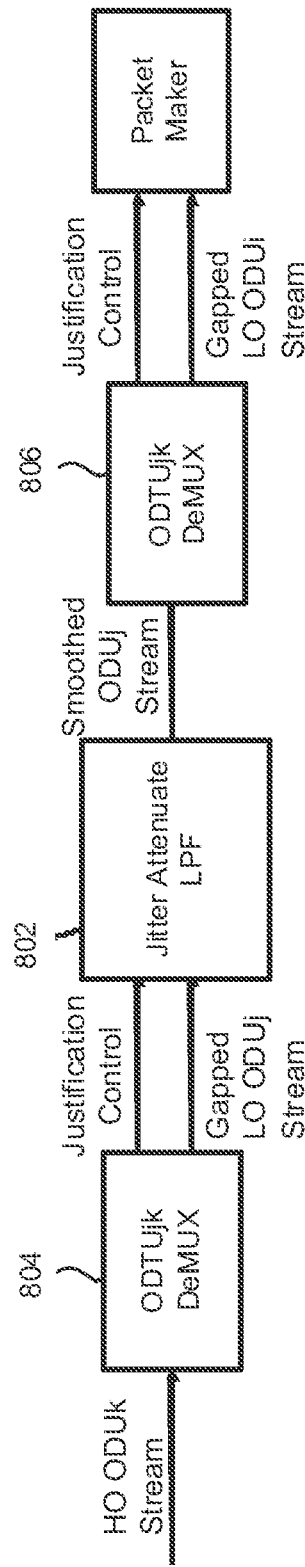

FIGS. 8 and 9 illustrate multiple levels of multiplexing/demultiplexing. For example, a node generates an ODU0 and multiplexes it into an ODU1, and then transmits this signal as an OTU1. At the next node, the ODU1 multiplexes again into a high order ODU2 for transmission through the network.

At the demultiplexing node, as each layer is demultiplexed the overhead columns of the different layers process with respect to each other. The precession of the overhead columns of the various ODU layer, can beat over time, and impart low frequency noise tones in the spectrum of the lower order signal. As the multiple layers are demultiplexed, these tones may become additive. As a signal traverses a network, it may be multiplexed and demultiplexed a number of times. Since the noise adds at each node, the signal may accumulate so much noise that it no longer meets jitter specifications at the final demultiplex stage. Therefore, a method to reduce the impact of this demultiplexing jitter is required.

In an embodiment a ODUk Jitter Attenuator block (ODU-JAT) 802 is provided. The ODUJAT 802 is intended to comply with the ODUkP to CBRx adaptation sink functions ODUkP/ODU[i]j_A_Sk and ODUkP/ODUj 21_A_Sk in G.798. A demuxed ODUj/i is processed with a filter. For example, a 300 Hz desync filter having a maximum 0.1 dB of peaking provides a recovered ODCp clock that has jitter and wander within the limits specified in G.8251. At each stage of OTN demux 804, 806, the ODUk/j overhead of the subsequent stage leaves gaps in the recovered ODUj/i stream. In certain aspects, this gapping is 16 bytes every row, with each row containing up to 3808 bytes of ODUj/i data depending on the number of parent timeslots used. Although this gapping would be sufficiently filtered by a single 300 Hz desync filter following both demux stages, the possibility of beating between the two gapping rates exists. Depending on the PPM offsets from nominal of the ODUk and ODUj streams, the aggregate gapping period could align at a beat frequency well below the 300 Hz desync filter cutoff of the filter in the Packet Maker in FIG. 9. ODUi stream jitter frequency would therefore exist within the passband of ODCp clock recovery and would be transferred as jitter into the subsequent client demap or ODUi transmission.

To deal with the possibility of this beating and to comply with industry standards (such as G.798 and G.8251), a 300 Hz desync filter is placed between pairs of demux stages. This filtering is achieved by enqueuing each demuxed stream into a separate FIFO, and where the subsequent FIFO dequeue operations has been filtered to ensure compliance with industry standards (such as G.8251) for jitter and wander. The FIFO fill levels are monitored, filtered and converted to a control input driving a precision scheduler which dequeues the FIFO at the ODUj/i rate. Thus, the filtered fill level controls a precision scheduler. The ODUJAT is described in more detail with respect to FIG. 26.

Figure 10:
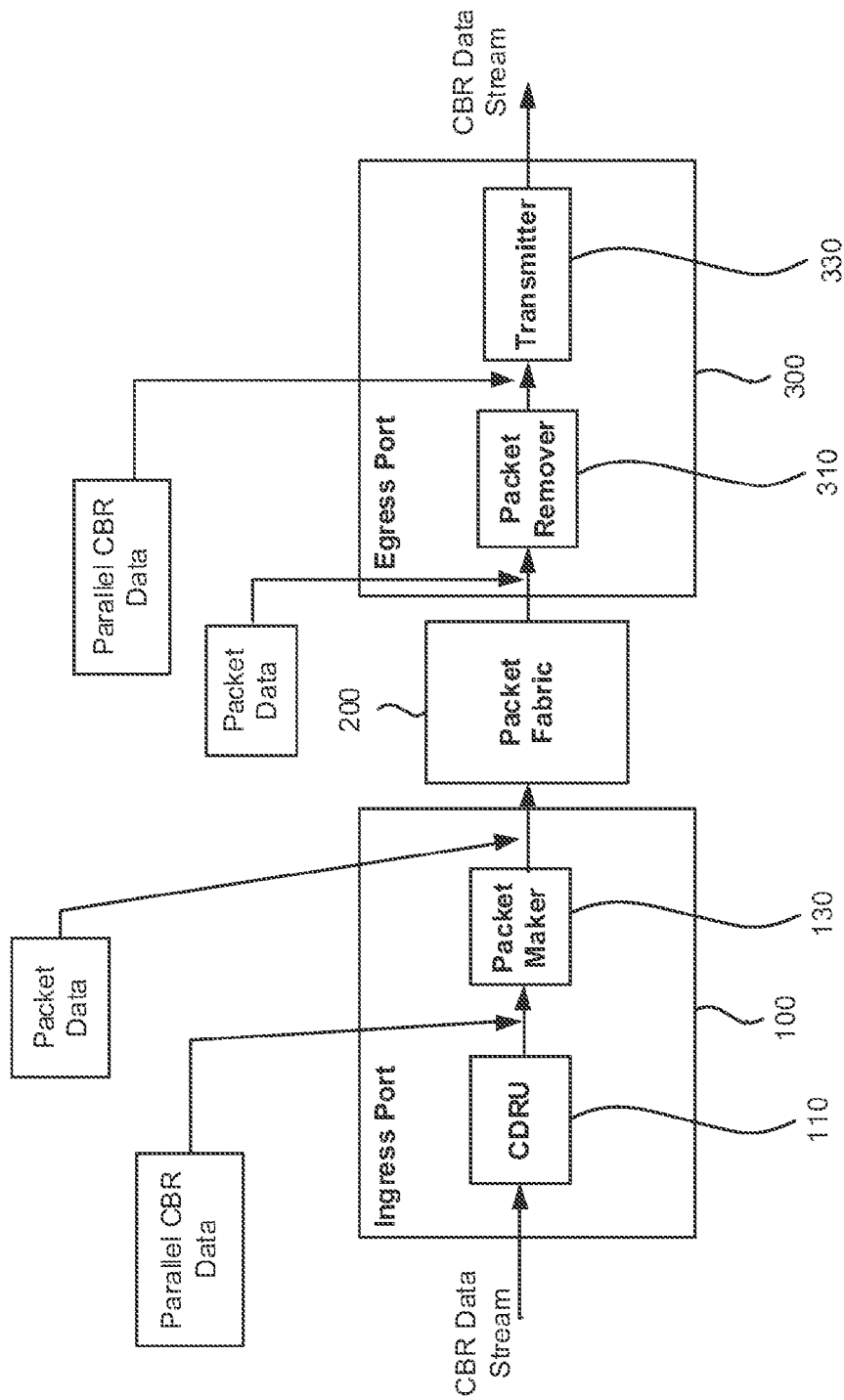
FIG. 10 illustrates a generalized network packet switching element.

FIG. 10 illustrates a known and generalized network packet switching element. At the ingress port 100, an input interface, for example a serializer-deserializer (SERDES) clock and data recovery unit (CDRU) 110, receives the incoming serial CBR data stream and reformats it into a parallel data bus. The CBR data is then divided into packets by the packet maker block 130 in a format that can be switched by the packet fabric 200. At the egress node 300, the packet remover 310 regenerates the parallel CBR data stream and sends it on to the SERDES transmitter 330 where it is serialized and retransmitted.

In the known approach of FIG. 10, to ensure that the outgoing CBR data at the egress port 300 is phase-locked to the incoming CBR data at the ingress port 300, phase information must either be passed through the packet fabric 200 along with the data or recovered in the egress port 300. This requirement exists since phase information is generally lost during the packet generation process. Using an out-of-band signaling mechanism to transfer phase information add complexity to the network element. Another known method for controlling the rate of the CBR data stream at the egress port to monitor the depth of a FIFO holding the CBR data stream at the egress port. A third known approach is to monitor packet arrive times to deduce the rate of the CBR data stream. The latter two approaches have the drawback of being affected by packet delay variation in the fabric which will introduce jitter into the outgoing CBR data stream.

Figure 11A:
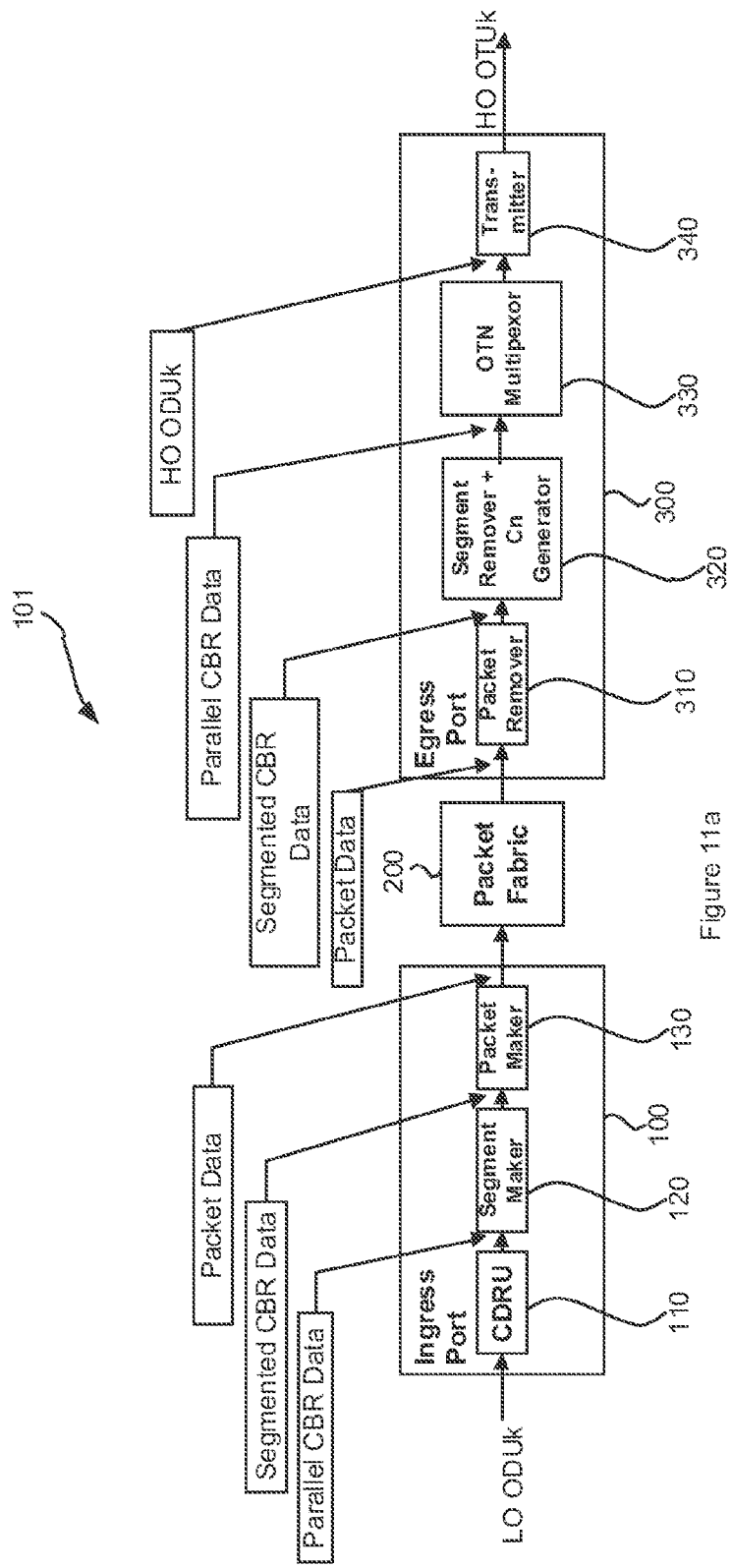
FIG. 11A and FIG. 11B illustrate an implementation for transporting CBR data through a packet fabric.

FIG. 11a illustrates a network packet switching element 101 implementing a multiplexing operation. At the ingress port 100, CDRU 110 receives the incoming OTU CBR client stream and reformats it into a parallel data bus. The ODU CBR client then enters a segment maker block 120 and a packet maker block 130 which first split the CBR data into fixed sized segments and then wrap the segments into packets that can be switched in the packet fabric 200. At the egress node 300, the packet remover 310 and segment remover 320 remove the packet wrapper and reassemble the data segments into a parallel CBR data stream. The Cn generator 320 computes a CBR client rate value Cn which is used for generating AMP or GMP justification Control values at OTN Multiplexor 330. Cn can be generated from known method previous described. The generated HO ODUk is then sent to the SERDES transmitter 340 where it is serialized and transmitted.

Figure 11B:
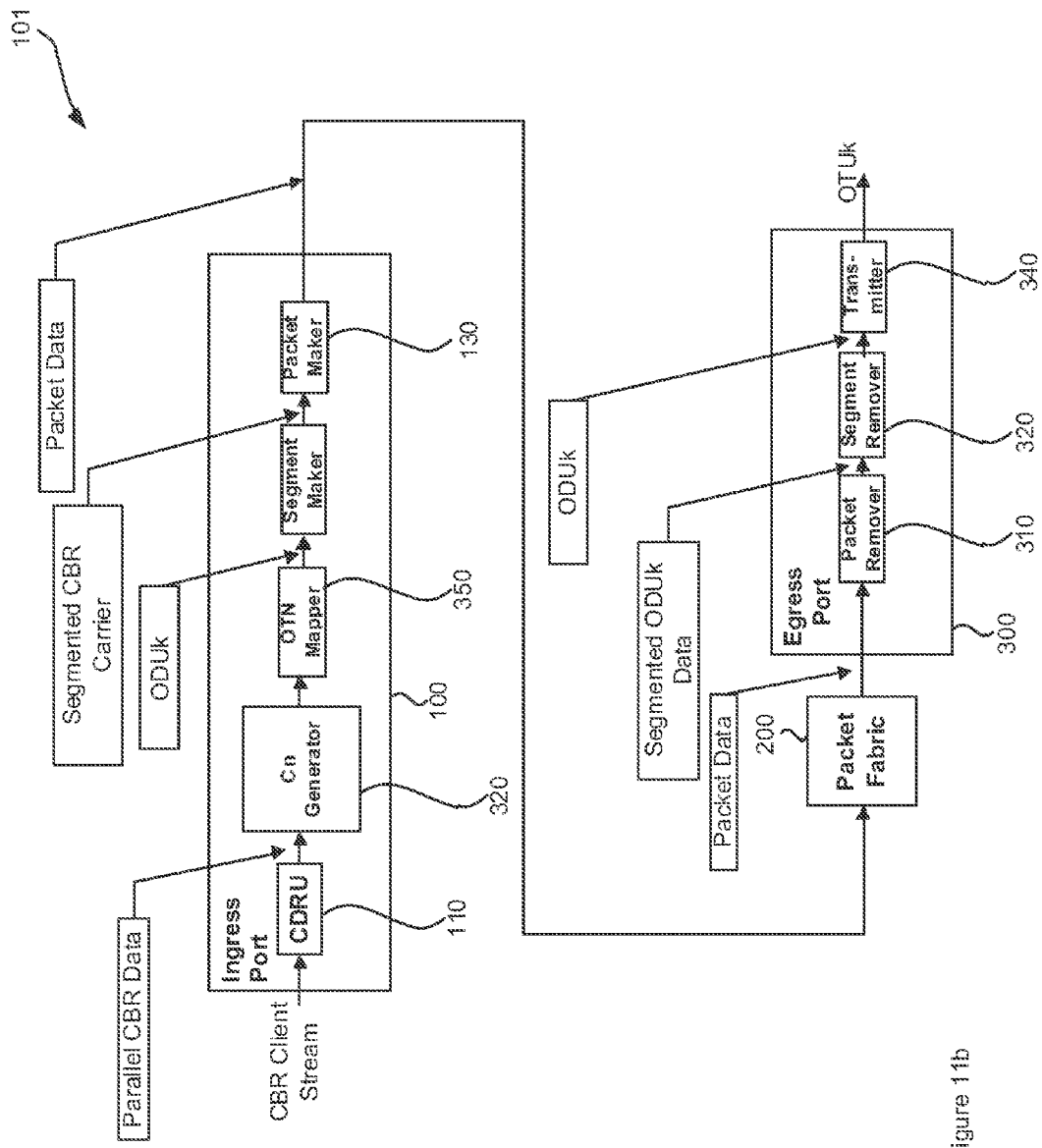

FIG. 11b illustrates a network packet switching element 101 implementing a mapping operation. At the ingress port 100, CDRU 110 receives the incoming CBR client stream and reformats it into a parallel data bus. The Cn generator 320 computes a CBR client rate value Cn which is used for generating AMP or GMP justification Control values at OTN Mapper 350, which produces an ODUk CBR carrier stream. The ODUk CBR carrier then enters a segment maker block 120 and a packet maker block 130 which first split the CBR data into fixed sized segments and then wrap the segments into packets that can be switched in the packet fabric 200. At the egress node 300, the packet remover 310 and segment remover 320 remove the packet wrapper and reassemble the data segments into a parallel CBR carrier stream. The ODUk carrier is then sent to the SERDES transmitter 340 where it is serialized and transmitted. The rate of the ODUk carrier may be controlled by known method previous described.

Figure 12A:
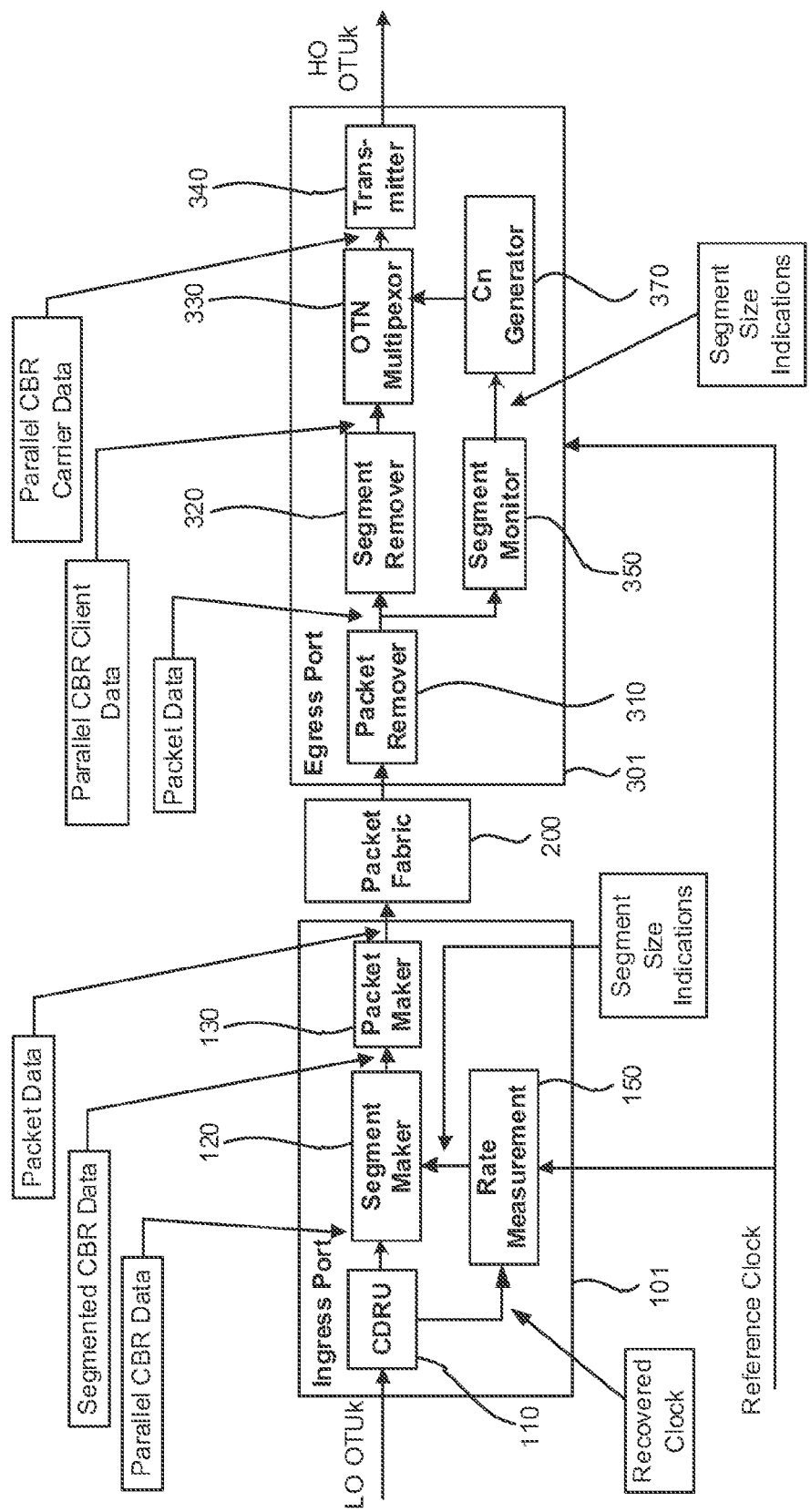
FIG. 12A, FIG. 12B, and FIG. 12C illustrate an enhanced network element, according to one exemplary embodiment of the disclosure.

An enhanced network element implementing a multiplexing operation is shown in FIG. 12a, according to one exemplary embodiment of the disclosure. Advantageously, adding two additional blocks to the network element shown in FIG. 11a, one in the ingress node 100 and one in the egress node 300, enables an efficient way of passing this timing information across the fabric without needing an out-of-band mechanism and is also insensitive to packet delay variations at the fabric 200.

An additional rate measurement block 150 at the ingress node 101 measures the rate of the incoming CBR client stream relative to a local reference clock. The relative rate is converted into size indications used by the segment maker 120. Rather than making segments that are all the same size, the segment maker 120 will make segments that are either at a base size (equals C bytes), base plus one byte (C+1 bytes), or base minus one byte (C−1 bytes) as indicated by Segment Size indications received from the rate measurement block 150. A packet maker 130 will then convert the segments into packets in a conventional manner, based on the size of the segments.

At the egress node 301, the packets are disassembled by packet remover 310 to reproduce the segments, which are then fed to segment remover 320 which regenerates the parallel CBR client data stream. Segment monitor 350 then measures the size of the incoming segments and sends the segment size indications (C, C+1, C−1) on to the Cn generator block 370. The Cn generator 320 uses the size indications to compute a CBR client rate value Cn, which is used for generating AMP or GMP justification Control values at OTN Multiplexor 330. The value of Cn increases or decreases such that it locks the frequency and phase of the CBR client stream multiplexed into the CBR carrier stream to that of the original CBR client stream at the ingress node. In this way, the ingress and egress CBR client streams are phase-locked. The SERDES transmitter 330 serializes and retransmits the CBR carrier data stream.

Figure 12B:
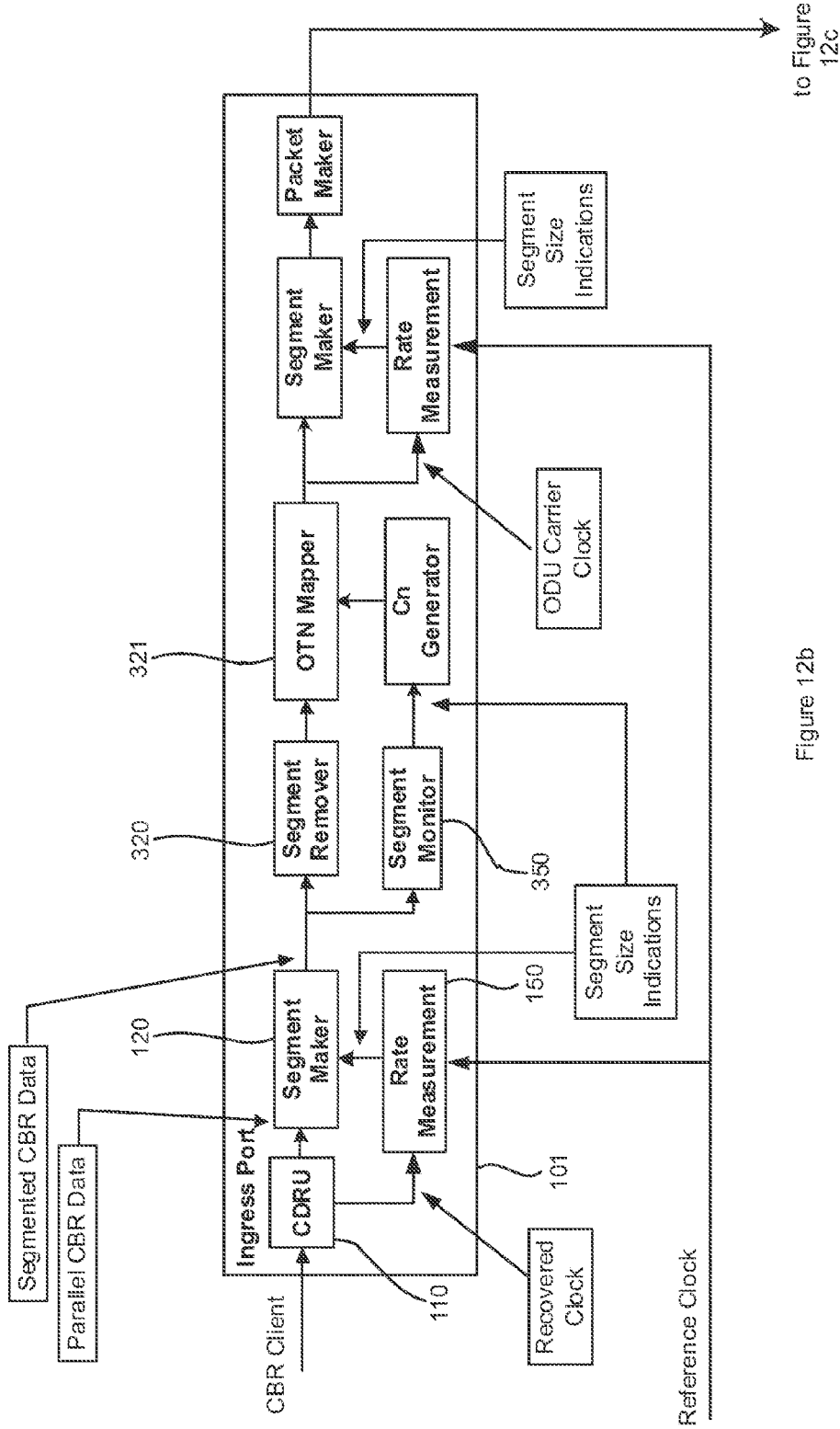
Figure 12C:
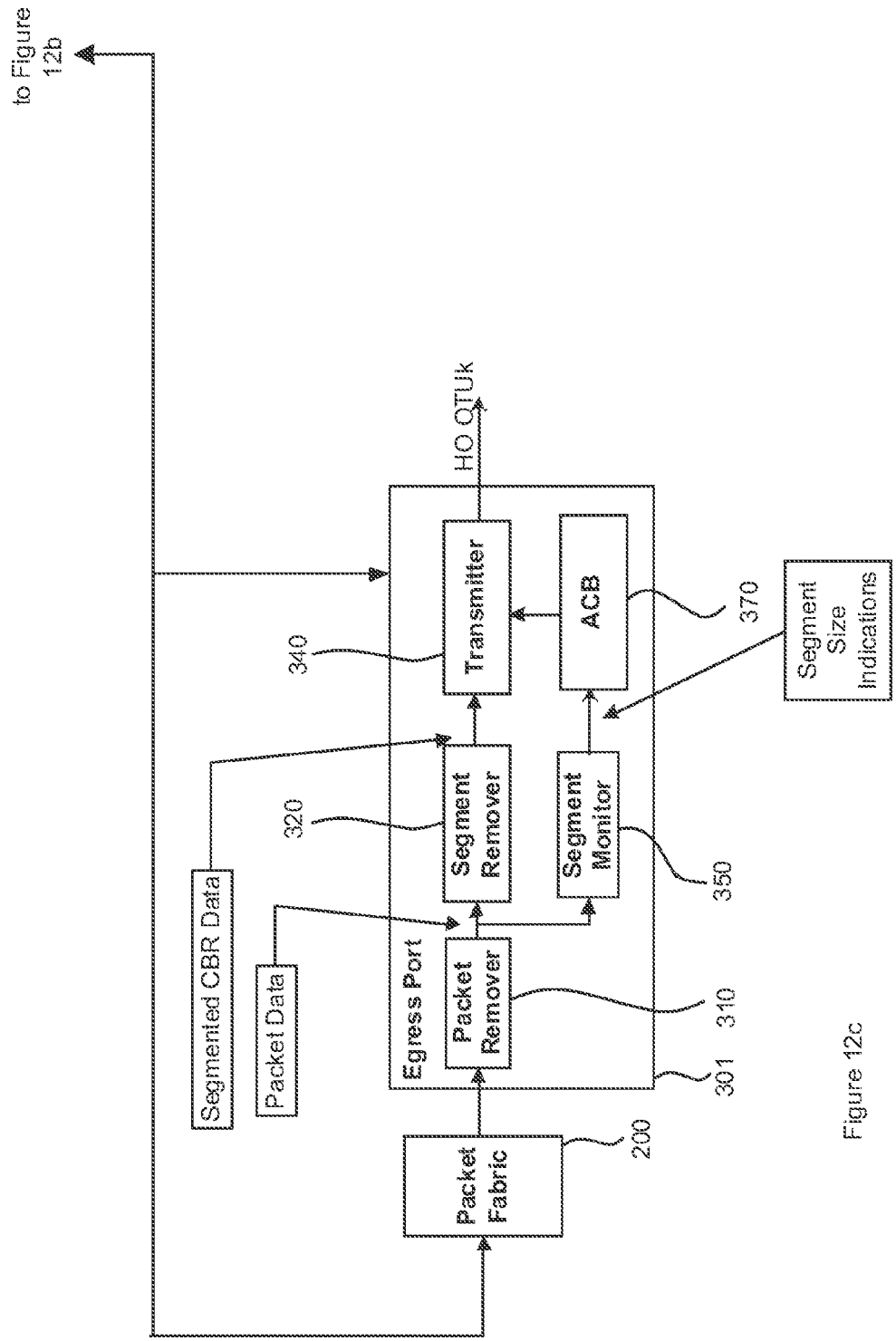

An enhanced network element implementing a mapping operation is shown in FIG. 12b and FIG. 12c, according to one exemplary embodiment of the disclosure. Advantageously, adding additional blocks to the network element shown in FIG. 11b enables an efficient way of passing this timing information across the fabric without needing an out-of-band mechanism and is also insensitive to packet delay variations at the fabric 200.

An additional rate measurement block 150 at the ingress node 101 measures the rate of the incoming CBR client stream relative to a local reference clock. The relative rate is converted into size indications used by the segment maker 120. Rather than making segments that are all the same size, the segment maker 120 will make segments that are either at a base size (equals C bytes), base plus one byte (C+1 bytes), or base minus one byte (C−1 bytes) as indicated by Segment Size indications received from the rate measurement block 150. The segment remover 320 which regenerates the parallel CBR client data stream. Segment monitor 350 then measures the size of the incoming segments and sends the segment size indications (C, C+1, C−1) on to the Cn generator block 370. The Cn generator 320 uses the size indications to compute a CBR client rate value Cn, which is used for generating AMP or GMP justification Control values at OTN Mapper xxx. The value of Cn increases or decreases such that it locks the frequency and phase of the CBR client stream mapped into the CBR carrier stream to that of the original CBR client stream. In this way, the ingress and egress CBR client streams are phase-locked.

In an alternate embodiment, it is possible bypass the Segment Maker 120 and Segment Remover 320 in FIG. 12b. In that case, Packet size indications generated by the Rate measurement block 150 will be fed directly to the Cn Generator. The benefit of having the Segment Maker 120 and Segment Remover 320 is that the datapath between these blocks can be a packet bus.

The output of the OTN mapper 321 is a CBR carrier stream. The rate measurement block 150 measures the rate of the CBR carrier stream relative to a local reference clock. The relative rate is converted into size indications used by the segment maker 120. Rather than making segments that are all the same size, the segment maker 120 will make segments that are either at a base size (equals C bytes), base plus one byte (C+1 bytes), or base minus one byte (C−1 bytes) as indicated by Segment Size indications received from the rate measurement block 150. A packet maker 130 will then convert the segments into packets in a conventional manner, based on the size of the segments.

At the egress node 301, the packets are disassembled by packet remover 310 to reproduce the segments, which are then fed to segment remover 320 which regenerates the parallel CBR carrier stream. Segment monitor 350 then measures the size of the incoming segments and sends the segment size indications (C, C+1, C−1) on to the ACB block xxx. Finally, the ACB decodes the packet size indications into the original data rate. Using the decoded rate information, the ACB makes the transmitter 330 speed up or slow down its frequency relative to the local reference clock such that it matches the frequency and phase of the original CBR carrier stream at the ingress node. In this way, the ingress and egress CBR carrier streams are phase-locked. The SERDES transmitter 330 serializes and retransmits the CBR carrier stream.

It should be noted that in this example the ingress port 101, the packet fabric 200 and the egress port 301 in FIGS. 12a and 12b are all part of the same network element, and as such, share the same local reference clock, as shown.

In FIGS. 11a, 11b, 12a and 12b the packets are assembled from the appropriately sized segments based on whatever protocol/bus is necessary to traverse the particular fabric used. The size of the packet will typically differ from the size of the segment due to overhead added for the purpose of traversing the fabric. Only the size of the segment, which is the payload of the packets, is of import. The size of the packet itself is irrelevant to frequency and phase signaling.

It should also be noted that the segment and packet makers need not be separate. For ease of understanding, illustrated is the segment maker 120 as a block separate from the packet maker 130, for the purpose of indicating that the packet making function of wrapping the bits of the segmented data need not change in order to produce packets configured to traverse the packet fabric 200, and in particular it is not necessary to insert phase information into the overhead of each packet. Accordingly throughout this specification, the term packet size should be construed to mean the size of the payload in the packets or, equivalently, the size of the segments. The size indication is dependent on the size of the payload in each packet, which is also the size of the segment once the packet overhead is removed. Thus, packet size and segment size can be used inter-changeably.

The embodiments described above use packet size variation of plus and minus one byte. However, the disclosure is not limited to these packet sizes. In some applications, it may be convenient to use packet size variation of N bytes and the disclosure is easily extensible to this situation. In this case, the rate measurement block would indicate to the packet maker to generate packets size either C bytes, C+N bytes, or C−N bytes and the segment monitor and the ACB would be aware of the size of the variation in order to properly adjust the rate of the CBR data stream.

As FIG. 12a illustrates, the phase of the original CBR client stream is passed through the packet fabric 200 with the data using variable sized packets where the size of the packets indicates the relative phase of the data. Bandwidth is not lost to the insertion of overhead bytes to carry timestamp information or other timing words. Poor performance found using FIFO adaptation methods due to packet delay variation through the packet fabric may be reduced.

In certain embodiments, the blocks required for GMP multiplexing/mapping are described. While these descriptions reference an incoming CBR data stream, the principles are applicable for incoming LO ODUk data streams and can be used equivalently for that client.

Figure 13:
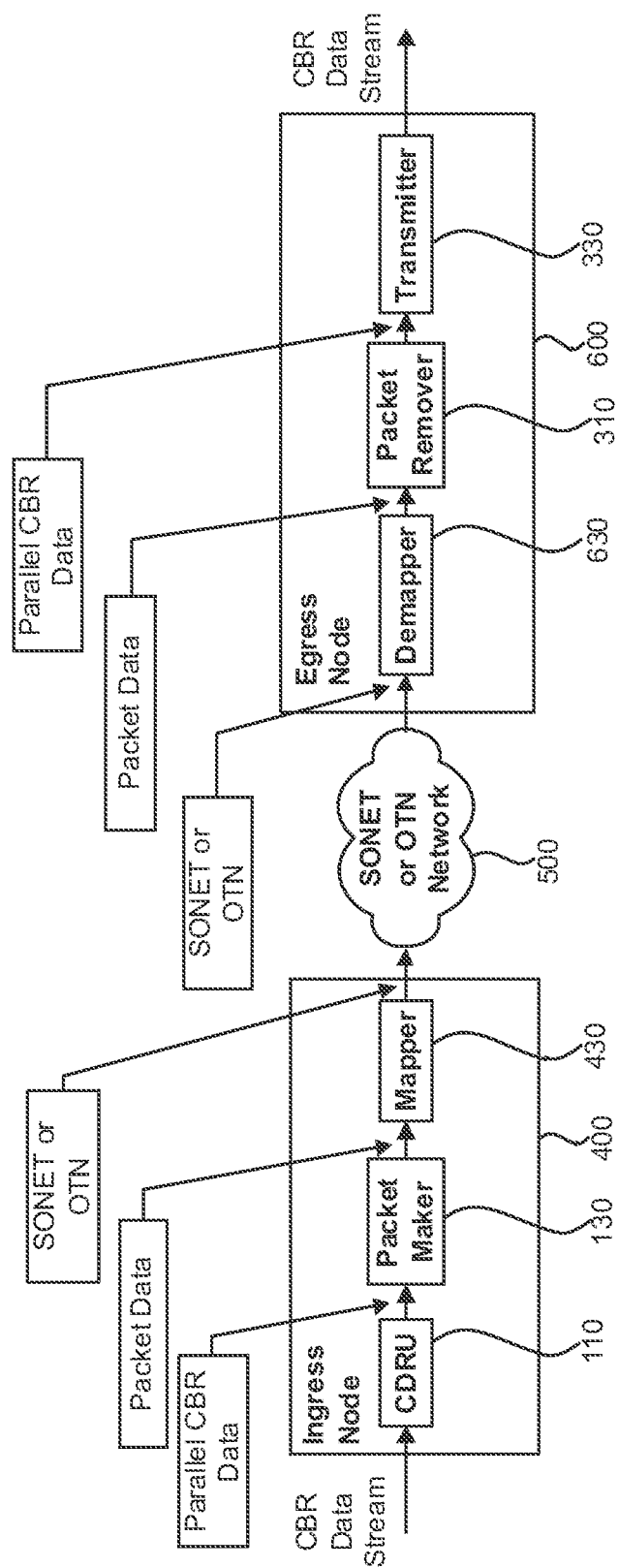
FIG. 13 illustrates an implementation for transporting CBR data through a WAN network via SONET/SDH or OTN.

A known generic implementation for transporting CBR data through a WAN network via SONET/SDH or OTN is shown in FIG. 13. At the ingress node 400, a SERDES CDRU 110 receives the incoming serial CBR data stream and forms a parallel data bus. The CBR data then enters a packet maker block 130 which segments the CBR data into fixed sized packets for the mapper block 430. The mapper block 430, using GFP or any other packet framing protocol, then takes the incoming packet data, frames it, and inserts the framed data into a higher level carrier protocol such as SONET or OTN. Finally, the ingress node transmits the SONET or OTN into the WAN 500.

At the egress node 600, the opposite function is performed. The incoming SONET or OTN enters the demapper block 630 where the GFP frames are taken out of the carrier protocol. The GFP frames are decoded to remove the packet data from the GFP framing which is sent on to the packet remover 310. The packet remover 310 converts the packet data to a parallel CBR data stream which can then be serialized and transmitted by the local SERDES transmitter 330. At the output, the original CBR stream received by the mapping node.

In the approach of FIG. 13, to ensure that the incoming CBR data at the ingress node is phase-locked to the CBR data output by the egress node, phase information is passed along with the data through the SONET or OTN WAN or recovered in the egress node. This requirement exists since the phase information of the original CBR stream is lost during the packet generation process.

Figure 14:
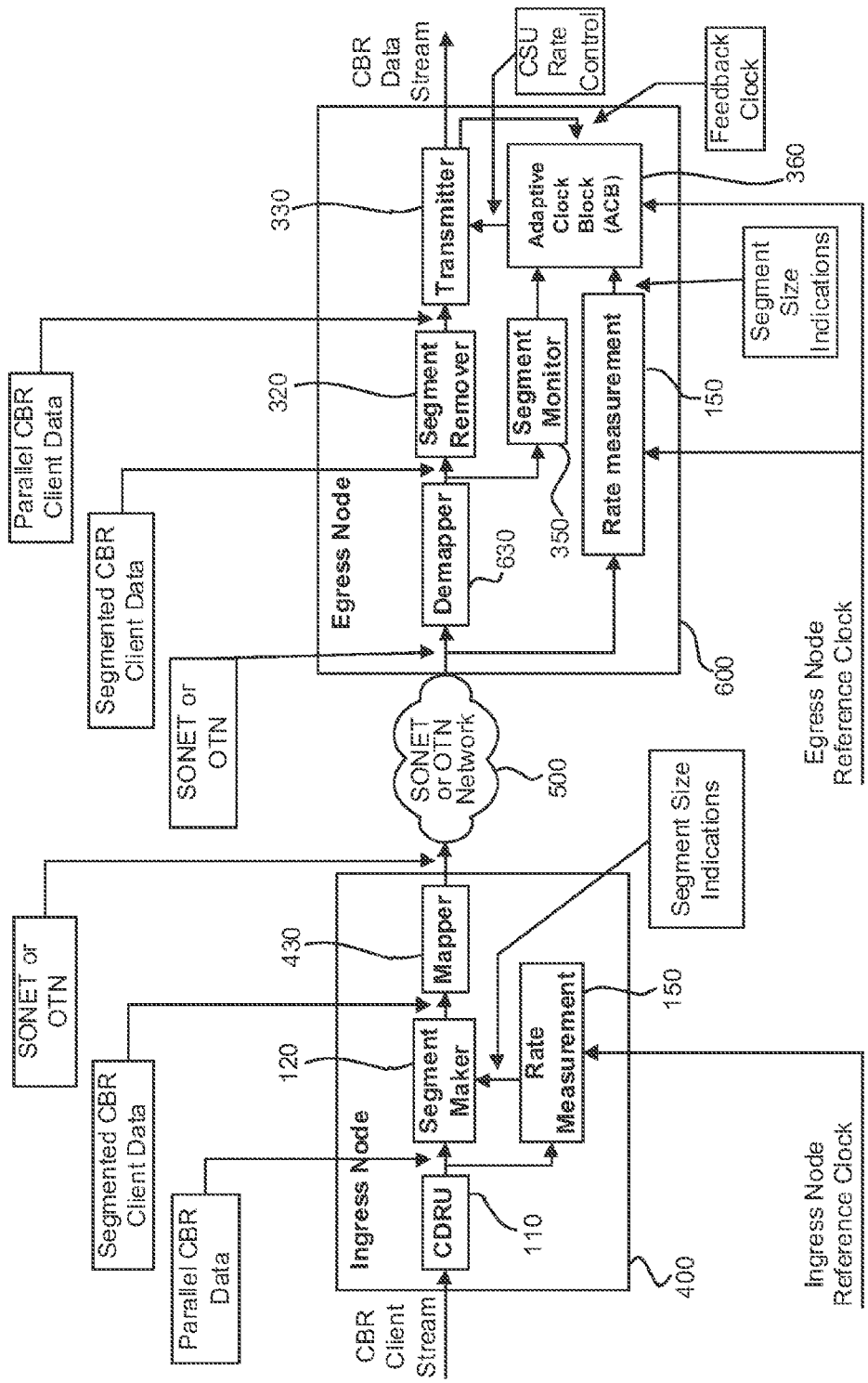
FIG. 14 illustrates an enhanced implementation for transporting CBR data through a WAN network via SONET/SDH or OTN, according to an exemplary embodiment of the disclosure.

An enhanced system is shown in FIG. 14, according to an exemplary embodiment of the disclosure. At the ingress node 400, a rate measurement block 150 is added to the system. This block measures the rate of the incoming CBR client relative to the local reference clock and converts this information into packet size indications used by the segment maker block 120. Rather than making segments that are all the same size, the segment maker will make segments that are either base size (C bytes), base plus one byte (C+1), or base minus one byte (C−1) as indicated by the rate measurement block 150. At the mapper block 430, the packet sizes are maintained in the framed data (via GFP or other framing protocol) when it is inserted into the higher level SONET or OTN carrier. Since the ingress node 400 is generating the CBR carrier, its frequency is locked to the ingress node's local reference clock.

At the egress node 600, two pieces of clock or rate information are used to regenerate the original CBR client stream, namely the relative rate of the SONET or OTN carrier to the egress node reference clock, and second, the relative rate of the CBR client stream to the SONET or OTN carrier. With these two relative rates, the relative rate of the CBR client to the egress node reference clock can be derived. As the CBR carrier enters the egress node 600, via a carrier interface block (not shown), which sends the signal to both a demapper 630 and a rate measurement block 150. The rate of the CBR carrier is measured using a rate measurement block 150. This block 150 in the egress node 600 gives the relative frequency of the carrier SONET or OTN to the egress node reference clock and in doing so indirectly gives the relative frequency of the ingress node reference clock to that of the egress node reference clock. Because SONET is a synchronous network, the rate of the SONET Path layer (SDH High-Order Path layer) is measured and not the rate of the STS-N (STM-M) frames. The output of this rate measurement block 150 is segment size indications that are sent to the Adaptive Clock Block (ACB) 360. The carrier data also goes through the demapper block 630 which takes the framed data out of the carrier and de-maps the framed data into a segmented data stream. Since the GFP framing retained the segment sizes from the mapping node, the segment stream will again consist of segments that are sized C, C+1, or C−1 bytes. The segment monitor 350 detects these packet sizes and sends this data to the ACB 360 as well. Therefore, the ACB 360 has the two pieces of information it uses to regenerate the original CBR data stream with its exact original phase.

The rest of the data path includes the packet data going through the segment remover 320 to regenerate the parallel CBR data. This parallel data is then serialized and transmitted by the SERDES transmitter block 330.

As the implementation illustrates, the phase of the original CBR data stream is passed along with the data using variable sized packets where the variation in the size of the packets indicates the relative phase of the data. Using this method, no bandwidth is lost to the insertion of overhead to carry timestamp information or other timing words. Nor are we subject to the poor performance found using FIFO fill adaptation methods.

This embodiment of the disclosure was discussed with respect to a segment remover 320 and a segment monitor 350. This assumed that the demapper 630 removes any packet overhead which may have been inserted, to produce segmented CBR client data as its output. However, as discussed above these could have been labeled as packet remover and packet monitor respectively, as the size of, and the data within the packets are directly dependent on the segments, and the difference between the two are not crucial to understanding the operation of the different embodiments of the disclosure discusses herein. It should be recognized that if the demapper 630 produces packets, then the packet remover and a packet monitor would remove any packet overhead which may have been inserted (or alternatively in the case of a packet monitor, just ignore it, as it is the variation in the sizes which is important for producing the size indications).

Further, this embodiment of the disclosure was discussed using the example of packet size variation of plus and minus one byte. However, the disclosure is not limited to these packet sizes. In some applications it may be convenient to use packet size variation of N bytes and the disclosure is easily extensible to this situation. In this case, the rate measurement block would indicate to the packet maker to generate packets size either C bytes, C+N bytes or C−N bytes and the ACB would be aware of the size of the variation in order to properly adjust the transmitter.

As discussed, the above embodiments can employ a number of functional blocks including a rate measurement block, a packet maker block, a packet monitor block, and an Adaptive Clock Block (ACB). More details about how these blocks work and their interaction, according to non-limiting and exemplary embodiments, will be described below.

The rate measurement block 150 measures the relative rate of an incoming CBR data stream to a local reference clock. According to an embodiment of this disclosure, the nominal rate of the CBR data is programmed via two parameters. The first parameter is a measurement period in units of reference clock cycles (PKT_PERIOD). The second parameter is the number of CBR data bytes during the measurement period (PKT_SIZE). When calculating the PKT_SIZE parameter, the result can be a fractional value. In this case, it is simply rounded to the nearest integer for easier representation. Equation 1 illustrates how the PKT_SIZE is derived from the PKT_PERIOD.

$$\text{PKT\_SIZE} = \text{ROUND}\left(\frac{T_{ref} * \text{PKT\_PERIOD}}{T_{CBR}}\right) \quad \text{Equation 1}$$

$T_{ref}$ = reference clock period $T_{CBR}$ = CBR data byte clock period

In Equation 1 a rounding function is used to convert the fractional value to an integer value. This conversion function is used to get the best performance out of the control loop. In a variant embodiment the rounding function is replaced with a truncation or a ceiling function.

Given these parameters, the rate measurement block 150 looks for PKT_SIZE bytes of CBR data every PKT_PERIOD reference clocks. As noted above, in the general case, there is some error in this calculation as the reference clock period and the CBR data byte clock period are not integer multiples of each other. This nominal error (ϵnom) can be found in Equation 2.

$$\varepsilon_{nom} = \left(\frac{T_{ref} * \text{PKT\_PERIOD}}{T_{CBR}}\right) - \text{PKT\_SIZE} \quad \text{Equation 2}$$

$T_{ref}$ = reference clock period $T_{CBR}$ = CBR data byte clock period

Rearranging, we find $$\text{PKT\_SIZE} + \varepsilon_{nom} = \left(\frac{T_{ref} * \text{PKT\_PERIOD}}{T_{CBR}}\right) \quad \text{Equation 3}$$

$T_{ref}$ = reference clock period $T_{CBR}$ = CBR data byte clock period

ϵnom is simply the fractional remainder that gets lost in the rounding process and in the general case is not a rational fraction. Since it is not possible to easily represent irrational fractions, but the desire is for the method of the present disclosure to handle virtually any CBR data rate, an embodiment of the disclosure uses a feedback control loop to generate the packet size indications. Being a closed loop, any error introduced by rounding the PKT_SIZE is corrected for by the control loop. This gives the flexibility to handle any CBR rate.

Figure 15:
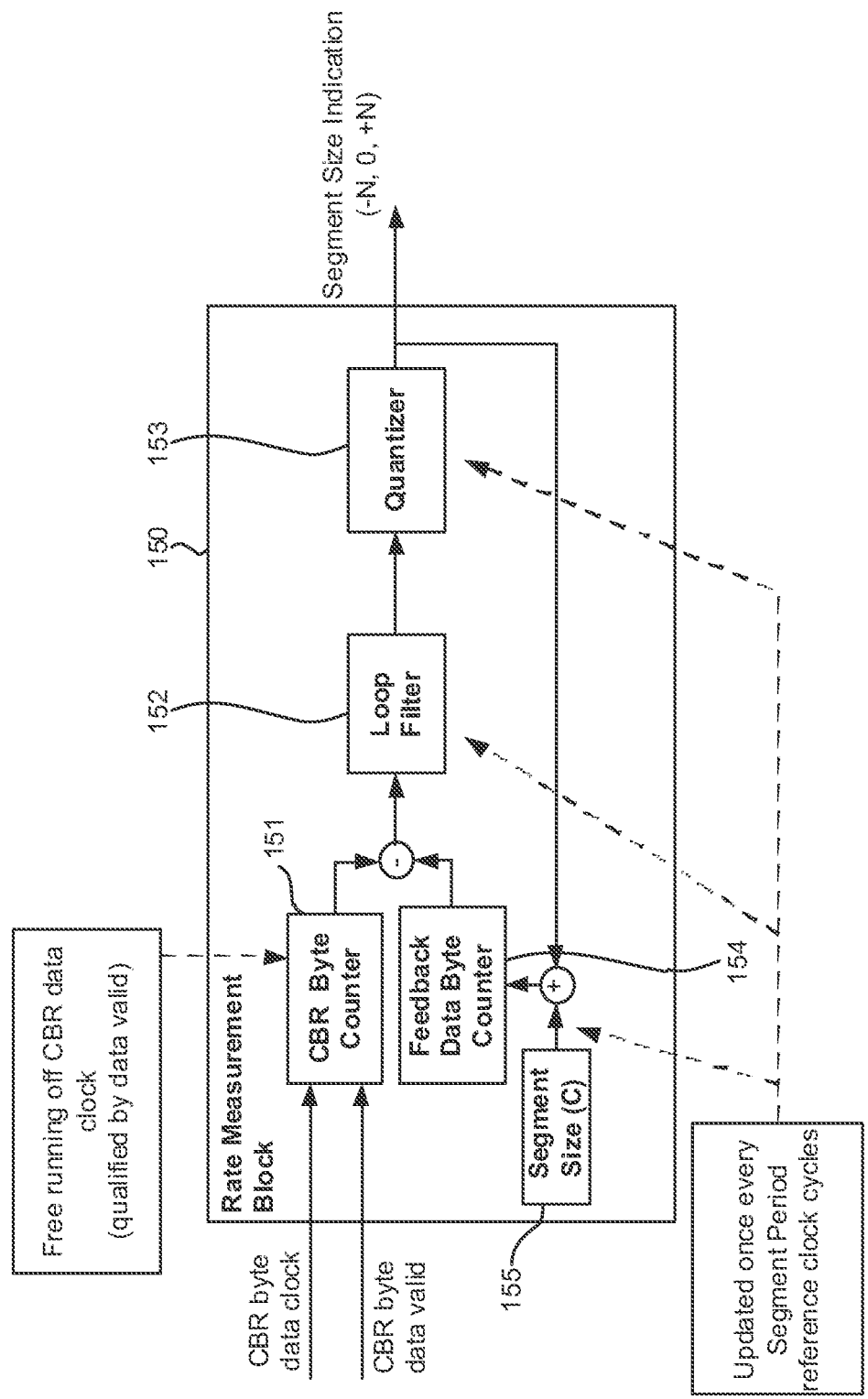
FIG. 15 illustrates an exemplary rate measurement block according to an exemplary embodiment of the disclosure.

An exemplary rate measurement block 150 according to an embodiment of the disclosure is shown in FIG. 15, in which the control loop is looking for PKT_SIZE bytes of CBR data every PKT_PERIOD reference clock cycles. As illustrated in FIG. 15, a free running CBR byte counter 151 runs off the CBR byte data clock and is qualified by a CBR data valid signal. The qualification with data valid allows the input data stream to be "gapped" where some CBR data cycles do not contain data. This CBR byte counter 151 measures the exact amount of phase coming in on the input CBR data path.

Also, a feedback byte counter 154 is incremented by PKT_SIZE (Segment Size (C) 155) plus the output segment size or packet size indication in bytes. The feedback counter update occurs once every PKT_PERIOD reference clock cycles. As well, the two data byte counters are compared to each other every PKT_PERIOD cycles and the difference is fed into a loop filter 152. Finally, the output of the loop filter is fed into a quantizer 153 and a new output value is generated, again, this occurs once per PKT_PERIOD reference clocks. The output of the quantizer, besides being sent back on the feedback path, is output as the packet (or segment) size indication to the packet maker block as shown in FIGS. 12a and 12b. This structure is effectively a Delta-Sigma Modulator (DSM).

Figure 16:
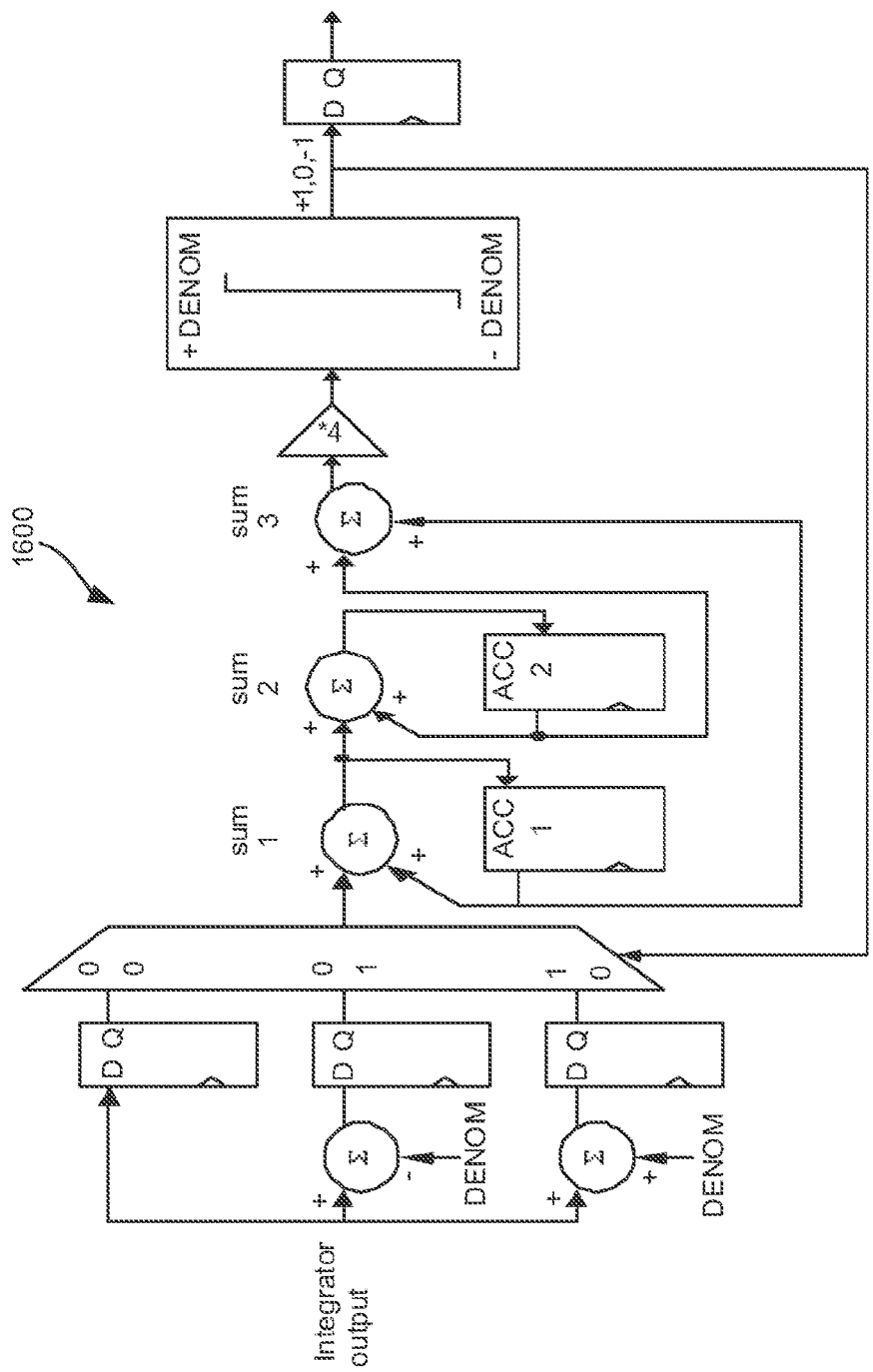
FIG. 16 illustrates a non-limiting exemplary example of a DSM circuit according to an embodiment of the disclosure.

A non-limiting exemplary example of a DSM circuit 1600 is illustrated in FIG. 16, according to an embodiment of the disclosure. The DSM 1600 is an exemplary circuit implementation of the block diagram of FIG. 15.

Since the feedback data byte counter is incremented by PKT_SIZE bytes plus the output of the DSM every PKT_PERIOD reference clock cycles, from Equation 3 we can predict that for a nominal CBR signal the time average value of the DSM output will be ϵnom. This relationship can be seen in Equation 4

$$\lim_{N \to \infty}\left(\frac{\sum_{i=0}^{N} \text{dsm\_out}}{N}\right) = \varepsilon_{nom} \quad \text{Equation 4}$$

The feedback control loop is used in this embodiment because ϵnom is generally not a rational fraction and the value is not necessarily represented using integers. However, because the received data counter is free running, phase will not be lost and over time the control loop will compensate for the input parameter error. Once the loop has stabilized, the output will average to exactly ϵnom even though ϵnom is an irrational number.

The output is exactly ϵnom only when the received CBR data stream is nominal relative to the local reference clock. (i.e., at the expected CBR rate—for example, according to the precise rate set by a standard relative to the local reference). If the CBR data rate is not nominal (some non-zero PPM offset from nominal), the output will be ϵact as shown in Equation 5 which is analogous to Equation 3 using the actual received CBR data rate.

$$\text{PKT\_SIZE} + \varepsilon_{act} = \left(\frac{T_{ref} * \text{PKT\_PERIOD}}{T_{CBR-act}}\right) \quad \text{Equation 5}$$

$T_{ref}$ = reference clock period $T_{CBR-act}$ = Actual CBR data byte clock period We note that the difference between ϵnom and ϵact is a direct measurement of the difference of the client from its nominal or expected rate (relative to the local reference clock).

According to an embodiment of the disclosure, the profile of the DSM output values are used to ensure that downstream blocks can efficiently find ϵact. The DSM is used to spread the noise of the signal to higher frequencies thereby making it easier for the downstream block to filter the signal and establish the average value (ϵact).

Figure 17:
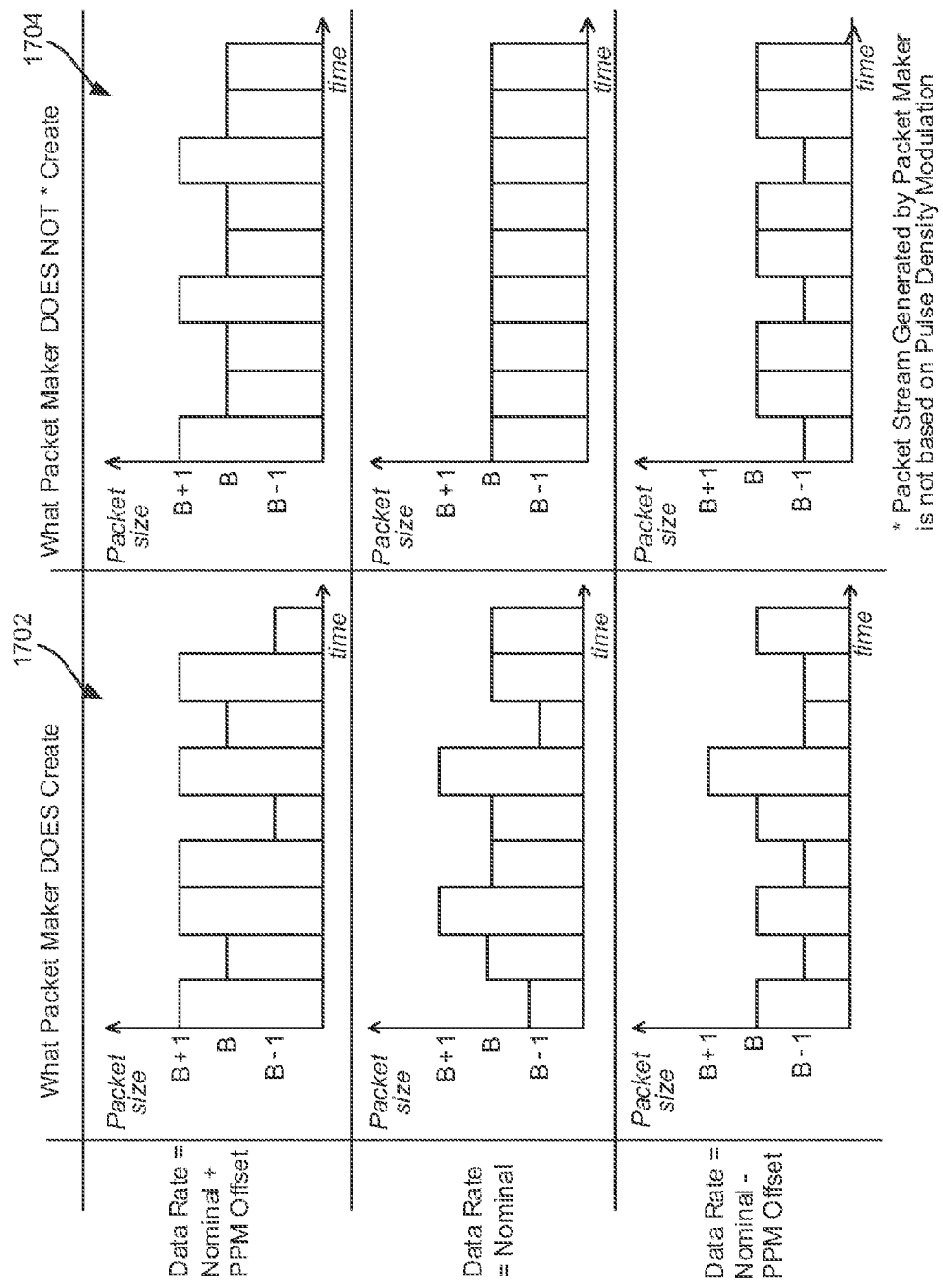
FIG. 17 illustrates some simplified examples of the patterns generated by the DSM and illustrates the noise shaping characteristics of the DSM, according to an embodiment of the disclosure.

FIG. 17 illustrates some simplified examples of the patterns 1702 generated by the DSM and also illustrates some examples of patterns 1704 not generated in this embodiment so as to illustrate the noise shaping characteristics of the DSM, according to an embodiment of the disclosure. Since the DSM shapes the noise to a relatively high frequency range, the time-average output value (ϵact) can be easily obtained via a simple low pass filter.

The output of the DSM and thereby the control loop is essentially a stream of +1, 0, −1 (or +N, 0, −N) indications which encodes the rate of the incoming CBR data stream relative to the local reference clock.

Although it is not a requirement, an embodiment of the disclosure uses a modified 3rd order DSM as the rate measurement control loop. This type of DSM is used in the rate measurement block for a number of reasons. The noise shaping ability of the 3rd order DSM is greater than that of a lower order DSM and will push the DSM's output signal noise to higher frequencies so that it can easily be filtered by downstream blocks. As well, the DSM is easily constructed to have three output states which is convenient for certain embodiments.

Other DSM types and orders can be used effectively by embodiments of the present disclosure. These include, but are not limited to alternate order DSMs (both higher and lower than our 3rd order structure), MASH DSMs, error feedback loops, and other similar structures. Other DSM implementations can also include a dither generator at the input of the DSM to further reduce any tones generated by the particular DSM implementation and are covered by the present disclosure.

As noted above, the DSM output is +1, 0, −1. However, the disclosure is not limited to this data set. For example, another embodiment takes the +1, 0, −1 and multiply by N bytes. In this case, the feedback value would be +N, 0, or −N and the packet maker would generate packets of size PKT_SIZE+N, PKT_SIZE, or PKT_SIZE−N. The disclosure covers the general case where the DSM output is multiplied by N, in the above described embodiment we simply set N=1 for convenience. However, other embodiments can use any set of output integers between X and Y, where X<0<Y. In this generalized case, any number of integers can be used, the minimum being two. A simple example being −1 and +1. Note that the selected set of integers need not be continuous.

In another implementation, an embodiment of the disclosure is comparing against a slightly-high or a slightly-low PKT_SIZE. In this case, the output packet size indications can use a generic set of values [0<X] or [−Y<0], respectively.

An embodiment of the control loop in the rate measurement block 150 can theoretically be described using a continuous-time linear approximation for each of the components in the loop. This approximation is valid because the time constants involved are generally small relative to the sample clock. The integrator is modeled using Equation 6

$$F(s) = \frac{1}{s}$$ Equation 6

The quantizer 153 in the loop provides a fixed gain as shown in Equation 7. Since the gain of this element is easily configured by changing the size of the quantizer accumulators, the quantizer gain is used to configure the overall loop bandwidth of the control loop.

$$K_{Quantizer}(s) = \frac{1}{Q}$$ Equation 7

Where:

$Q$ = gain of Quantizer

Figure 18:
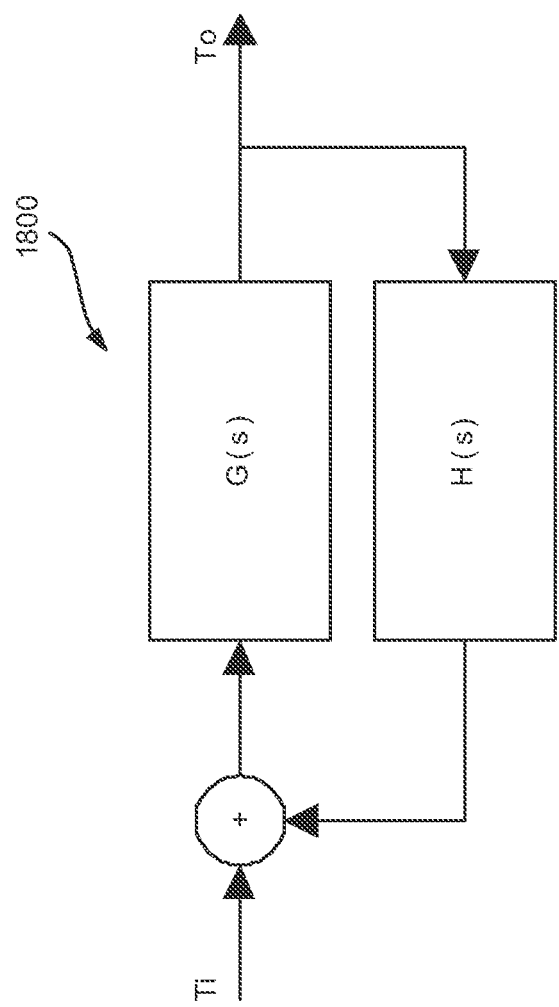
FIG. 18 illustrates a generic representation loop.

The individual components are assembled into a negative feedback control loop as shown in FIG. 8, according to an embodiment of the disclosure. A generic representation 1800 of the loop is shown in FIG. 18.

For this generic system 1800, the closed loop transfer function is given in Equation 8 where G(s) is the forward gain of the system and H(s) is the feedback gain.

$$T(s) = \frac{G(s)}{1 + G(s)H(s)}$$ Equation 8

In the rate measurement block control loop, the feedback has unity gain, therefore H(s)=1. The forward gain is included of the loop integrator and the quantizer block 153, G(s)=F(s)*K quantizer(s). Substituting these values into Equation 8, the transfer function of the system is derived in Equation 9. Equation 9 shows that the control loop has a first order response with the time constant τ=QTs. Because the control loop is actually a sampled digital system, Ts is added into the equation as our sampling period (PKT_PERIOD reference clocks).

$$T(s) = \frac{G(s)}{1 + G(s)H(s)} = \frac{\frac{F(s)K_{quantizer}}{T_s}}{1 + \frac{F(s)K_{quantizer}}{T_s}} = \frac{\frac{1}{QT_s s}}{1 + \frac{1}{QT_s s}}$$ Equation 9

$$T(s) = \frac{1}{1 + QT_s s}$$

According to an embodiment, the main components of the system, the feedback counter 154, Integrator and quantizer 153 are updated every PKT_PERIOD reference clocks, therefore Ts is a function of the reference clock period is shown in Equation 10.

$$Ts = PKT\_PERIOD * Tref$$ Equation 10

Where

Tref=Local reference clock period

From basic control loop theory, Equation 11 shows the response of a first order system, where ω3 db is the cutoff frequency in radians per second and f3 db is the loop cutoff frequency in hertz.

$$T(s) = \frac{1}{1 + \tau s}$$ Equation 11

$$\omega_{3db} = \frac{1}{\tau}$$

$$f_{3db} = \frac{\omega_{3db}}{2\pi} = \frac{1}{2\pi\tau} = \frac{1}{2\pi QTs}$$

According to an embodiment of the disclosure, both Q and Ts are programmable such that the characteristics of the loop can be adjusted to meet the requirements of any application.

A person skilled in the art should note that many embodiments of the packet maker block are sufficient to support the present method of transmitting phase information. It is only important that the packet maker block be capable of generating configurable sized packets and that the packet size can be varied from the base value as required by an input to the block. This input will be driven by the output of the rate measurement block described in the previous section. According to an embodiment of the disclosure, the packet maker block is also able to handle "gapped" CBR data. In this case, there may be times when data is available when a size indication is not. Conversely, there may be times when a size indication is available but data is not (during a data gap). This situation can occur since the packet size indications are being made exactly every PKT_PERIOD reference clocks, whereas the data may be entering the packet maker in a "gapped" fashion with an unknown relationship to the reference clock. To handle these cases, a small FIFO is implemented to store indications until they are required by the packet making logic. When configured properly, the fill level of the FIFO will not vary over time by more than 1 indication since the rate of packet indication generation is exactly the same as the rate of packet generation. This relationship is guaranteed by the closed loop control system in the rate measurement block.

As discussed, the goal is the efficient signaling of phase without using packet overhead bytes to carry phase information. However, it is acceptable for the packet maker block to insert header bytes or words to carry other pertinent information for a specific application unrelated to the transmission of phase information. The absolute size of the packets including overhead is not important, only that the packets carry the prescribed amount of CBR data as indicated, and that the size of the packets can be varied by a size indication, for example by a base packet size and the +1, 0, −1 indication from the rate measurement block.

Similarly, a person skilled in the art should note that many embodiments of the segment or packet monitor block are sufficient to support our method of transmitting phase information. It is only important that the packet monitor block be able to measure the size of incoming packets and report their relative size to a pre-configured nominal value of CBR data bytes. The output of the packet monitor can indicate whether the received packet contains a number of CBR data bytes greater than, equal to, or lesser than the nominal number of bytes. This output will be sent to the adaptive clock block as described in more detail in the following section.

In an embodiment, the packet maker block and the packet monitor block are somewhat aware of the packet contents. For example, if the packet maker block inserts any type of header bytes, the packet monitor detects these bytes and does not count them as part of the CBR data as reported to the ACB.

Figure 19:
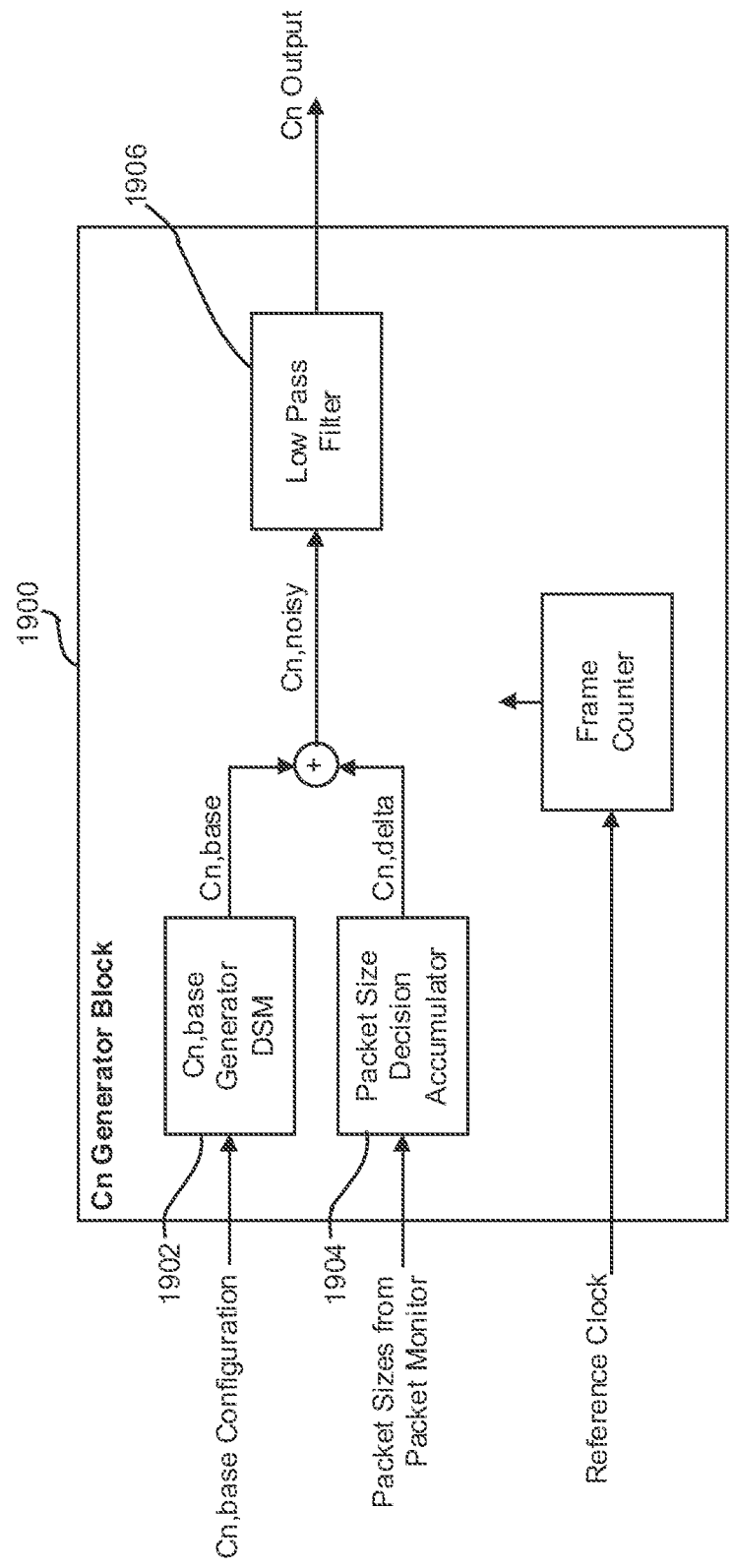
FIG. 19 illustrates an exemplary Cn generator block according to an exemplary embodiment of the disclosure.

FIG. 19 illustrates a Cn generator block 1900 (such as the Cn generator 370 in FIG. 12a), in accordance with an embodiment. The Cn value required for GMP mapping is a measure of how many CBR client bytes should be inserted into in the payload area of the HO ODUk payload area. A new Cn value should be generated once per frame period of the ODUk indicating the number of bytes for the next ODUk frame. Since both the ODUk frame period and the packet period used by the rate measurement block are a known number of local reference clocks, a relationship between the two may be determined. This relationship is shown in Equation 12 where Tf is the ODUk frame period in reference clock cycles and Tc is the rate measurement packet period in reference clock cycles.

$$\frac{T_f}{T_c} = N \qquad \text{Equation 12}$$

In Equation 12, N is a fractional number since Tf and Tc are not generally integer multiples of each other and one or both of the values may be fractional itself. The relationship illustrated in Equation 12 means that in every frame period there will be an average of N packet size decisions made and therefore N packet size decisions received by the packet monitor during a frame period.

Since the rate measurement block decision period (Tc) and the ODUk frame period (Tf) are both generated from the same reference clock, the N packet size decisions are generated by the rate measurement block in a ODUk frame period. However, the packet size indications arriving at the packet monitor are gathered from the data moving through the data path. Since the data passing through the monitor data path is packet data, it is not guaranteed that the packet monitor will output exactly N decisions every frame period.

For a nominal client, the average Cn output value generated by the Cn generator block 1900 should be Cn,nom (Cn,nom values for many clients can be found in G.709). Essentially, this means that for a nominal client Cn,nom client bytes are seen per frame period. An actual client will supply slightly more or less bytes per frame period based on the PPM offset of the CBR client, the actual number of bytes for a non-nominal client can be represented as Cn,act. For the same actual client, an average of C+epsilon,act bytes per packet period (Tc) or C+epsilon,nom is found for a nominal client. Using this information and Equation 12, Equation 13 is derived.

$$Cn,\text{nom}=N*(C+\text{epsilon,nom})$$

$$Cn,\text{act}=N*(C+\text{epsilon,act}) \qquad \text{Equation 13}$$

At the packet maker output, the packet size decisions have an time average value of epsilon,act. Equation 13 is split into two parts as shown in Equation 14.

$$Cn,\text{act}=(N*C)+(N*\text{epsilon,act})$$

$$Cn,\text{act}=Cn,\text{base}+Cn,\text{delta} \qquad \text{Equation 14}$$

where
Cn,base=N*C
Cn,delta=N*epsilon,act

Cn,base is produced by the Cn,base generator 1902 using a DSM because Cn,base is a fractional number. A new Cn,base value is generated for each frame period.

Cn,delta is generated by a packet size decision accumulator 1904 in the Cn generator block 1900. As packet size decisions come into the Cn generator 1900 they are accumulated and the value is sampled every frame period. At this point, the accumulator 1904 is returned to zero until the next input packet size decision.

Cn,base is added to Cn,delta and the result is Cn,act. Note that this summation may produce a "noisy" Cn value since Cn,base varies between floor(Cn,base) and floor(Cn,base)+1. As well, the output of the accumulator 1904 will vary between floor (Cn,delta)−1, floor(Cn,delta), and floor(Cn,delta)+1. The time average of the "noisy" Cn is the value desired to be sent to the downstream blocks. Therefore, a lossless low pass filter 1906 is added after the Cn generator block to obtain the time average value while reducing the "noise" on Cn.

As shown in FIG. 19, the Cn,delta value from the Cn generator block 1900 gets added to Cn,base from a Cn,base generator 1902. During normal mode, the Cn,base generator 1902 will output a new Cn,base value every frame period. This value will vary between CN_BASE_INT+0 and CN_BASE_INT+1 where the 0/+1 decision is made by a first order DSM. Note that in certain cases the programmed value for Cn,base is in units of bytes.

The Cn,delta is added to the output of the Cn,base generator 1902 and the FIFO centering logic. This value is then input to the low pass filter 1906. Both the packet size decisions 1904 and Cn,base generator 1902 are in units of bytes. Therefore, when the MPMO_DSP is in byte mode operation, the value sent to the low pass filter 1906 is in units of bytes. However, if the packet monitor is in bit mode, then the value is shifted left by 3 bits (multiplied by 8) before being sent to the low pass filter 1906 so that the units are in bits.

Many filter implementations are not lossless in that they may "lose" information slowly over time (e.g. due to rounding errors). In many cases, this loss of information is not important. However, in the case of the packet monitor Cn generation 1900, there can be no phase lost. If there were, then the FIFO or packet fabric upstream of the monitor would slowly increase or decrease its depth over time. If left unattended, this loss of phase would cause the upstream FIFO to over flow or underflow. If FIFO centering were to catch the problem before over/underflows, then the centering algorithm would generate low frequency wander at the output of the final demapper.

Figure 20:
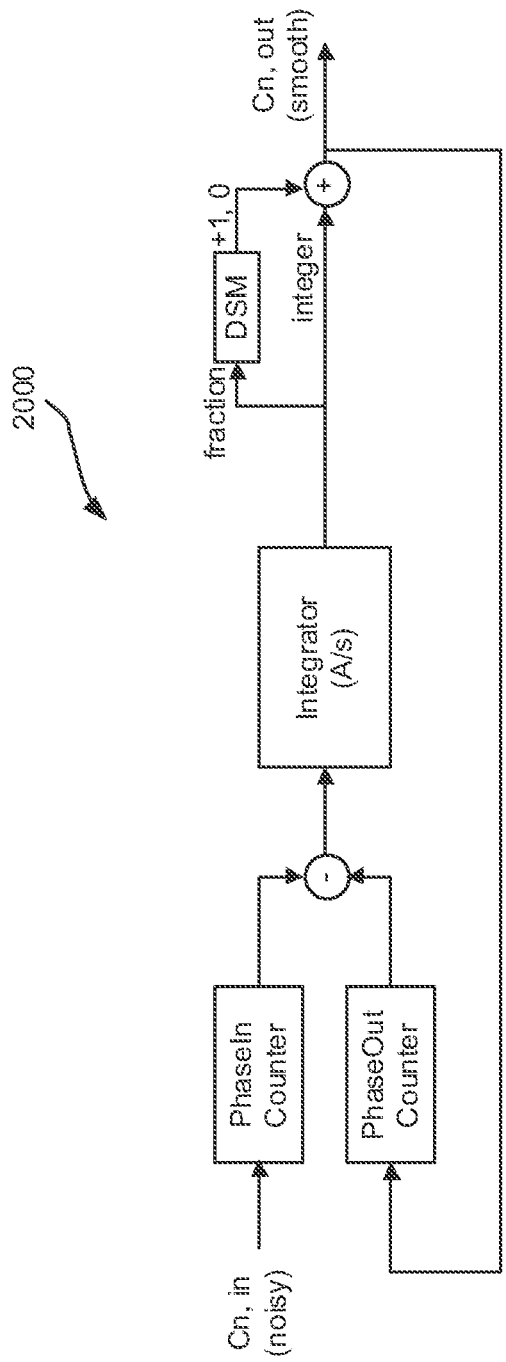
FIG. 20 illustrates lossless low pass filtering of Cn values.

An implementation for a packet monitor lossless low pass filter 2000 is shown in FIG. 20. The Cn Generator lossless low pass filter 2000 is a simple first order (1 pole) closed loop control system. Other implementations are equally applicable to this disclosure. The smoothed Cn output can be used directly by the downstream AMP/GMP mapper or AMP/GMP multiplexer block.

GMP demultiplexing or demapping, is the opposite operation as for multiplexing or mapping. Cn values derived from the ODUk overhead need to be converted to packet size decisions to be used by a downstream packet maker block. As discussed, the Cn value gives a relative measurement of the CBR client stream against the rate of the CBR carrier. It is advantageous to retain this relationship when generating the packet size decisions.

Figure 21:
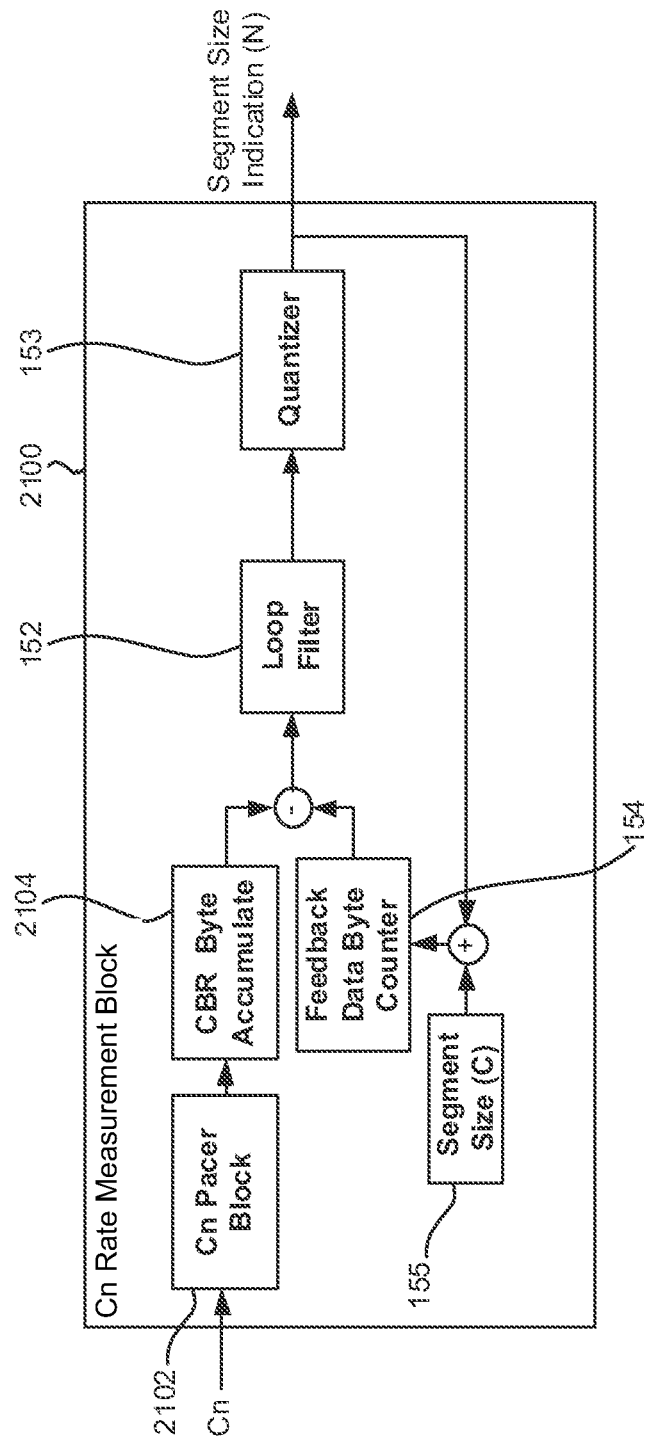
FIG. 21 illustrates an exemplary Cn rate measurement block according to an exemplary embodiment of the disclosure.

FIG. 21 illustrates an further rate measurement block 2100 control loop with Cn pacer 2102, in accordance with an embodiment. Since the rate measurement block described above generates packet size decisions, an efficient way convert the Cn value to packet size decision would partially reuse this existing logic (See e.g. FIG. 15). To do this, a logic block called the Cn pacer 2102 (or doler) is added to the rate measurement block 2100. The Cn pacer block 2102 converts Cn to a format usable by the rate measurement block 2100 since rate measurement block 2100 cannot accept Cn directly. It does this by splitting the large Cn value into multiple smaller sized values (called Cn,pacer units) which are then accumulated by a CBR byte accumulate block 2104.

The transfer of Cn,pacer units from the Cn pacer block 2102 occurs each time the rate measurement control loop makes a packet size decision. The Cn pacer transfers persists until the entire amount of Cn has been transferred.

The Cn pacer 2102 spits up the Cn into smaller Cn,pacer units in a careful fashion. If the Cn pacer 2102 delivers phase too slow or too fast, then the control loop will not make the correct packet size decisions. The control loop would like to see data delivered at a rate of PKT_SIZE+Epsilon,actual per packet period. However, since Epsilon,actual is not known before the data arrives, this is not possible. To overcome this obstacle, the pacer 2102 looks at the input Cn value to make an estimate of epsilon,actual for the current Cn value.

In an embodiment, three software pre-calculated parameters to assist the pacer in its calculation of epsilon,actual. PKTS_PER_CN is the number of packet size decisions that should be made for each input Cn value, CN_BASE is simply PKT_SIZE* PKTS_PER_CN, and CN_BASE_OFFSET is an offset to account for quantization in the circuit. In the pacer block 2102, (CN_BASE−CN_BASE_OFFSET) is subtracted from the input Cn value. The result of this subtraction is fed to the "numerator" input of a DSM block. The "denominator" of the DSM is PKTS_PER_CN. Therefore, the time averaged output of the DSM will effectively be slightly larger than epsilon,actual for the current input Cn value. The Cn pacer 2102 is called a calculated epsilon epsilon,pacer. It is slightly larger than epsilon, act due to the CN_BASE_OFFSET parameter.

Each time the downstream rate measurement control loop requests data from the pacer block 2102, the pacer block 2102 responds with PKT_SIZE+DSM_OUTPUT bytes. Therefore, the pacer 2102 delivers almost exactly what the control loop needs, the only difference being that the average value of the deliveries is slightly larger than epsilon,actual to accommodate the small instantaneous errors of the DSM block.

When the rate measurement block 2100 is configured to accept phase information from the Cn pacer block 2102, the rate measurement block control loop is configured to make as many packet size decisions as possible as fast as possible each time an input Cn is detected. Each time it makes a packet size decision, it will take PKT_SIZE+epsilon,pacer bytes of data from the pacer accumulator 2104. The rate measurement 2100 block will keep making decisions until the Cn pacer block 2102 indicates that its Cn accumulator 2104 is empty. At that point, the rate measurement block 2100 will stop and wait until the next Cn is detected.

This methodology places a restriction on the packet period (Tc) used. The number of decisions made per input Cn value will be an integer number. Therefore, the ratio of the frame period to the packet period will be an integer. The relationship between the frame period (Tf) and the packet period (Tc) is shown above in Equation 12.

In general, to find an integer N value using Equation 12, Tc will be a fractional value. In one frame period Tf, the average number of incoming bytes for a nominal client is Cn,nom. During one Tc period, C+epsilon,nom (C=PKT_SIZE) bytes of data is received for a nominal client. From rearranging Equation 12, the relationship in Equation 15 is found.

$$\frac{Cn, nom}{C + \varepsilon_{nom}} = N \qquad \text{Equation 15}$$

As described above, the algorithm for pacing the Cn value into the rate measurement control loop will deliver C+epsilon,pacer bytes of data from the Cn accumulator N times per input Cn value. Since epsilon,pacer is larger than epsilon,nom, using Equation 15 it can be seen that the Cn accumulator 2104 in the Cn pacer block 2102 will be empty after N decisions.

Note that using this method, the generated packet size decisions describe the relative rate of the CBR client to the source node (node where the client was mapped) reference clock. The packet size decisions do not carry any information about the local reference clock.

Restricting N to an integer value may be advantageous due to its implementation simplicity. It is not a limit of the disclosure. However, there may be applications where there is insufficient flexibility in Tc and Tf to allow N to be an integer. An alternative embodiment supporting a rational N would be to generate a base sequence of Cn,pacer values that average to C+epsilon,nom, and to use Equation 15 to derive Cn,nominal. The difference between Cn,actual and Cn,nominal is used to modulate the base Cn,pacer values.

Figure 22:
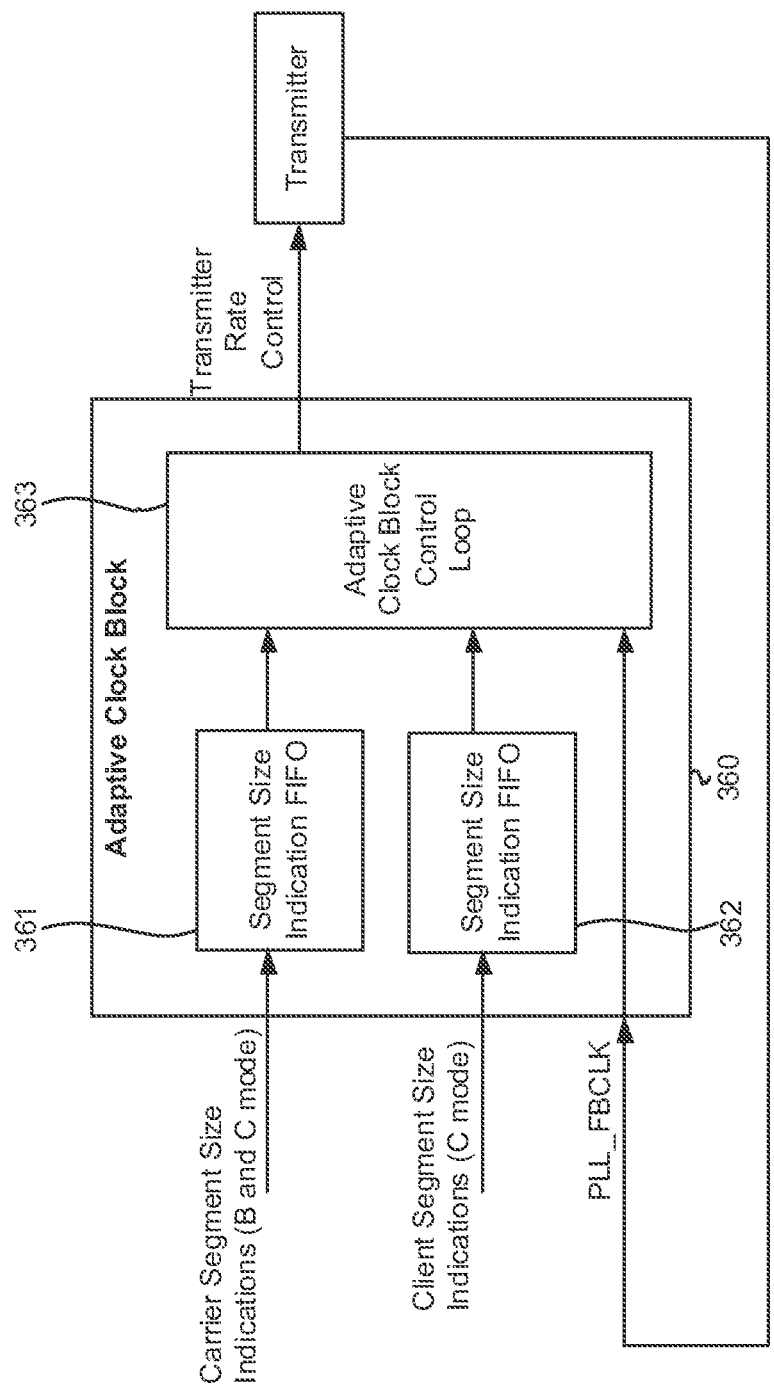
FIG. 22 illustrates an Adaptive Control Block (ACB) with the two input packet size indication FIFOs as well as the feedback control loop, according to an embodiment of the disclosure.

FIG. 22 illustrates an Adaptive Clock Block (ACB) 360, in accordance with an embodiment. The ACB 360 decodes the packet size indications and determines the relative frequency of the CBR data stream to the local reference clock. The ACB 360 accomplishes this by tuning the transmitter frequency to match the frequency of the original CBR data stream using another feedback control loop.

According to an embodiment of the disclosure, the ACB 360 can be used in either the egress node of a switch (for example as illustrated in FIG. 12b), or within a far end (or egress) node which receives a CBR client which is packetized and mapped into a CBR carrier, as shown in FIG. 14. In other words, it can be advantageous from a design and manufacturing perspective to produce a single card which can be inserted in a node and which can be configured to operate in either mode. If the same ACB is reused, then the ACB has two main modes of operation. The first mode handles the application described above with respect to a packet switching element (for example, as illustrated in FIG. 12b). In this case there is one rate measurement block in the system and the ACB 360 receives only one stream of packet size indications. These packet size indications are a measurement of the CBR data stream relative to the local reference clock which is common to both the rate measurement block (at the ingress port) and the ACB 360 (at the egress port). This mode of operation is labeled "C mode" since the packet size indications are for the CBR client data only.

In the second application, described above with respect to transmitting CBR data over the WAN, there are two CBRs (the original CBR client and the CBR carrier into which the CBR client is mapped). There are accordingly two CBR clock rates that are accommodated, namely the client and CBR carrier clock rates. Accordingly such a system includes two rate measurement blocks and the ACB 360 receives two streams of packet size indications. The first stream of packet size indications are a measurement of the CBR data stream relative to the reference clock at the ingress node. The second stream of packet size indications are a measurement of the incoming carrier (e.g., OTN) relative to the reference clock at the egress node. Note that the rate of the OTN is a multiple of (directly derived from) the reference clock at the ingress node. For reference, this system can be seen in FIG. 14. This mode of operation is labeled "B and C mode" since there are packet size indications for the carrier (B indications) and for the client (C indications).

As mentioned, the main inputs to the ACB 360 are the packet size indications. These indications are used by the ACB 360 at precise intervals (counted as a specific number of reference clocks). However, it is possible that they can arrive from the packet monitor with variable timing since the packet monitor is counting packet payload bytes in the packet domain. For example, there may be a variable time between packets due to packet delay variation through a packet switching fabric. To compensate for the delay variation, the incoming packet size indications are placed in a small FIFO so that there is always one available when required. It is guaranteed by design that the average rate of packet size indications coming into the FIFO is exactly the same as the average rate that they are removed.

FIG. 22 shows a block diagram of the ACB 360 with the two input packet size indication FIFOs as well as the feedback control loop, according to an embodiment of the disclosure. When the ACB 360 is in C mode, only the client packet size indications are used, as there is no need to deduce the ingress clock rate (as it is the same clock as for the egress clock rate). Accordingly, the B input can be (effectively) disabled, as there is no carrier rate to deduce. When B and C mode is enabled, both carrier (B) and client (C) size indications are used.

The exemplary ACB 360 includes Segment Size Indication FIFO 361, which receives the carrier segment size indications (indicative of the variation of said CBR carrier clock stream from a nominal carrier relative to said local reference clock) from the rate measurement block 150, a segment size indication FIFO 362, which receives client size indications indicative of variations in the size of said segments from the segment block 350; and a ACB control loop 363 which produces a transmitter rate control signal to adjust a local reference clock which causes the transmitter 330 to match said CBR client rate, such that the CBR client stream is output at said CBR client clock rate. The ACB control loop receives, as a 3rd input, an PLL feedback clock from the transmitter 330.

According to an embodiment of the disclosure, the transmitter rate control is a 20 bit signed digital value. This value is interpreted by the transmitter as an indication to speed up or slow down its output clock frequency. In this embodiment, the signed output value is used to control the feedback divider of a fractional-N Clock Synthesizer inside the transmitter block. However, the disclosure is not limited to this specific architecture and multiple other embodiments can be achieved in other implementations. For example, the digital output can be put through a Digital to Analog Converter (DAC) to drive a Voltage Controlled Oscillator (VCO) directly. Another implementation is that the DAC can drive an external Voltage Controlled Crystal Oscillator (VCXO) running at the output clock rate. In such alternative embodiments, the gain of the control loop may need to be adjusted to account for the gain of the VCO or VCXO, but this does not alter the basic premise of the disclosure.

Figure 23:
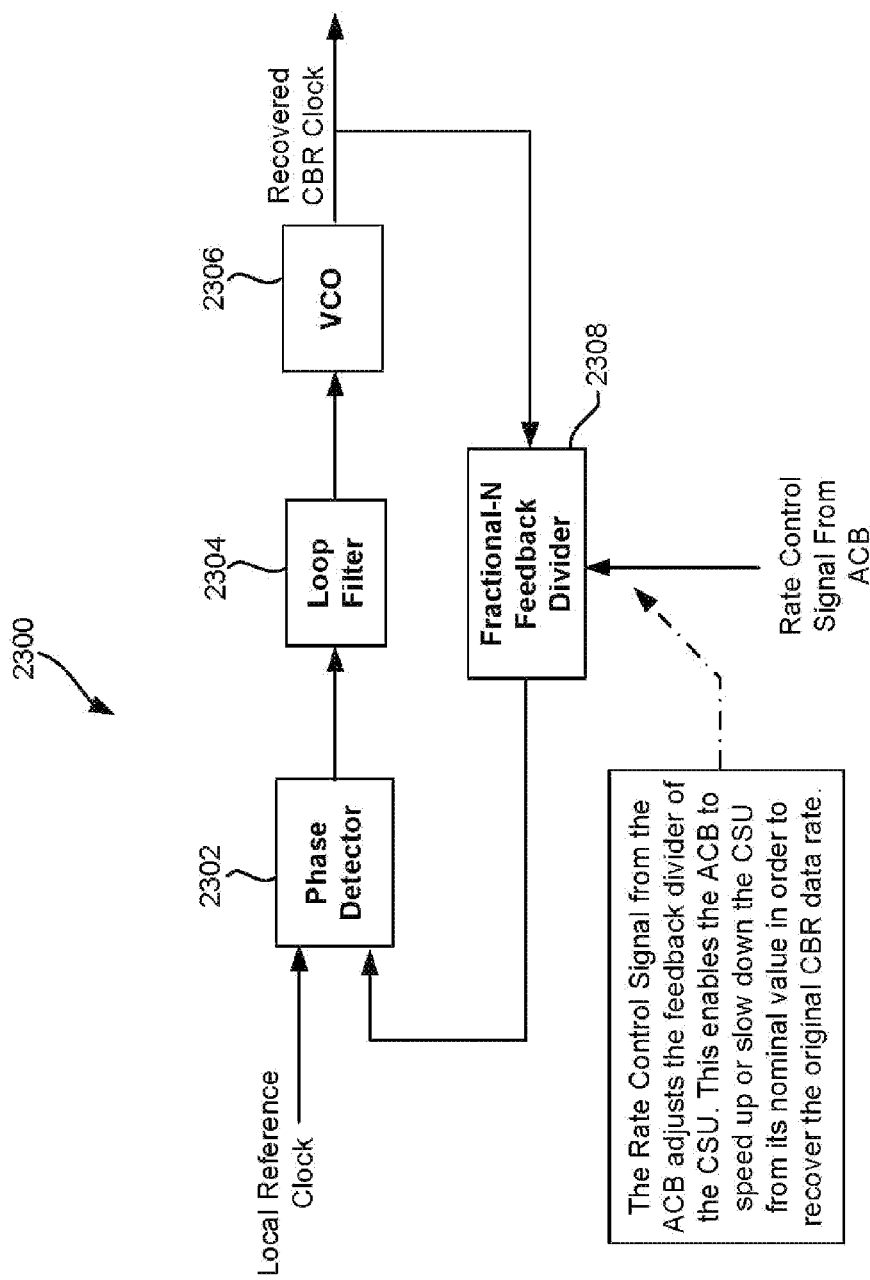
FIG. 23 shows a block diagram of a transmitter according to an embodiment of the disclosure.

FIG. 23 illustrates the transmitter 2300 (such as the transmitter 330 of FIG. 12), in accordance with an embodiment. The transmitter 2300 includes a phase detector 2302, a loop filter 2304, a VCO 2306, and a fractional-N divider 2308.

When controlling the transmitter for CBR data leaving a packet switching element, the ACB 360 is in C mode. In this mode, the ACB 360 receives packet size indications from only one packet monitor on the outgoing CBR client data. These packet sizes were generated by the rate measurement block at the ingress node which compared the incoming CBR rate to the reference clock. The rate measurement was performed using two parameters, the measurement time (PKT_PERIOD) in units of reference clock periods and the number of expected CBR bytes (PKT_SIZE) during the measurement time.

Figure 24:
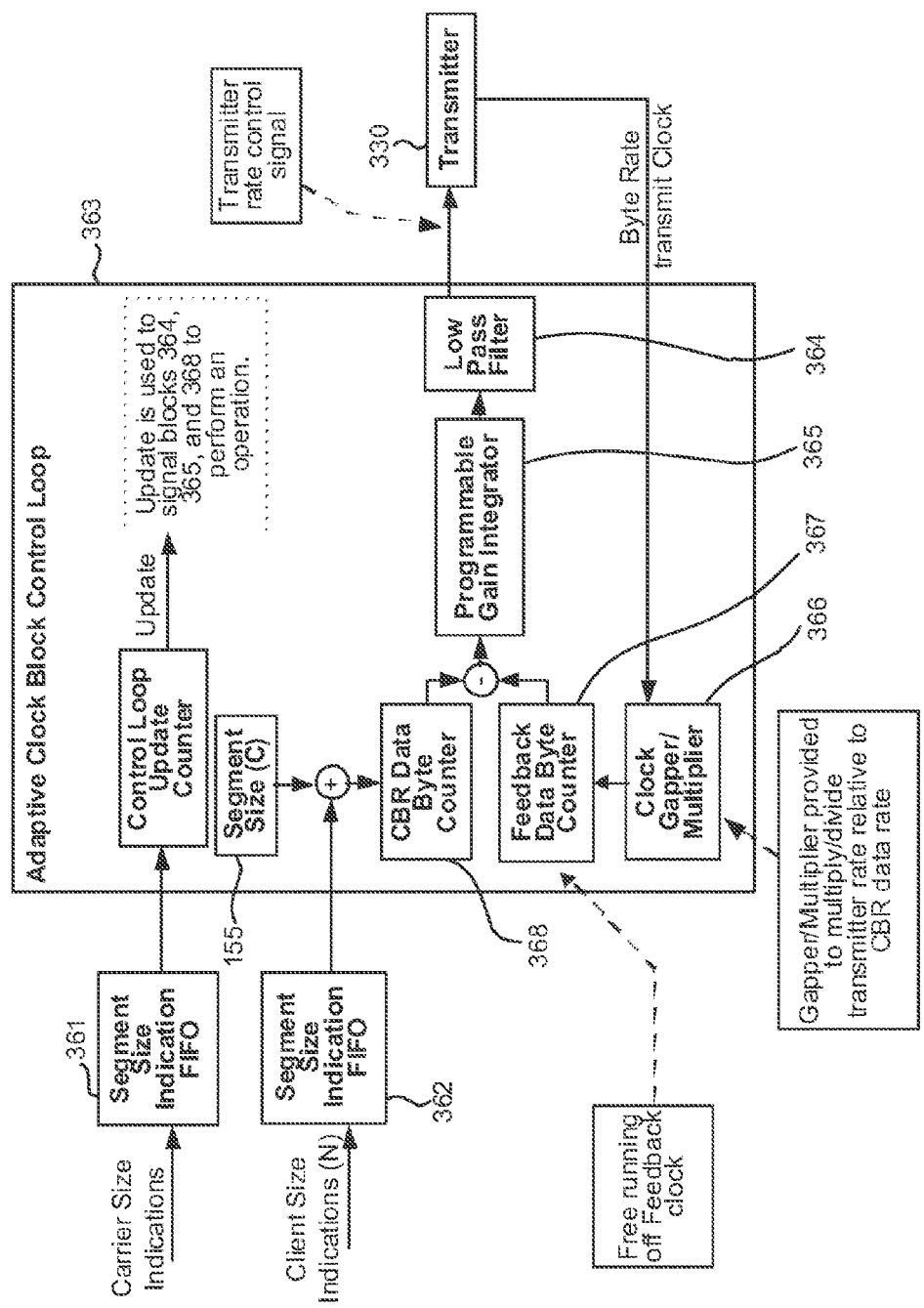
FIG. 24 illustrates an ACB control loop according to an exemplary embodiment of the disclosure.

To regenerate the CBR data stream at the egress port, the ACB 360 uses the same parameters as the rate measurement block. As well, the ACB 360 has a similar control loop to the rate measurement block. The ACB control loop 363 is shown in FIG. 24. In this case, the input is the packet size indications from the upstream blocks, such as provided to the segment size indication FIFO 362. The indications are added to the PKT_SIZE parameter, shown in FIG. 13 as segment size (C) 155, to give the number of bytes seen at the rate measurement block during a given PKT_PERIOD. This value is fed into a CBR data byte counter 368 which is also updated every PKT_PERIOD reference clocks.

In the feedback path, the transmitter sends back its byte rate transmit clock to a feedback data counter 367. The feedback byte counter 367 provides a measure of exactly how many bytes were sent out. Like the rate measurement block, the difference between the two counters is sampled every PKT_PERIOD reference clock cycles and then integrated by a variable gain integrator, shown in as a programmable gain integrator 365.

Lastly, the output of the integrator 365 is low pass filtered in a low pass filter 364 such that it is very stable over time. If the ACB output varied greatly over time, the transmitter 330 will generate unwanted jitter on the output CBR data stream. The output of the low pass filter 364 is actually the value $\epsilon$act (from the rate measurement block) converted to units understood by the transmitter. Since the incoming packet indications are quantized to +1, 0, and −1 the low pass filter smoothes out the transitions and finds the time average of the packet indications ($\epsilon_{act}$).

Like the rate measurement block both PKT_PERIOD and PKT_SIZE are integer parameters into the control loop. However, the relative rates of the reference clock and the CBR data are not integer multiples and in the general case the ratio is irrational. Therefore, for nominal clock rates we again have a nominal error in the PKT_SIZE value, $\epsilon_{nom}$, as was shown in Equation 2. Similarly, $\epsilon_{act}$ for the actual received CBR data stream is shown in Equation 5. It is this value $\epsilon_{act}$ encoded in the packet size indications and that is received by the ACB and used as the input to the ACB control loop. Any difference between $\epsilon_{act}$ and $\epsilon_{nom}$ indicates a PPM difference between the nominal client and the actual client and will cause the ACB to adjust the frequency of the output clock to match the PPM difference.

As $\epsilon_{act}$ varies over time because the relative frequencies of the local reference clock and the CBR data stream change, the ACB will adjust the frequency of the transmitter generated clock to match that of the original CBR data stream at the ingress port.

For additional functionality, a clock gapper/multiplier 366 is implemented as part of the free running feedback clock counter to do simple fractional division/multiplication of the feedback clock. The clock gapper/multiplier 366 is available in case the CBR stream measured at the ingress port is not the same rate as the CBR output at the egress port. This situation can arise if additional data is added to the CBR stream or if data is removed from the CBR stream somewhere in the data path. For example, in OTN, the transmitted stream is an OTUk while the stream switched through the fabric is an ODUk. For example, additional data can be added during packet switching for error correction such as forward error correction (FEC), cyclic redundancy check (CRC), or error-correcting code (ECC). In this case, the transmitter 330 can be configured to nominally run at the rate of the CBR data with additional overhead (e.g., the OTUk rate) and the gapper 366 is enabled to bring the data rate back down to the originally measured CBR data rate (e.g. the ODUk rate).

Conversely, when data is removed from the CBR stream between measurement and regeneration, the transmitter 330 can be configured for the reduced data rate and the multiplier used to multiply the clock frequency back up to the original CBR rate.

In one embodiment, the gapper/multiplier 366 is a simple first order DSM capable of handling both positive and negative numbers. When the numerator is positive and the output of the DSM is a positive rollover, the gapper forces the feedback clock counter to skip a count, thereby reducing the frequency of the feedback clock. Alternatively, when the numerator is negative and the output of the DSM is a negative rollover, the multiplier will force the feedback counter increment by two clocks rather than one. This effectively increases the frequency of the feedback clock Using a DSM to drive the gapper/multiplier logic is not required by the present disclosure. Other implementations that perform an equivalent function can be substituted for the DSM without adversely affecting the overall functionality of embodiments of the disclosure. As well, rather than using a clock gapping/multiplication function in the feedback counter to do the multiplication/division, other methods can be used including fractional-N clock synthesizers and other circuits.

Adaptive clock block feedback loop equations will now be described, which may be useful in understanding embodiments of the disclosure.

The loop characteristics of the ACB can be derived using linear approximations of the individual elements. The difference between the feedback counter and the CBR data byte counter is fed to a programmable gain integrator whose transfer function can be seen in Equation 16.

$$K(s) = \frac{A}{s} \qquad \text{Equation 16}$$

The next element in the loop is a simple low pass filter. In the preferred embodiment, this low pass filter is implemented using an exponentially weighted moving average filter. However, this implementation is not critical to this embodiment of the disclosure and any low pass filter implementation is sufficient. The transfer function of a low-pass filter is shown in Equation 17 and sufficiently models our implementation. The bandwidth (cutoff frequency) of the low pass filter is a function of the parameter $\tau f$ and in our embodiment is programmable such that the overall loop characteristics are adjustable.

$$F(s) = \frac{1}{1 + \tau_f s} \qquad \text{Equation 17}$$

The final piece of the loop is the transmitter fractional-N clock synthesizer. Although, this element is not in the ACB, it forms a part of the control loop and is therefore included. As shown in Equation 18, the output of the clock synthesizer is a function of the input reference clock, the feedback divider ratio and the output divider ratio.

$$f_{out}(t) = \frac{\left(N + \frac{R + S(t)}{Q}\right)}{(\text{bits}/\text{byte})} f_{ref} \qquad \text{Equation 18}$$

One embodiment of the fractional-N clock synthesizer has as inputs three constants N, R, and Q and one variable S(t). The control output from the ACB is S(t) in Equation 18. Finally, since the ACB counters are running off a byte clock, we divide by the number of bits per byte. Taking the Laplace transform of Equation 18 gives us the transfer function of the clock synthesizer as shown in Equation 19. As the equation illustrates, the clock synthesizer acts as a constant gain in the loop.

$$\frac{f_{out}(s)}{S(s)} = \frac{f_{REF}}{(\text{bits}/\text{word}) \cdot Q} = K_{VCO} \qquad \text{Equation 19}$$

Using the generic feedback system shown in FIG. 18 and the associated transfer function as shown in Equation 8, we can derive the characteristics of the ACB loop. In the adaptive clock block phase adaptation control loop, H(s)=1, and G(s)= K(s)·F(s)·KVCO. Therefore, the overall transfer function of the system is derived in Equation 20 which shows a typical second order response.

$$T(s) = \frac{G(s)}{1 + G(s)H(s)} = \frac{K_{VCO} \cdot K(s) \cdot F(s)}{1 + K_{VCO} \cdot K(s) \cdot F(s)} \qquad \text{Equation 20}$$

-continued $$T(s) = \frac{\left(\frac{K_{VCO} \cdot A}{s(1+\tau_f s)}\right)}{1+\left(\frac{K_{VCO} \cdot A}{s(1+\tau_f s)}\right)} = \frac{K_{VCO} \cdot A/\tau_f}{s^2 + s/\tau_f + K_{VCO} \cdot A/\tau_f}$$

KVCO is fixed for the fractional-N clock synthesizer, while the parameters τf and A are programmable enabling the ACB to be very flexible for different data rates and applications.

Turning back to FIG. 14, when transporting CBR clients over that WAN, both the B and C packet size indications are used to recover the CBR data stream phase information. In this case, the C packet sizes indicate the relative rate of the CBR client to the ingress node's reference clock (and therefore the CBR client rate relative to the OTN carrier rate or the SONET Path layer (SDH High-Order Path layer) carrier rate). As shown in FIG. 14, a second rate measurement block 150 is added to the system in the egress node 600. This rate measurement block 150 is measuring the rate of the incoming carrier (OTN) and outputting our B packet size indications to the ACB 360.

The OTUk generated by the ingress node 400 uses the ingress node reference clock as its timing reference. As per the G.709 specification, in OTN networks, the phase of the generated OTN is maintained through the network, irrespective of the number of nodes it passes through. Therefore, the B packet size indications indicate the relative rate of the carrier, and therefore the ingress node reference clock to the egress node's reference clock. With these two pieces of information, the relative rate of the original CBR data stream to the egress node reference clock is derived. This ratio is important since the egress node transmitter 330 will be using the egress node reference clock as its timing source.

At the egress node 600, the rate of the CBR client is measured and reported in the GMP Cn byte or the AMP justification control bytes. At the egress node 600, the rate of the client is re-converted back to C packet size indications by the rate measurement block with a Cn pacer 150. If no other operations were performed (i.e. we ran C mode with CBR data coming in from the WAN) the ACB 360 would calculate the relative rate of the CBR client to the ingress node reference clock, but this offset would be applied relative to the egress node's reference clock. Since the ingress node and egress node's reference clocks are different, doing this would lead to the CBR data output having the incorrect output frequency.

To compensate for the error, we use the B packet size indications to occasionally alter the value of PKT_PERIOD by +1 or −1 egress node reference clock cycles. If done correctly, changing the PKT_PERIOD duration occasionally is functionally equivalent to scaling the egress node reference clock to match the ingress node reference clock. Therefore, performing this function will allow recreation of the CBR client data rate at the egress node 600.

Figure 25:
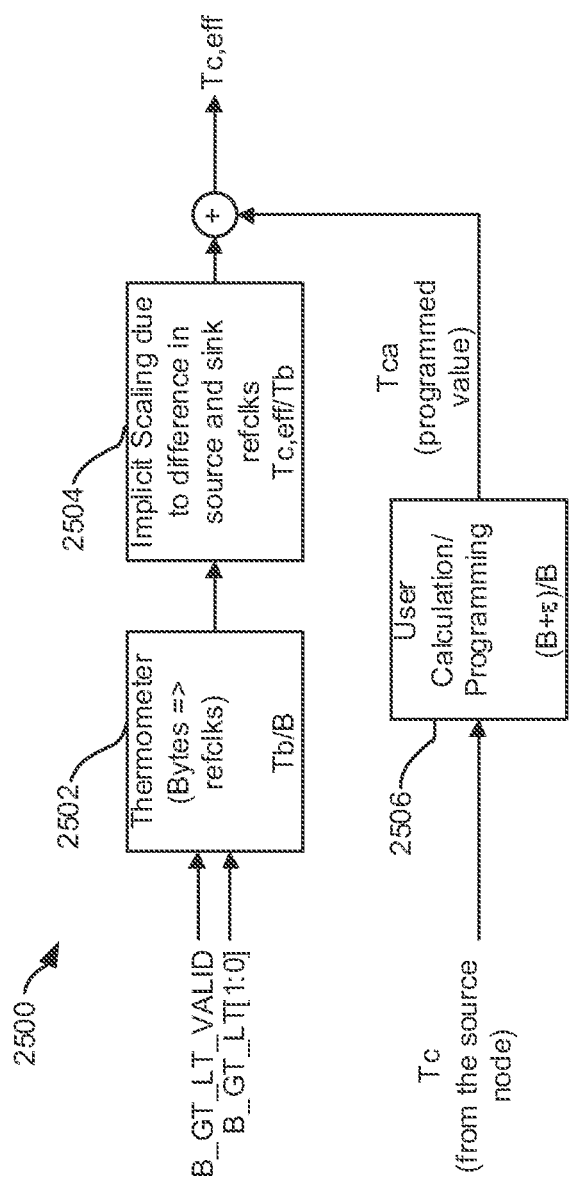
FIG. 25 illustrates an interface path through the ACB.

Turning to FIG. 25 a path of the B interface packet size decisions through the ACB_FT 2500 is illustrated, in accordance with an embodiment. The packet size decisions go through a thermometer 2502 which converts the bytes of carrier to reference clock cycles. Next, they go through an implicit scaling block 2504 due to the reference clock rate difference between the source node and the sink node (the source node is where the carrier was generated; the sink node is where the ACB_FT is located). Lastly, the decisions are added to the Tca value from 2506 programmed in the ACB (PKT_PERIOD value) to produce the correct PKT_PERIOD as seen at the source node (Tc,eff).

These steps regenerate the original PKT_PERIOD as seen at the ingress node in the egress node. The following paragraphs will illustrate the math at each of these steps where we derive how the egress PKT_PERIOD is converted to the source PKT_PERIOD.

As stated, the fundamental problem is to convert the ingress PKT_PERIOD (Tc) to be the same as the egress PKT_PERIOD (Tc,eff). As the two reference clocks are different we can derive the Equation 21 where Tref1 is the ingress reference clock period and Tref2 is the egress reference clock period.

$$T_c * T_{ref1} = T_{c,eff} * T_{ref2} \qquad \text{Equaton 21}$$

$$T_{c,eff} = \frac{T_c * T_{ref1}}{T_{ref2}}$$

We can also derive the relationship between the carrier packet period and packet size for both nodes given by Equation 22.

$$\frac{B + \varepsilon_{nom}}{T_B * T_{ref1}} = \frac{B + \varepsilon_{nom} + \Delta\varepsilon}{T_B * T_{ref2}} \qquad \text{Equation 22}$$

Rearranging gives Equation 23.

$$\Delta\varepsilon = (B + \varepsilon_{nom})\left(\frac{T_{ref2}}{T_{ref1}} - 1\right) \qquad \text{Equation 23}$$

At the egress node the epsilon measured by the carrier packet maker is epsilon,act as given by Equation 24.

$$\varepsilon_{act} = \varepsilon_{nom} + \Delta\varepsilon \qquad \text{Equation 24}$$

Substituting $$\varepsilon_{act} = \varepsilon_{nom} + (B + \varepsilon_{nom})\left(\frac{T_{ref2}}{T_{ref1}} - 1\right)$$

$$\varepsilon_{act} = \varepsilon_{nom} + (B + \varepsilon_{nom})\left(\frac{T_{ref2}}{T_{ref1}}\right) - (B + \varepsilon_{nom})$$

$$\varepsilon_{act} = (B + \varepsilon_{nom})\left(\frac{T_{ref2}}{T_{ref1}}\right) - B$$

Multiplying epsilon,act by two factors, the thermometer 2502 and the implicit scaling 2504 and then adding this to the programmed value of Tca 2506 to obtain Tc,eff gives Equation 25.

$$T_{c,eff} = T_{ca} + \varepsilon_{act}\left(\frac{T_b}{B}\right)\left(\frac{T_{c,eff}}{T_b}\right) \qquad \text{Equation 25}$$

or $$T_{ca} = T_{c,eff} + \varepsilon_{act}\left(\frac{T_b}{B}\right)\left(\frac{T_{c,eff}}{T_b}\right)$$

Substituting in epsilon,act and Tc,eff gives Equation 26.

$$T_{ca} = T_{c,\mathit{eff}} + \varepsilon_{act}\left(\frac{T_b}{B}\right)\left(\frac{T_{c,\mathit{eff}}}{T_b}\right) \quad \text{Equation 26}$$

$$T_{ca} = \left(\frac{T_c * T_{ref1}}{T_{ref2}}\right) + \left((B+\varepsilon_{nom})\left(\frac{T_{ref2}}{T_{ref1}}\right) - B\right)\left(\frac{T_b}{B}\right)\left(\frac{T_{c,\mathit{eff}}}{T_b}\right)$$

And finally, simplifying gives the desired Tca in Equation 27. This is the value that should be programmed into the fractional packet period value (PKT_PERIOD) when B mode is enabled.

$$T_{ca} = \left(\frac{T_c * T_{ref1}}{T_{ref2}}\right) + \left((B+\varepsilon_{nom})\left(\frac{T_{ref2}}{T_{ref1}}\right) - B\right)\left(\frac{T_b}{B}\right)\left(\frac{T_{c,\mathit{eff}}}{T_b}\right) \quad \text{Equation 27}$$

$$T_{ca} = \left(\frac{T_c * T_{ref1}}{T_{ref2}}\right) + \left((B+\varepsilon_{nom})\left(\frac{T_{ref2}}{T_{ref1}}\right) - B\right)\left(\frac{T_{c,\mathit{eff}}}{B}\right)$$

$$T_{ca} = \left(\frac{T_c * T_{ref1}}{T_{ref2}}\right) + \left((B+\varepsilon_{nom})\left(\frac{T_{ref2}}{T_{ref1}}\right) - B\right)\left(\frac{T_c * T_{ref1}}{T_{ref2} * B}\right)$$

$$T_{ca} = \left(\frac{T_c * T_{ref1}}{T_{ref2}}\right) + \left((B+\varepsilon_{nom})\left(\frac{T_c}{B}\right) - \frac{T_c * T_{ref1}}{T_{ref2}}\right)$$

$$T_{ca} = \frac{T_c(B+\varepsilon_{nom})}{B}$$

Figure 26:
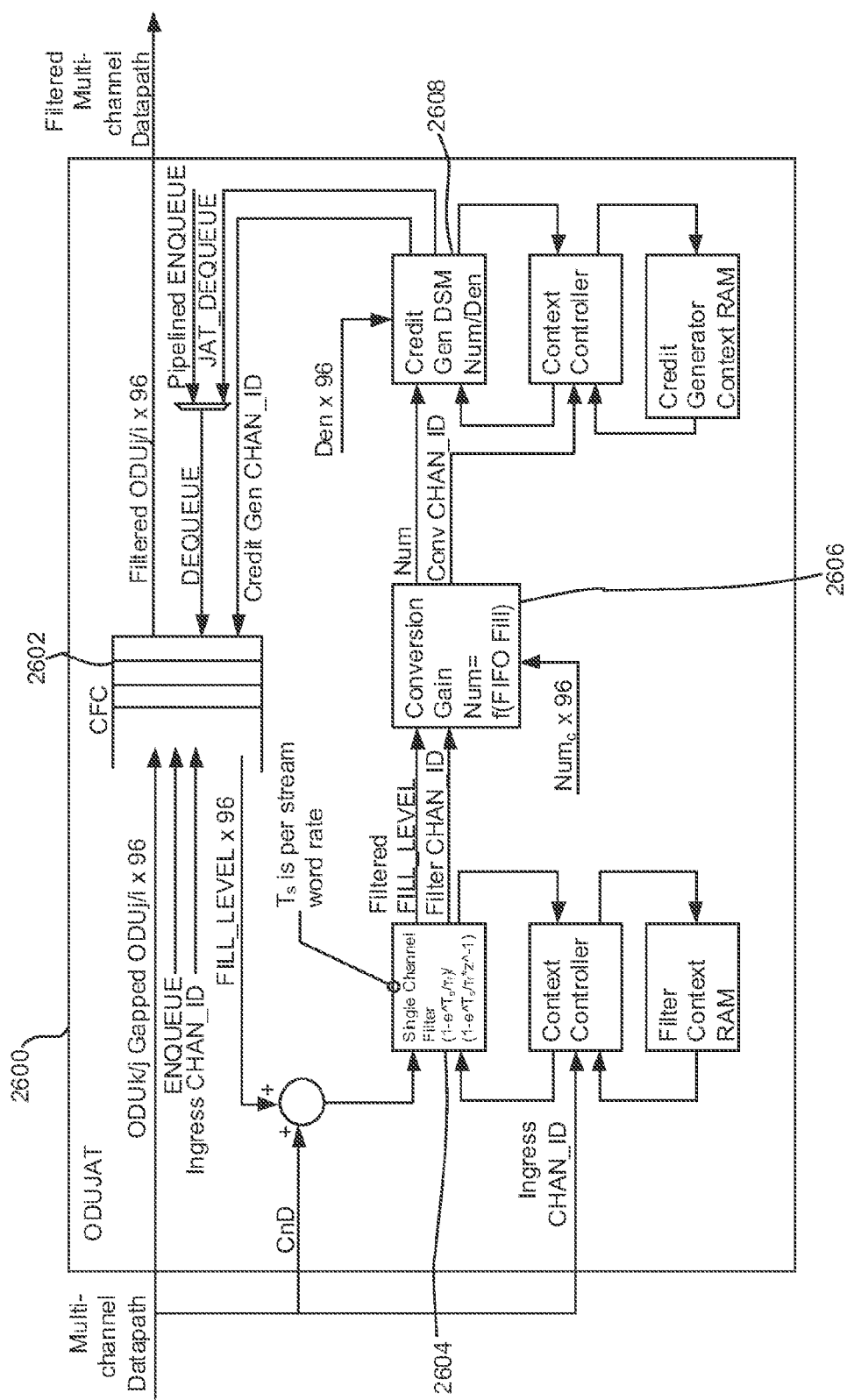
FIG. 26 illustrates a multi-level ODU demuxing jitter attenuator (JAT).

FIG. 26 illustrates B Interface path ACB through the ODU-JAT 2600, in accordance with an embodiment. When demuxing OTN (See e.g. FIGS. 8 and 9), in order to keep the recovered ODCp clock within the limits specified in G.8251, a JAT is used to filter the time positions of ODUk/ODUflex data on a multi-channel bus. The ODUJAT 2600 is used to eliminate the possibility of beating between the OTN parent overhead gapping from each demux stage. The multi-channel ODUJAT 2600 aims to space the position of each channel's data using the architecture shown in the figure below.

In an embodiment, the ODUJAT 2600 includes a multi-channel FIFO used as phase detector (CFC) 2602, a time-sliced low-pass loop filter 2604, a time-sliced conversion gain stage 2606, and a time-sliced DSM JAT 2608 used as CFC dequeue VCO.

Each channel of the ODUJAT 2600 runs at the sample rate of the corresponding incoming channelization of the multi-channel data path. The multi-channel datapath enters the ODUJAT 2600 and is directed to both the multi-channel FIFO controller (CFC) 2602 and the time-sliced low pass filter 2602. The channelized FIFO is enqueued directly by the ingress datapath bus; no backpressure is generated. The time-sliced low pass filter 2604 is also directed by the incoming datapath channelization to retrieve the filter context for specifics channels and perform a filtering operation.

The filtering operation is performed on the current CFC 2602 centered fill level for a specific channel. Added to this filter input is the OTN overhead CnD value for the current multi-frame. This summation is filtered with a single pole operation to produce a filtered view of the CFC fill, as described in Equation 28.

$$G_{DLF}(z) = \frac{1 - e^{-\frac{T_S}{T_F}}}{1 - e^{-\frac{T_S}{T_F}} z^{-1}} \quad \text{Equation 28}$$

Where, TS=The channelization period for a specific channel in the ingress datapath, and TF=The low pass filter corner frequency.

The filtered CFC fill level leaves the low-pass filter block 2604 as channelized data and enters the time-sliced conversion gain stage 2606. This stage 2606 converts the fill level to a DSM numerator value by applying a multiplier and offset to the ingress data; the offset is used to provide a free running VCO frequency to the DSM 2608. Where Gconv is the factor used to convert the filtered fill level into a DSM numerator.

After the conversion gain stage 2606, the channelized egress data is sent to a time-sliced DSM 2608, where it is used as the DSM numerator. This DSM 2608 is essentially the VCO for the ODUJAT 2600, generating the dequeue signaling to the CFC 2602 at a frequency which keeps the CFC centered for each channel, as given by Equation 29 and 30.

$$G_{DVCO}(z) = \frac{g_{VCO} T_S}{1 - z^{-1}} \quad \text{Equation 29}$$

$$g_{VCO} = \frac{\frac{\text{num}_{slots_{allocated}}}{\text{num}_{slots_{metal}}} 2\pi f_{ref}}{\text{Den}} \quad \text{Equation 30}$$

$\text{num}_{slots_{allocated}}$=the number of time slots on the databus allocated to a specific channel
$\text{num}_{slots_{total}}$=the total number of timeslots available on the databus
Den=the time-sliced DSM denominator $f_{ref}$=the DSM sample rate and the databus timeslot rate The CFC phase detector is given by Equation 31.

$$G_{PD} = \frac{\text{wordsize}_{data}}{2\pi} \quad \text{Equation 31}$$

wordsize$_{data}$=the word size of the data bus in bytes
Each block in the ODUJAT can be combined into a system is given by Equation 32.

$$G_{ODUJAT}(z) = \frac{G_{PD} G_{DLF}(z) G_{CONV} G_{DVCO}(z)}{1 + G_{PD} G_{DLF}(z) G_{CONV} G_{DVCO}(z)} \quad \text{Equation 32}$$

This system transfer function is used to describe the characteristics of the ODUJAT 2600, defining its passband, poles, phase margin, and transient characteristics.

In order to be resilient against phase transients in the ODUk/ODUflex datastream sourced from a demultiplexer, an alternate implementation of the ODUJAT can be designed using a justification control input from the demux instead of the datapath CFC fill level. The justification control input reports the number of bytes in the tributary multiframe as indicated by the GMP Cn value or AMP justification control bytes. The justification control ODUJAT contains two CFC FIFOs, the current datapath FIFO and an additional control FIFO. This additional FIFO decouples the control loop from the datapath FIFO. This additional FIFO is the justification control ODUJAT phase detector, whereas in the standard ODUJAT, the phase detector was the datapath FIFO. This phase detector FIFO enqueues the justification control stream while dequeueing identically to the datapath CFC using the dequeue output of the ODUJAT DSM.

Turning back to FIGS. 22 and 23, in the general case, the carrier rate will not be an integer multiple of the local reference clock which leads to $\epsilon$nom in the carrier packet indications. To ease implementation, it is advantageous to monitor the accumulation of carrier phase directly. In this case the value $\epsilon$diff as shown in Equation 33 which is the difference between $\epsilon$act and $\epsilon$nom.

$$\epsilon_{diff} = \epsilon_{actual} - \epsilon_{nom} \qquad \text{Equation 33}$$

If we obtain $\epsilon$diff, the integral of the packet size indications is a direct measurement of the phase difference of the incoming carrier to a nominal carrier relative to the egress node reference clock. To obtain $\epsilon$diff, an $\epsilon$ predictor is added to the system. This predictor can be added anywhere between the carrier's rate measurement block and the B packet size indication input of the ACB. In the preferred embodiment the $\epsilon$ predictor is located in the packet monitor and inserts additional packet size indications equal to negative $\epsilon$nom. In this way, using Equation 33, the addition of the rate measurement output and the predictor is equal to $\epsilon$diff. The disclosure is not limited to this implementation. Alternatively, the predictor can subtract $\epsilon$nom from the packet indications generated by the data rate monitor directly. Also, it is not important whether the predictor is in the packet monitor, between the packet monitor and the ACB, or in the ACB itself.

A particular embodiment of the predictor uses a first order DSM implementation. Constant inputs configure the DSM to output a value of negative $\epsilon$nom (time averaged). The DSM output is added to the incoming B packet size indications such that the value going into the control loop is $\epsilon$diff. Using the DSM gives flexibility for different carrier rates and different reference clock frequencies. However, the DSM implementation of the predictor is not a requirement and other implementations are suitable for this disclosure including fixed pattern generators or lookup tables that contain an average value of $\epsilon$nom.

Once $\epsilon$diff is available, it is used to modulate the PKT_PERIOD in such that the egress node reference clock looks equivalent to the ingress node reference clock. There is a slight complication in that $\epsilon$diff is in units of carrier bytes. For example, if we feed the stream of B packet size indications into a simple integrator, when the integrator value reaches one, we know that we have received one extra byte of carrier data relative to the local reference clocks view of the carrier rate. However, we are using the B packet size indications to alter the loading of the ACB control loop which is measured in units of reference clocks. Therefore, a conversion function between carrier bytes and reference clocks is needed.

The conversion function may be more easily understood using a concrete example. Assume that the carrier is ODU2 and that the ACB reference clock is running at 311.04 MHz. Equation 34 shows the frequency of the ODU2 byte rate clock relative to a SONET data stream (as defined in G.709, which is incorporated by reference in its entirety).

$$ODU2 = \frac{9953.28 \text{ Mbits/sec} * (239/237)}{8 \text{ bits/byte}} \qquad \text{Equation 34}$$

$$ODU2 = 1244.16(239/237) \text{ MBytes/sec}$$

Given Equation 34, the ratio reference clocks to carrier clocks is shown in Equation 35. From this equation we can see that if we received 956 extra bytes of carrier ODU2 (i.e. 956 extra "+1" packet size indications), we would want to alter the loop filter PKT_PERIOD count by 237 reference clocks. It may not be desirable to wait for the accumulation of 956 bytes of carrier before acting as this would generate an extremely large phase hit on the output clock. However, this provides insight into embodiments of the present disclosure and its implementation.

$$\frac{ODU2}{refclk} = \frac{1244.16(239/237) \text{MBytes/sec}}{311.04 \text{ MHz}} \qquad \text{Equation 35}$$

$$\frac{ODU2}{refclk} = 4(239/237) = \frac{956}{237}$$

or $$refclk = ODU2\left(\frac{237}{956}\right)$$

Continuing our example, if we receive one extra carrier packet size indication (an extra +1) we need to adjust the PKT_PERIOD by 237/956 reference clocks. To implement this translation, we use a modulus 956 accumulator followed by another DSM. Each B+1/B−1 packet size indication causes the modulus accumulator to add/subtract 237. If the accumulator rolls over, it causes the PKT_PERIOD counter to count by two instead of one for one reference clock. If the accumulator rolls under, the PKT_PERIOD counter will not increment for one reference clock cycle. Therefore, whenever the accumulator rolls over or rolls under it causes the C interface to be read earlier or later by one reference clock cycle. This change in when we load is "permanent".

As mentioned, the current value of the accumulator is fed as the numerator into a DSM with a denominator of 956. The output of the DSM will be a stream of zeros and ones whose long term average is equal to the numerator divided by the denominator (a real number between 0 and 1).

The DSM output is used to temporarily modulate when the C packet size indication is loaded to simulate a fractional loading time. When the output is zero, the C packet size indication is read when the PKT_PERIOD counter is at a value of 1 which is the nominal loading time. When the output of the DSM is one, the C packet size indication is read when the PKT_PERIOD counter is a value of 0 (i.e. when the DSM output is 1, the C interface is temporarily read "early" by one reference clock cycle). Because the time average output of the DSM is equal to the time average of the loading time, this effectively allows the loading time to be a fractional value between zero and one.

Consider the following scenario using our example with ODU2 as the carrier. At time t=0, the mod 956 accumulator is equal to zero. The DSM output will be zero all the time (time average is zero) and the PKT_PERIOD counter will always load when it is equal to one. Some time later, we detect a B+1 event so 237 is added to the accumulator. The accumulator value of 237 is fed to the DSM and its average output over time should be 237/956 (slightly less than ¼). The DSM will output a one approx. once every 4 triggers (PKT_PERIOD counter rollovers). This means that approx. one time out every four, the C packet size indication load will occur early by one REFCLK period. In this case, we can average and say that the loading time is at approximately ¼ of a reference clock cycle which is the desired time.

If over time we accumulate three more B+1's, the accumulator will have a value of 4*237=948. Now, the average DSM output will be 948/956=0.9916. The DSM will output a one approx. 99% of the time which will cause 99% of the C interface reads to be early by one REFCLK period and our loading time is 99% of one reference clock cycle. Again, this is exactly what we want.

At the fifth B+1 event, the MOD 956 counter will rollover causing the PKT_PERIOD counter to increment by 2 for one reference clock cycle. Therefore, all future phase dumps will be early by a reference clock cycle. At this point, the accumulator will have value 229 and the DSM will output a one approx. 24% of the time. Relative to time t=0, 24% of the phase dumps will be early by two reference clock cycles and 76% are early by one reference clock cycle. Meaning the average loading time is ~1.24 reference clock cycles early.

Continuing this methodology effectively causes the PKT_PERIOD counter to be relative to the ingress node reference clock rather than the egress node reference clock. In this scenario, we are back to the situation described in the C mode of ACB operation and this is exactly what occurs in the implementation of our disclosure. Once again, the output CBR data will again be exactly equivalent to the incoming CBR stream at the mapping node even after having been packetized and transported over the WAN.

The methodology described in the above example is extensible to other reference clock frequencies as well as other carrier frequencies provided that the ratio of the reference clock to the carrier clock can be represented by N/Q, and there is enough resolution in the accumulator and DSM to represent the values N and Q.

Figure 27A:
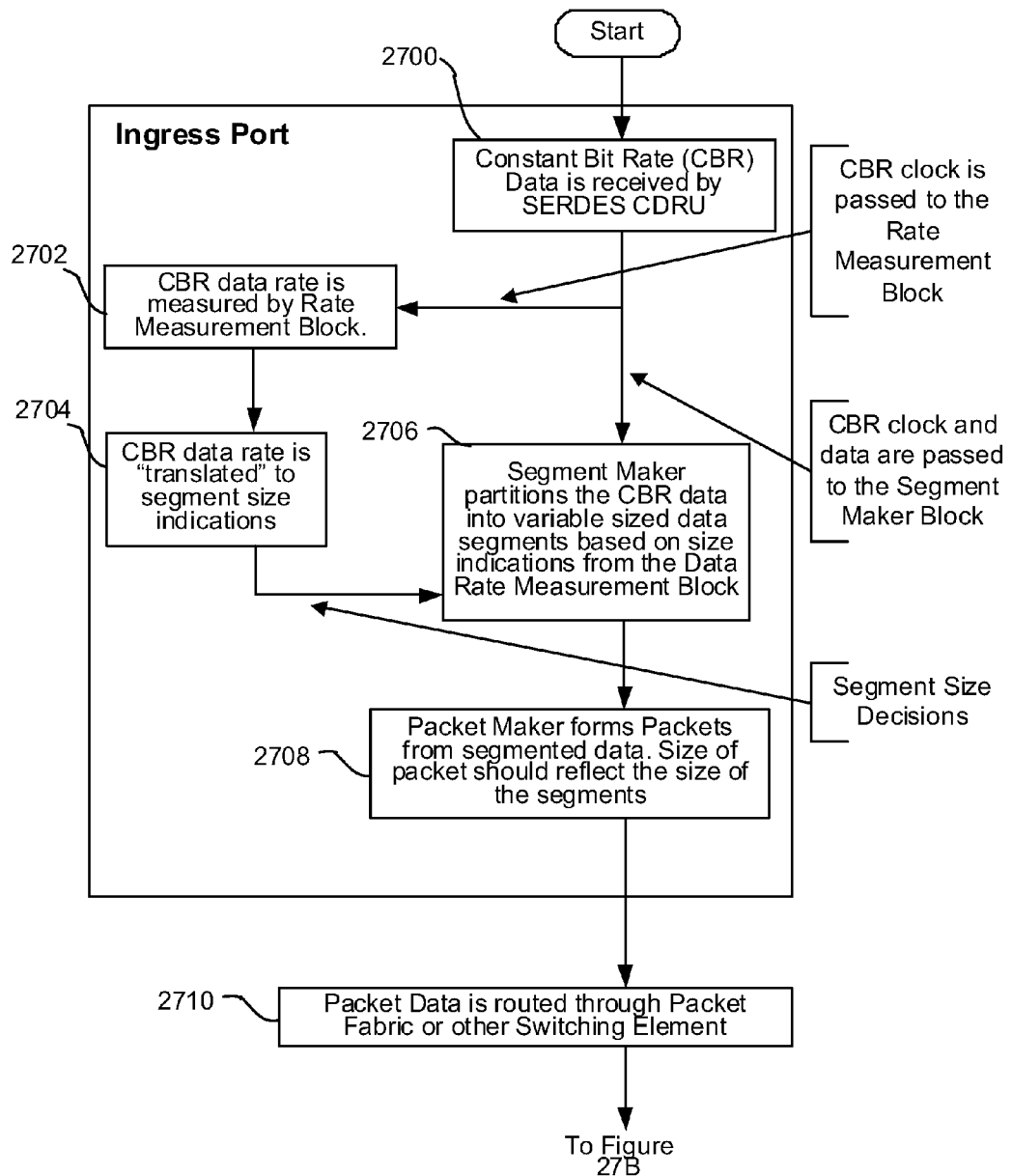
FIG. 27A and FIG. 27B show a non-limiting, exemplary flow chart which illustrates steps carried out by the apparatus of FIG. 12.
Figure 27B:
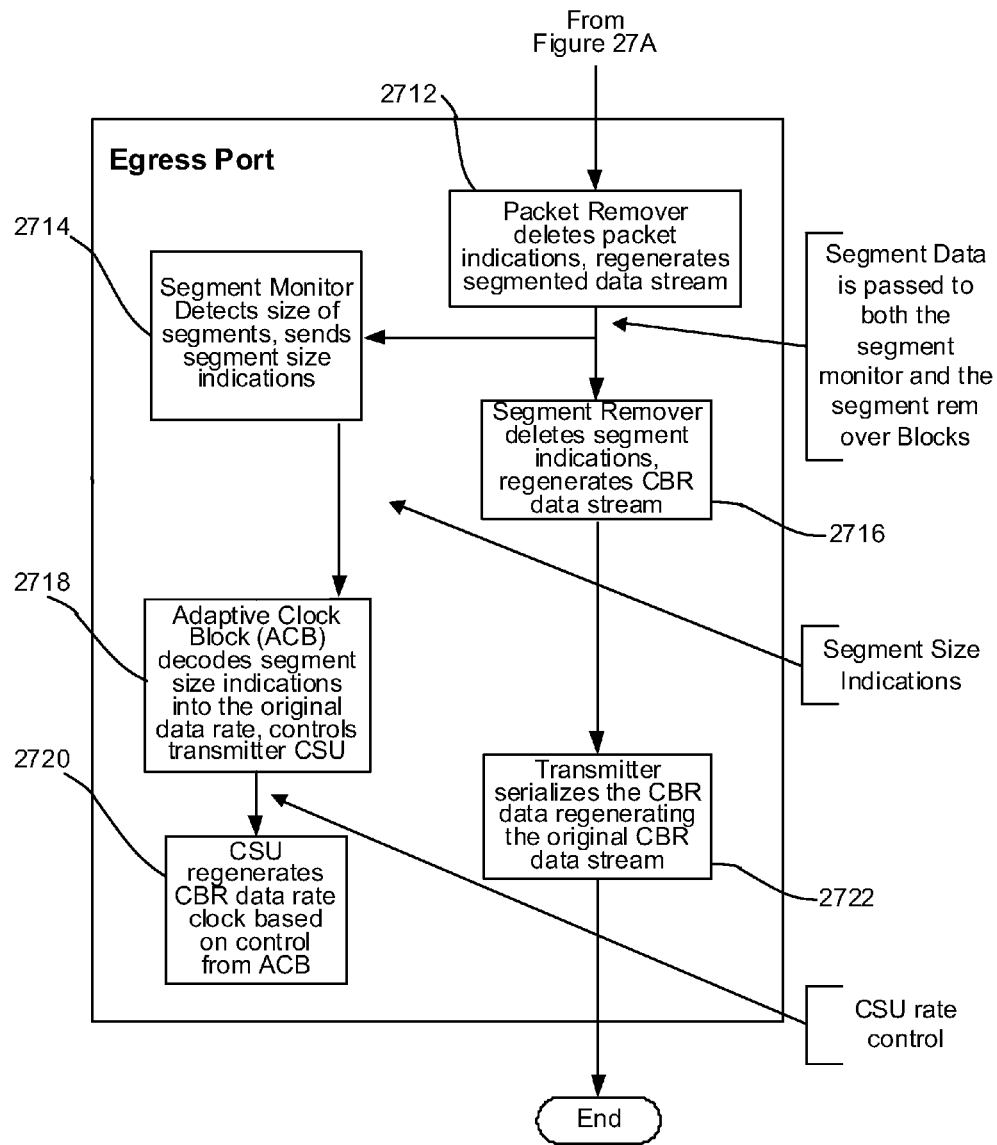

FIGS. 27A and 27B show an exemplary flow chart illustrating the steps that can be carried out by the embodiment of the disclosure shown in FIG. 12. In FIG. 27A at step 2700, CBR data is received by the SERDES CDRU. CBR clock is then passed to and measured by the Rate Measurement Block at step 2702. The CBR data rate is then "translated" to segment size indications at 2704. CBR clock and CBR data are passed to the Segment Maker Block, and, at step 2706, the Segment Maker partitions the CBR data into variable sized data segments based on size indications from the Rate Measurement Block. The Packet Maker then forms packets from the segmented data 2708. The size of the packets reflects the size of the segments. Next, at 2710, the packet data is routed through the packet fabric or other switching element. The method then proceeds to FIG. 27B.

In FIG. 27B, the Packet Remover at 2712 then deletes packet indications and regenerates the segmented data stream, which is passed to both the Segment Monitor Block and the Segment Remover Block. The Segment Remover, at 2716, deletes segment indications and regenerates the CBR data stream, while at 2714, the Segment Monitor detects the size of the segments and sends size indications to the Adaptive Clock Block. At 2717 a Cn is generated by a Cn generator block and input into the ACB. The Adaptive Clock Block, at 2718, then decodes the segment size indications into the original data rate, and controls the transmitter CSU. The CSU then, at 2720, regenerates CBR data rate clock based on the CSU rate control received from the Adaptive Clock Block. Finally, at 2722, the Transmitter serializes the CBR data, regenerating the original CBR data stream.

Figure 28A:
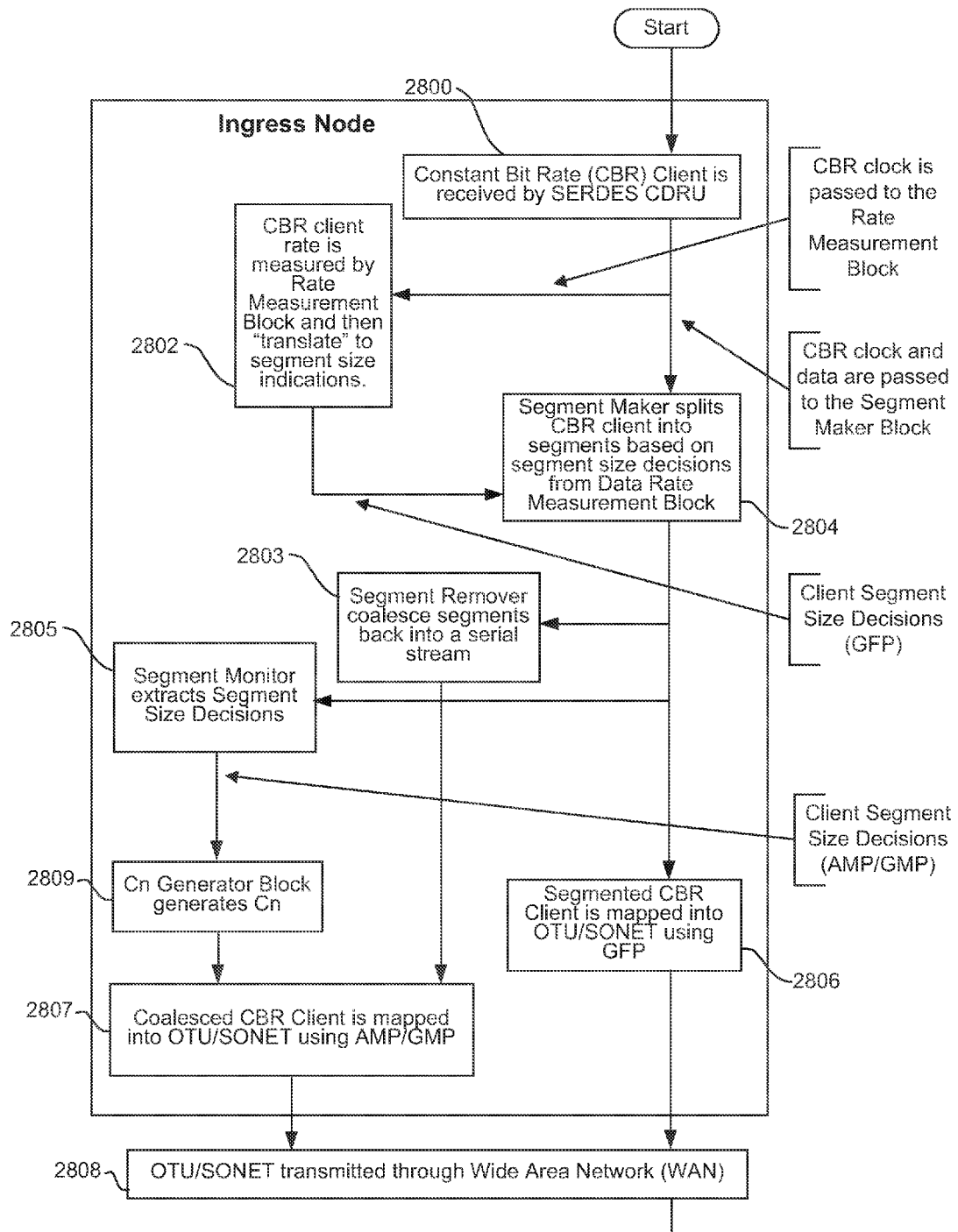
FIG. 28A and FIG. 28B show a non-limiting, exemplary flow chart which illustrates steps carried out by the apparatus of FIG. 14.
Figure 28B:
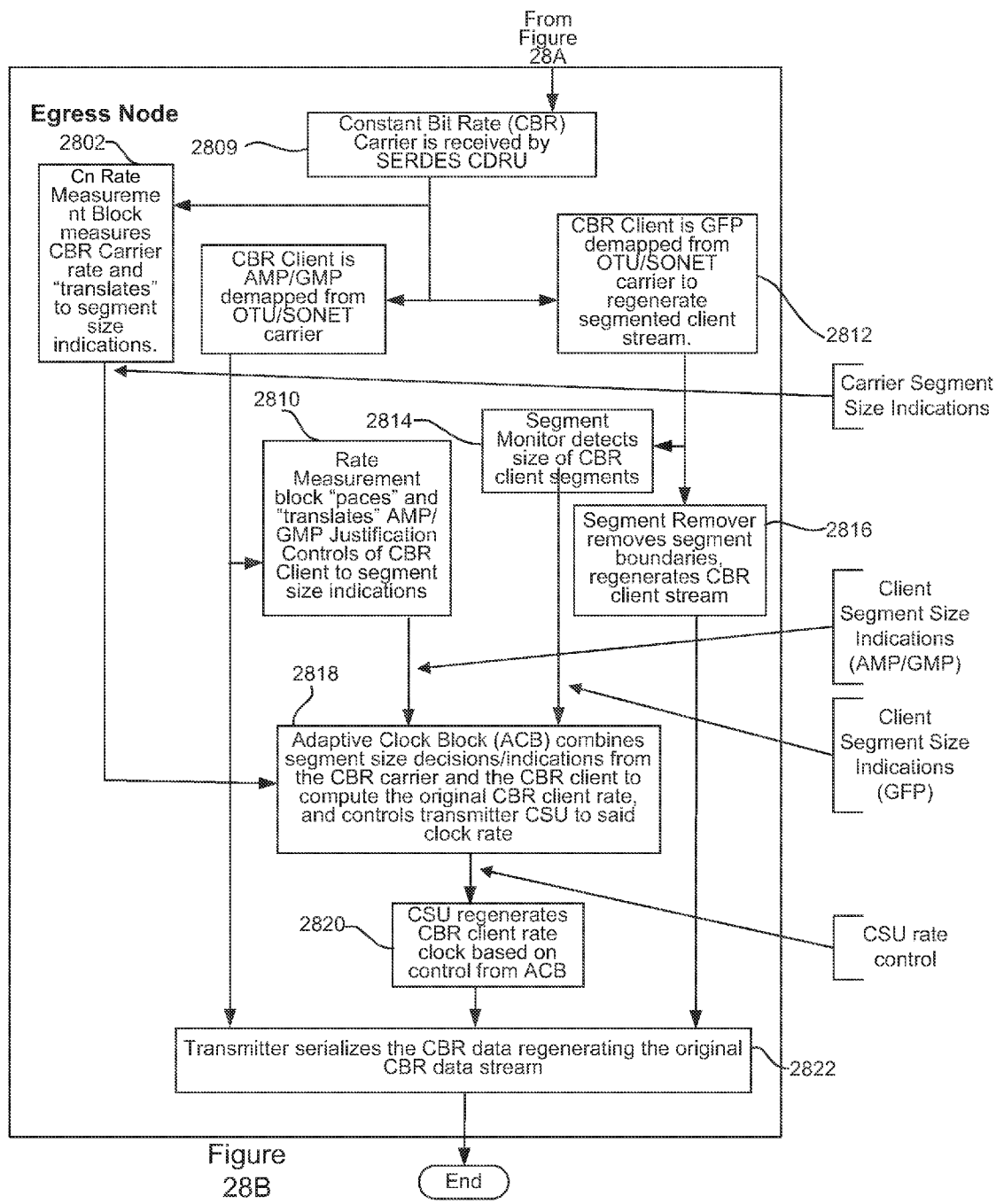

FIGS. 28A and 28B show an exemplary flowchart of the steps that can be carried out by the embodiment of the disclosure shown in FIG. 14. In FIG. 28A, at 2800, CBR data is received by the SERDES CDRU. CBR clock is then passed to the Rate Measurement Block, which measures it and "translates" it into segment size indications at step 2802. These segment size decisions as well as CBR clock and data are passed to the Segment Maker Block. At 2804, the Segment Maker splits CBR data into segments based on the segment size decisions received from the Rate Measurement Block. Then, at 2806, the segment data is mapped into OTU/SONET using a mapping protocol such as GFP which is then transmitted 2808 through a WAN to the Egress Node. The method then proceeds to FIG. 28B.

In FIG. 28B, at the Egress Node, the carrier clock and data are passed to the Segment Maker Block while the carrier clock is passed to the Rate Measurement Block. At 2809 a Cn is generated by a Cn generator block and input into the rate measurement block. At 2810, the carrier data rate is paced and measured by the Rate Measurement Block and then "translated" to segment size decisions. At 2812, the segment data is demapped from the OTU/SONET and whatever mapping protocol was employed at 2806 (in this example, GFP), thus regenerating the segment data stream. The Segment Monitor at 2814 then detects the size of the segments and sends segment size indications to the Adaptive Clock Block, while at 2816, the Segment Remover removes segment boundaries and regenerates the CBR data stream. The segment size indications from both the carrier rate and the segment sizes are decoded by the Adaptive Clock Block at 2818 into the original CBR data rate. The ACB also controls the transmitter to recover the clock. At 2820, CSU regenerates CBR data rate clock based on control received from the ACB. Finally, at 2822, the Transmitter serializes the CBR data, thus regenerating the original CBR data stream.

It should be noted that there is substantial overlap between the network element embodiment of FIGS. 12 and 27A & 27B with the network embodiment of FIGS. 14 and 28A & 28B, in the sense that both utilize the segment size indications to recreate the CBR data stream at the CBR clock rate. However, one significant difference is that within the network element, as both cards are within the same element, both the ingress card and the egress card share the same reference clocks; whereas in the network example, the ingress node and the egress node use difference reference clocks.

When the Packet Maker makes packets, it uses the number of bytes received in successive T cycles of the local reference clock to determine packet sizes. Thus, the local reference clock can be thought of as the yardstick for making measurements. An egress node needs to know what manner of reference clock was used at the ingress node in order to properly evaluate the sequence of sizes.

In the fabric application, both the ingress linecard and the egress line card share a common local reference clock. There is no need for the egress linecard to try to deduce what the ingress card used as its measurement reference.

In the network application, the egress node needs to deduce what the ingress node used for its local reference clock. Otherwise, if the packet sizes are consistently small, it would be difficult to know if this was because the client is slow or because the ingress node had a faster than normal reference clock. Similarly, if the clock is fast, T cycles of it would span a shorter time, and thus fewer client bytes would arrive over this shorten span. To differentiate between slow client and fast reference clock at the ingress, we look at the carrier to see if it is faster or slower than expected, using the reference clock at the egress node.

The following section describes this aspect in more detail by illustrating the difference in the applications between the CBR stream packetized for transmission over a fabric versus being mapped onto a CBR Carrier.

In the fabric example, the Ingress and Egress elements share the same reference clock. So at the Ingress card, packets of varying sizes dependent on the clock rate of the CBR client are constructed, with 1 packet made every Tc cycles of ref clock, on average. The client packets are then transported from the ingress element to the egress via the fabric. The characteristics of the path are unimportant. At the egress card, packets are received and the client packet size indications are placed into a FIFO, which is read once every Tc cycles. These packet size indications are then used by a phase detector in the Tx clock controller to reconstruct the CBR data stream.

In the network example, the Ingress and Egress elements do not share the same reference clock. Once again the Ingress element makes packets of varying sizes dependent on the clock rate of the CBR client are constructed, with 1 packet made every Tc cycles of ref clock, on average. The packets are then transmitted from ingress element to the egress by being mapped into a CBR Carrier. Upon receipt, the egress element makes packets of varying sizes of the CBR Carrier, with 1 packet made every Tb cycles of the egress ref clock, on average. It should be noted that in general Tc is not equal to Tb.

The exemplary systems described herein have several advantages over the prior art, which may include the following: (1) lower jitter and wander, the embodiments described herein are not subject to waiting time jitter due to packet delay variation; (2) low overhead, since the phase information is encoded in the packet size, no overhead is required which can increase the available signal bandwidth; (3) flexibility, the embodiments described herein are not tied to specific reference clocks or data rates, many combinations of reference clock and data rate is possible; (4) portability, there is no requirement that the mapping node and demapping node have stratum traceable reference clocks as embodiments of disclosure are capable of compensating for the difference in reference clocks; and (5) compatibility, since the implementation only uses packet size variation to indicate phase of the client signal, other devices using different timing recovery schemes can interoperate with the system. This wouldn't be possible if included is additional control information in the datapath as the other device wouldn't understand or have knowledge of our format.

Transporting CBR clients over packet networks is becoming more and more prevalent. In many cases, the phase of the CBR clients is critical to the operation of the equipment receiving the CBR signal. Embodiments of the disclosure relate to packet switching network elements and transmission of CBR data over a SONET or OTN WAN. However, the disclosure is not limited to these specific applications and can be expanded to include: loop timing, line timing, and through timing at a network element. In an example, the incoming CBR phase is used as the timing source of a different outgoing CBR signal (which is potentially at a different clock frequency). Different WAN carrier protocols include SONET/SDH, OTN, and synchronous Ethernet. Different mapping protocols of the CBR client into the carrier include GFP, synchronous OTN mapping, asynchronous OTN mapping, and Ethernet. Virtual concatenation of the carrier between the mapping and demapping nodes may occur. Virtually any CBR clients may be used as the disclosure does not require any fixed relationship between the CBR client and the reference clock. Virtually any reference clock frequency may be used as our disclosure does not require any fixed relationship between the reference clock and the CBR client. Different reference clock frequencies at the ingress and egress (mapper and demapper) nodes may be used, provided the relationship of the clocks is known during implementation. Various SERDES designs with different control mechanisms may be used. A combination or separation of the individual components may be performed. For example, the packet maker block can be combined with the rate measurement block. The adaptive clocking block can be combined with the SERDES CSU. Other combinations are possible.

The disclosure is not limited to the transportation of packets. The rate measurement block can be combined with the Adaptive Clock Block. In this scenario, the rate measurement block packet size indications would control the ACB directly without the intermediate step of packet maker. This situation would be useful in a loop-timing SERDES application.

An embodiment of the Low jitter phase signaling of ODUk/ODUflex and Constant Bit Rate clients in an OTN network with multi-stage multiplexing is provided in this disclosure.

The embodiment of Low jitter phase signaling of ODUk/ODUflex and Constant Bit Rate clients in an OTN network with multi-stage multiplexing of this disclosure is contained in four functional blocks. The PM26_60_37_A/MP-MA_DSP contains circuitry to convert GMP Cn values into packet sizes, while the PM26_60_38_A/MPMO_DSP has logic to convert packet sizes into GMP Cn values. The PM26_60_36/ACB_FT implements the necessary circuits to consume packet sizes without an epsilon predictor. Finally, the PM20_15_101/ODUJAT implements the ODUk/ODUflex JAT functionality between levels of OTN demultiplexing.

The disclosure is not limited to ASICs. Some or all of its components could be implemented on an FPGA. Further, many of the control loop algorithms could be implemented in software using either on or off chip microprocessors.

This disclosure has several further advantages over the prior art that makes it commercially valuable. Lower jitter and wander—the disclosure is not subject to waiting time jitter due to packet delay variation. Low overhead—since the phase information is encoded in the packet size, no overhead is required which maximizes the available signal bandwidth. Flexibility—the disclosure is not tied to specific reference clocks or data rates. Virtually any combination of reference clock and data rate is possible. Portability—there is no requirement that the mapping node and demapping node have stratum traceable reference clocks as the disclosure is capable of compensating for the difference in reference clocks.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for transporting a constant bit rate (CBR) client stream from an ingress element to an egress element, wherein the ingress element has an ingress reference clock and the egress element has an egress reference clock, the method comprising, at the ingress element:
   a) measuring a CBR client clock rate of the CBR client stream;
   b) encoding the CBR client clock rate into a sequence of client segment size indications;
   c) generating a CBR client rate value from the CBR client stream, comprising:
       accumulating a variance (−Ni, 0, +Ni) of the sequence of client segment size indications;
       determining a sum of the accumulated variances with a base client rate value once every Tifr cycles of the ingress reference clock, where Tifr is a rational number; and
       filtering the sum with a lossless low-pass filter once per Tifr cycles of the ingress reference clock to produce a filtered sum being the CBR client rate value;
   d) inserting the CBR client rate value and the CBR client stream into a CBR carrier stream; and
   e) transmitting the CBR carrier stream to the egress element.

2. The method of claim 1 further comprising, at the egress element:
   f) receiving the CBR carrier stream;
   g) measuring a CBR carrier clock rate of the CBR carrier stream;
   h) extracting the CBR client rate value and the CBR client stream from the CBR carrier stream; and
   i) reconstructing the CBR client clock rate from the CBR client rate value and the CBR carrier clock rate.

3. The method of claim 2 further comprising, at the egress element:
   j) encoding the CBR carrier clock rate into a sequence of carrier segment size indications.

4. The method of claim 3 wherein c) comprises:
   inserting the CBR client rate value into dedicated overhead bytes of the CBR carrier stream;
   inserting data bytes of the CBR client stream into a payload area of the CBR carrier stream; and
   inserting pad bytes into the remaining bytes of the payload area.

5. The method of claim 4, wherein h) comprises:
   extracting the CBR client rate value from the dedicated overhead bytes;
   extracting the data bytes of the CBR client stream from the payload area; and
   discarding the pad bytes.

6. The method of claim 5 wherein i) comprises:
   controlling a phase-locked loop (PLL) with the client segment size indications and the carrier segment size indications.

7. The method of claim 3 wherein g) comprises:
   determining carrier byte counts from a counted amount of CBR carrier data bytes received over Tecr cycles of the egress reference clock, where Tecr is a rational number; and
   filtering the carrier byte counts with a lossless low-pass filter once per Tecr cycles of the egress reference clock to produce a filtered count being the CBR carrier clock rate.

8. The method of claim 3 wherein j) comprises:
   generating carrier segment size indications with values of Be−Ne, Be, or Be+Ne bytes once every Tecr cycles of the egress reference clock, where Be and Ne are positive integers, wherein a time average of the carrier segment size indications equals a time average of the CBR carrier clock rate.

9. The method of claim 3 further comprising:
   apportioning the extracted CBR client rate value into (Tefr/Tecl) counts to determine client byte counts per Tecl cycles of the egress reference clock, where Tefr and Tecl are rational numbers; and
   filtering the client byte counts with a lossless low-pass filter once per Tecl cycles of the egress reference clock to produce a filtered count being the CBR client clock rate.

10. The method of claim 3 further comprising:
    generating client segment size indications with values of Ce−Me, Ce, or Ce+Me bytes once every Tecl cycles of the egress reference clock, where Ce and Me are positive integers, wherein a time average of the carrier segment size indications equals a time average of the CBR carrier clock rate.

11. The method of claim 2 further comprising:
    smoothing the CBR carrier stream using a multi-channel jitter attenuator (JAT).

12. The method of claim 11, wherein smoothing the CBR carrier stream comprises:
    filtering the CBR carrier stream with a multi-channel first in first out buffer (FIFO);
    filtering the CBR carrier stream with a time-sliced low-passed filter; and
    converting a filtered generated fill level to control a rate of a FIFO dequeue signal.

13. The method of claim 1 wherein a) comprises:
    determining client byte counts from a counted amount of CBR client data bytes received over Ticl cycles of the ingress reference clock, where Ticl is a rational number; and
    filtering the client byte counts with a lossless low-pass filter once per Ticl cycles of the ingress reference clock to produce a filtered count being the CBR client clock rate.

14. The method of claim 1 wherein b) comprises:
    generating client segment size indications with values of Bi−Ni, Bi, or Bi+Ni bytes once every Ticl cycles of the ingress reference clock, where Bi and Ni are positive integers, wherein a time average of the client segment size indications equals a time average of the CBR client clock rate.

15. The method of claim 1 wherein e) comprises:
    phase locking a transmit clock of the CBR carrier stream to the ingress reference clock.

16. The method of claim 6 wherein controlling the PLL comprises:
    writing the client segment size indications into a client indications first-in-first-out buffer (FIFO);
    writing the carrier segment size indications into a carrier indications FIFO;
    reading the carrier segment size indications FIFO once per Tecr cycles of the egress reference clock to retrieve a carrier size variance (−Ne, 0, +Ne);
    reading the client segment size indications FIFO nominally once per Tecl cycles of the egress reference clock;

modulating a period between reading of the client indications FIFO based on the carrier size variance read from the carrier indications FIFO; and summing the carrier size variance into a reference phase accumulator of the PLL.

17. The method of claim 16 further comprising, at the PLL:
accumulating output clock cycles in a feedback phase accumulator;
determining a phase error signal as the difference between a value of the reference phase accumulator and a value of the feedback phase accumulator;
filtering the phase error signal with a low-pass filter to produce a filtered phase error signal; and
controlling an oscillator based on the filtered phase error signal to generate an output clock at the CBR client clock rate.

18. A system for transporting a constant bit rate (CBR) client stream from an ingress element to an egress element, wherein the ingress element has an ingress reference clock and the egress element has an egress reference clock, the system comprising, the ingress element comprising:
an ingress rate measurement block configured to measure a CBR client clock rate of the CBR client stream, and to encode the CBR client clock rate into a sequence of client segment size indications;
a Cn generator block configured to generate a CBR client rate value from the CBR client stream, wherein the Cn generator block comprises:
a packet size decision accumulator configured to accumulate a variance (−Ni, 0, +Ni) of the sequence set of client segment size indications;
a summer configured to determine a sum of the accumulated variances with a base client rate value once every Tifr cycles of the ingress reference clock, where Tifr is a rational number; and
a lossless low-pass filter configured to filter the sum once per Tifr cycles of the ingress reference clock to produce a filtered sum being the CBR client rate value;
a mapper configured to insert the CBR client rate value and the CBR client stream into a CBR carrier stream; and
a transmitter configured to transmit the CBR carrier stream to the egress element.

19. The system of claim 18 further comprising:
the egress element comprising:
a segment monitor configured to receive the CBR carrier stream;
a egress rate measurement block configured to measure a CBR carrier clock rate of the CBR carrier stream;
a demapper configured to extract the CBR client rate value and the CBR client stream from the CBR carrier stream; and
an adaptive clock block configured to reconstruct the CBR client clock rate from the CBR client rate value and the CBR carrier clock rate.

20. The system of claim 18, wherein the egress rate measurement block is further configured to encode the CBR carrier clock rate into a sequence of carrier segment size indications.

21. The system of claim 20 wherein the egress rate measurement block is further configured to determine carrier byte counts from a counted amount of CBR carrier data bytes received over Tecr cycles of the egress reference clock, where Tecr is a rational number; and the egress rate measurement block comprises a lossless low pass filter configured to filter the carrier byte counts once per Tecr cycles of the egress reference clock to produce a filtered count being the CBR carrier clock rate.

22. The system of claim 20 wherein the egress rate measurement block is further configured to generate carrier segment size indications with values of Be−Ne, Be, or Be+Ne bytes once every Tecr cycles of the egress reference clock, where Be and Ne are positive integers, wherein a time average of the carrier segment size indications equals a time average of the CBR carrier clock rate.

23. The system of claim 20 wherein the egress element is further configured to apportion the extracted CBR client rate value into (Tefr/Tecl) counts to determine client byte counts per Tecl cycles of the egress reference clock, where Tefr and Tecl are rational numbers; and
wherein the egress element further comprises a lossless low-pass filter configured to filter the client byte counts once per Tecl cycles of the egress reference clock to produce a filtered count being the CBR client clock rate.

24. The system of claim 23 wherein the egress element is further configured to generate client segment size indications with values of Ce−Me, Ce, or Ce+Me bytes once every Tecl cycles of the egress reference clock, where Ce and Me are positive integers, wherein a time average of the carrier segment size indications equals a time average of the CBR carrier clock rate.

25. The system of claim 18 wherein the ingress rate measurement block is further configured to determine client byte counts from a counted amount of CBR client data bytes received over Ticl cycles of the ingress reference clock, where Ticl is a rational number and the ingress rate measurement block comprises a lossless low-pass filter configured to filter the client byte counts once per Ticl cycles of the ingress reference clock to produce a filtered count being the CBR client clock rate.

26. The system of claim 18 wherein the ingress rate measurement block is further configured to generate client segment size indications with values of Bi−Ni, Bi, or Bi+Ni bytes once every Ticl cycles of the ingress reference clock, where Bi and Ni are positive integers, wherein a time average of the client segment size indications equals a time average of the CBR client clock rate.

27. The system of claim 18 wherein the mapper is further configured to:
insert the CBR client rate value into dedicated overhead bytes of the CBR carrier stream;
insert data bytes of the CBR client stream into a payload area of the CBR carrier stream; and
insert pad bytes into the remaining bytes of the payload area.

28. The system of claim 27, wherein the demapper is further configured to:
extract the CBR client rate value from the dedicated overhead bytes;
extract the data bytes of the CBR client stream from the payload area; and
discard the pad bytes.

29. The system of claim 28 wherein the adaptive clock block further comprises:
a phase-locked loop (PLL) controlled by the client segment size indications and the carrier segment size indications.

30. The system of claim 29 wherein the adaptive clock block further comprises:
a client indications first-in-first-out buffer (FIFO) configured to receive the client segment size indications;
a carrier indications FIFO configured to receive the carrier segment size indications;

a control loop update counter configured to read the carrier segment size indications FIFO once per Tecr cycles of the egress reference clock to retrieve a carrier size variance (−Ne, 0, +Ne);

wherein the adaptive clock block is configured to read the client segment size indications FIFO nominally once per Tecl cycles of the egress reference clock;

wherein the adaptive clock block is configured to modulate a period between reading of the client indications FIFO based on the carrier size variance read from the carrier indications FIFO; and a summer configured to sum the carrier size variance into a reference phase accumulator of the PLL.

31. The system of claim 30 wherein the PLL comprises:

a feedback phase accumulator configured to accumulate output clock cycles;

wherein a phase error signal is the difference between a value of the reference phase accumulator and a value of the feedback phase accumulator;

a low-pass filter configured to filter the phase error signal with a low-pass filter to produce a filtered phase error signal; and an oscillator controlled based on the filtered phase error signal configured to generate an output clock at the CBR client clock rate.

32. The system of claim 18 wherein the transmitter is further configured to phase lock a transmit clock of the CBR carrier stream to the ingress reference clock.

33. The system of claim 18 further comprising:

a multi-channel jitter attenuator (JAT) configured to smooth the CBR carrier stream.

34. The system of claim 33, wherein the JAT comprises:

a multi-channel first in first out buffer (FIFO) used as a phase detector for filtering the CBR carrier stream;

a time-sliced low-passed filter configured to filter the CBR carrier stream;

a time-sliced conversion gain stage configured to convert a filtered generated fill level to control a rate of a FIFO dequeue signal.

* * * * *